(12) United States Patent
Hanada et al.

(10) Patent No.: US 8,340,924 B2
(45) Date of Patent: Dec. 25, 2012

(54) MEMBRANOUS FILTRATION PREDICTION METHOD, PREDICTION APPARATUS, AND MEMBRANOUS FILTRATION PREDICTION PROGRAM

(75) Inventors: Shigehisa Hanada, Otsu (JP); Hiroo Takabatake, Otsu (JP)

(73) Assignee: Toray Industries, Inc., Tokyo (JP)

( * ) Notice: Subject to any disclaimer, the term of this patent is extended or adjusted under 35 U.S.C. 154(b) by 312 days.

(21) Appl. No.: 12/739,604

(22) PCT Filed: Oct. 24, 2008

(86) PCT No.: PCT/JP2008/069365
§ 371 (c)(1),
(2), (4) Date: Apr. 23, 2010

(87) PCT Pub. No.: WO2009/054506
PCT Pub. Date: Apr. 30, 2009

(65) Prior Publication Data
US 2010/0250154 A1   Sep. 30, 2010

(30) Foreign Application Priority Data
Oct. 25, 2007   (JP) .................................. 2007-277289

(51) Int. Cl.
*G06F 19/00* (2011.01)
*G01F 1/00* (2006.01)
*G01L 7/00* (2006.01)
(52) U.S. Cl. ............. 702/45; 210/637; 702/50; 702/176
(58) Field of Classification Search .................... 702/45, 702/47, 50, 98, 100, 138, 156, 176, 136; 210/500.36, 637; 73/861.18; 700/282–285
See application file for complete search history.

(56) References Cited

U.S. PATENT DOCUMENTS
6,607,669 B2 *   8/2003   Schick .......................... 210/637

FOREIGN PATENT DOCUMENTS
| JP | 200-218139 A | 8/2000 |
| JP | 2001-062255 A | 3/2001 |
| JP | 2001-327967 A | 11/2001 |
| JP | 2005-125303 A | 5/2005 |
| JP | 2007-014948 A | 1/2007 |
| JP | 2007-038136 A | 2/2007 |
| JP | 2007-185648 A | 7/2007 |

OTHER PUBLICATIONS

H. Nagaoka, "Modeling of Biofouling by Extracellular Polymers in a Membrane Separation Activated Sludge System", Wat. Sci. Tech. vol. 38, No. 4-5, pp. 497-504, 1998.
International Search Report dated Dec. 2, 2008, application No. PCT/JP2008/069365.

* cited by examiner

*Primary Examiner* — John H Le
(74) *Attorney, Agent, or Firm* — RatnerPrestia

(57) ABSTRACT

A method is provided for precisely predicting the temporal variation of a membranous filtration resistance, a transmembrane pressure, a membranous filtration flowrate, or a membranous filtration flowrate as occurs in filtrating a liquid with a membrane, in a membranous filtration method wherein the liquid is filtrated by the separation membrane with the transmembrane pressure as a driving force. The method includes calculating: a constituent component quantity value of the liquid that attaches on a surface of the separation membrane at a time t+Δt; a constituent component quantity value of the liquid that exists in pores of the separation membrane; a consolidation degree of a constituent component of the liquid that attaches on the separation membrane surface; a membranous filtration resistance value; a transmembrane pressure value; and a membranous filtration flowrate value.

38 Claims, 16 Drawing Sheets

MEMBRANOUS FILTRATION PREDICTION METHOD, PREDICTION APPARATUS, AND MEMBRANOUS FILTRATION PREDICTION PROGRAM

This application is a U.S. National Phase Application of PCT International Application No. PCT/JP2008/069365, filed Oct. 24, 2008, which claims priority to Japanese Patent Application No. 2007-277289, filed Oct. 25, 2007, the contents of such applications being incorporated by reference herein in their entirety.

TECHNICAL FIELD

The present invention relates to a method, a prediction apparatus and a prediction program which predict the temporal variation of a membranous filtration resistance, the temporal variation of a membranous filtration flowrate and the temporal variation of a transmembrane pressure as are generated in filtrating a liquid to-be-filtrated with a membrane.

BACKGROUND ART

A method for filtrating a liquid with a separation membrane is a method wherein the liquid which is a liquid to-be-filtrated is held in touch with the separation membrane, and a filtrated liquid is obtained by applying a pressure from the side of the liquid to-be-filtrated or by holding a penetration side at a negative pressure. On this occasion, a membranous filtration resistance increases for such a reason that any nonmembranous penetrative substance contained in the liquid to-be-filtrated attaches onto a membrane surface, that the nonmembranous penetrative substance accumulates into membrane pores, or that the nonmembranous penetrative substance having deposited is consolidated by a pressure acting on this nonmembranous penetrative substance. When the membranous filtration resistance has enlarged, a membranous filtration flowrate decreases in a case where the membranous filtration is performed by applying a constant membranous filtration pressure, and a transmembrane pressure increases in a case where the membranous filtration is performed by holding the membranous filtration flowrate constant. In the former case, a planned flowrate cannot be secured, while in the latter case, energy for increasing the pressure is required, and simultaneously, a burden for the separation membrane increases. Such an increase behavior of the membranous filtration resistance is greatly influenced by a membranous filtration condition, and it is an important factor for continuously performing the membranous filtration. In other words, if the temporal variation of the membranous filtration resistance, the membranous filtration flowrate or the transmembrane pressure can be exactly predicted, it is permitted to find out the membranous filtration condition for performing an efficient and stable filtration.

Besides, as a method for suppressing such an increase of the membranous filtration resistance, there is a method wherein the membranous filtration is performed while the membrane surface is being washed, such as one wherein the membrane surface is exposed to air by an air sprinkler which is disposed under the membrane, one wherein the liquid to-be-filtrated is circulated in a direction parallel to the membrane surface, by utilizing a pump, or one wherein the separation membrane is moved or vibrated. In such a membranous filtration method, the increase of the membranous filtration resistance can be suppressed by sufficiently performing the membrane wash, but energy is required for such a wash of the membrane surface, and it increases a running cost to perform the membrane wash more than is necessary. That is, it is important for the running rationalization of a membranous filtration apparatus to perform the membrane surface wash necessarily and sufficiently.

Besides, also a membrane surface wash with chemicals or the like is sometimes performed after temporarily suspending the filtration. In this case, a filtration running efficiency lowers due to the temporary suspension of running, and a chemicals cost is also required, so that a timing at which the membrane wash is performed is important.

Therefore, the exact prediction of the temporal variation of the membranous filtration resistance during the filtration is very effective because a quantitative membranous filtration condition can be determined. It is permitted to determine, for example, the minimum exposure airflow which is necessary for suppressing the increase of the membranous filtration resistance.

A mathematical formula model for predicting the variation of the membranous filtration resistance during such a membranous filtration is proposed in Patent Document 1. This method predicts the membranous filtration resistance in such a way that the increase or decrease of a nonmembranous penetrative substance which is contained in the liquid to-be-filtrated attaching on the surface of the separation membrane is expressed as the mathematical formula model. Besides, a mathematical formula model for predicting the membranous filtration resistance is stated also in Non-patent Document 1. With this method, the increase or decrease of an extracellular polymeric substance amount (hereinbelow, termed the "EPS") attaching on the filtration membrane is expressed as the mathematical formula model, and the membranous filtration resistance is predicted on the basis of the EPS.

Patent Document 1: JP-A-2007-14948
Non-patent Document 1: H. Nagaoka, "MODELING OF BIOFOULING BY EXTRACELLULAR POLYMERS IN A MEMBRANE SEPARATION ACTIVATED SLUDGE SYSTEM", Wat. Sci. Tech. Vol. 38, No. 4-5, pp 497-504, 1998.

BRIEF SUMMARY OF THE INVENTION

The membranous filtration resistance prediction based on Patent Document 1 has a problem as stated below. That is, since only the nonmembranous penetrative substance attaching on the separation membrane surface is considered as a factor for increasing the membranous filtration resistance, the precision of the membranous filtration resistance prediction is not satisfactory. As stated above, the nonmembranous penetrative substances accumulating in the pores of the separation membrane exist in addition to the nonmembranous penetrative substance attaching on the separation membrane surface, as the factor for increasing the membranous filtration resistance, and to predict the amounts of the nonmembranous penetrative substances accumulating in the pores is indispensable to the prediction of the membranous filtration resistance for a long term. Therefore, the membranous filtration resistance prediction based on Patent Document 1 has the problem that particularly the prediction of the membranous filtration resistance for the long term cannot be precisely done.

Besides, as another factor for increasing the membranous filtration resistance, it is mentioned that the nonmembranous penetrative substance having deposited is consolidated by a pressure acting on this nonmembranous penetrative substance. On account of this phenomenon, the membranous filtration resistance rises in accelerative fashion in a short term. Nevertheless, since this phenomenon is not incorporated in the membranous filtration resistance prediction based on Patent Document 1, there is the problem that the prediction of the membranous filtration resistance cannot be precisely done.

Besides, the membranous filtration resistance prediction based on Non-patent Document 1 has problems as stated below.

First, expert knowledge, an apparatus, labor, and a time period are required for the measurement of the EPS, and the EPS cannot be easily measured in the actual membranous filtration running. For this reason, even when the prediction has been done by measuring the EPS, a prediction precision is low due to insufficient data, and a long time is expended in collecting data sufficiently. Therefore, even when the membranous filtration resistance has been predicted, the timing at which the filtration condition is corrected and altered is prone to be missed.

Secondly, since any solid content in the liquid to-be-filtrated is not considered, the prediction precision of the membranous filtration resistance is not satisfactory. When the solid content in the liquid to-be-filtrated attaches to the membrane, it contributes to the rise of the membranous filtration resistance, and it easily detaches from the membrane, so that it detaches while involving a supernatant content attaching to the membrane, together with this supernatant content. Accordingly, the prediction of high precision is difficult with the method of Non-patent Document 1 wherein the influence of the solid content in the liquid to-be-filtrated is not considered.

Therefore, it would be beneficial to enhance prediction precisions in a method, a prediction apparatus and a prediction program for predicting the temporal variations of a membranous filtration resistance, a membranous filtration flowrate and a transmembrane pressure which are generated in filtrating a liquid to-be-filtrated with a membrane.

The membranous filtration prediction method of an embodiment of the present invention consists of either of the following configurations:

(1) In a membranous filtration method wherein a liquid to-be-filtrated is filtrated by a separation membrane with a driving force being a pressure difference (hereinbelow, termed "transmembrane pressure") between a liquid to-be-filtrated side and a penetration liquid side of the separation membrane; a membranous filtration prediction method in which, in case of continuing the membranous filtration while controlling a membranous filtration flowrate (flux) to a set value, a variation of a membranous filtration resistance with time and/or a variation of the transmembrane pressure with time are/is predicted, characterized in that at least the set value of the membranous filtration flowrate (flux), an initial value of the membranous filtration resistance, and a constituent component quantity value of the liquid to-be-filtrated are used as numerical values for a membranous filtration prediction computation, and that at least the following computation step $1a$, computation step $1b$ and/or computation step $1c$, and computation step 2 and/or computation step 3 are executed, thereby to find a membranous filtration resistance value and/or a transmembrane pressure value at any desired time:

(Computation step $1a$) The constituent component quantity value of the liquid to-be-filtrated attaching on a surface of the separation membrane at a time $t+\Delta t$ (here, $\Delta t$ denotes any plus number) is calculated on the basis of a membranous filtration flowrate (flux) value or the transmembrane pressure value and the constituent component quantity value of the liquid to-be-filtrated at a time t (here, t denotes any number of at least zero).

(computation step $1b$) at which the constituent component quantity value of the liquid to-be-filtrated existing in pores of the separation membrane at the time $t+\Delta t$ is calculated on the basis of the transmembrane pressure value and/or the membranous filtration flowrate (flux) value at the time t.

(computation step $1c$) at which a consolidation degree of a constituent component of the liquid to-be-filtrated attaching on the separation membrane surface at the time $t+\Delta t$ is calculated on the basis of the transmembrane pressure value at the time t.

(computation step 2) at which the membranous filtration resistance value at the time $t+\Delta t$ is calculated on the basis of the constituent component quantity value of the liquid to-be-filtrated attaching on the separation membrane surface as has been found at the computation step $1a$, the constituent component quantity value of the liquid to-be-filtrated existing in the separation membrane pores as has been found at the computation step $1b$, and/or the consolidation degree of the constituent component of the liquid to-be-filtrated attaching on the separation membrane surface as has been found at the computation step $1c$.

(computation step 3) at which the transmembrane pressure value at the time $t+\Delta t$ is calculated on the basis of the constituent component quantity value of the liquid to-be-filtrated attaching on the separation membrane surface as has been found at the computation step $1a$, the constituent component quantity value of the liquid to-be-filtrated existing in the separation membrane pores as has been found at the computation step $1b$, and/or the consolidation degree of the constituent component of the liquid to-be-filtrated attaching on the separation membrane surface as has been found at the computation step $1c$, or on the basis of the membranous filtration resistance value found at the computation step 2.

and further, in that the computation steps are repeatedly executed while updating the time, thereby to obtain the variation of the membranous filtration resistance with the time, and/or the variation of the transmembrane pressure with the time.

(2) In a membranous filtration method wherein a liquid to-be-filtrated is filtrated by a separation membrane with a driving force being a pressure difference (hereinbelow, termed "transmembrane pressure") between a liquid to-be-filtrated side and a penetration liquid side of the separation membrane; a membranous filtration prediction method in which, in case of continuing the membranous filtration while controlling the transmembrane pressure to a set value, a variation of a membranous filtration resistance with time and/or a variation of a membranous filtration flowrate (flux) with time are/is predicted, characterized in that at least the set value of the transmembrane pressure, an initial value of the membranous filtration resistance, and a constituent component quantity value of the liquid to-be-filtrated are used as numerical values for a membranous filtration prediction computation, and that at least the following computation step $1a$, computation step $1b$ and/or computation step $1c$, and computation step 2 and/or computation step 4 are executed, thereby to find a membranous filtration resistance value and/or a membranous filtration flowrate (flux) value at any desired time:

(computation step $1a$) at which the constituent component quantity value of the liquid to-be-filtrated attaching on a surface of the separation membrane at a time $t+\Delta t$ (here, $\Delta t$ denotes any plus number) is calculated on the basis of the membranous filtration flowrate (flux) value or a transmembrane pressure value and the constituent component quantity value of the liquid to-be-filtrated at a time t (here, t denotes any number of at least zero).

(computation step $1b$) at which the constituent component quantity value of the liquid to-be-filtrated existing in pores of the separation membrane at the time $t+\Delta t$ is calculated on the basis of the transmembrane pressure value and/or the membranous filtration flowrate (flux) value at the time t.

(computation step 1c) at which a consolidation degree of a constituent component of the liquid to-be-filtrated attaching on the separation membrane surface at the time t+Δt is calculated on the basis of the transmembrane pressure value at the time t.

(computation step 2) at which the membranous filtration resistance value at the time t+Δt is calculated on the basis of the constituent component quantity value of the liquid to-be-filtrated attaching on the separation membrane surface as has been found at the computation step 1a, the constituent component quantity value of the liquid to-be-filtrated existing in the separation membrane pores as has been found at the computation step 1b, and/or the consolidation degree of the constituent component of the liquid to-be-filtrated attaching on the separation membrane surface as has been found at the computation step 1c.

(computation step 4) at which the membranous filtration flowrate (flux) value at the time t+Δt is calculated on the basis of the constituent component quantity value of the liquid to-be-filtrated attaching on the separation membrane surface as has been found at the computation step 1a, the constituent component quantity value of the liquid to-be-filtrated existing in the separation membrane pores as has been found at the computation step 1b, and/or the consolidation degree of the constituent component of the liquid to-be-filtrated attaching on the separation membrane surface as has been found at the computation step 1c, or on the basis of the membranous filtration resistance value found at the computation step 2.

and further, in that the computation steps are repeatedly executed while updating the time, thereby to obtain the variation of the membranous filtration resistance with the time, and/or the variation of the membranous filtration flowrate (flux) with the time.

(3) A membranous filtration prediction apparatus comprising calculation means for executing calculations in accordance with the membranous filtration prediction method stated in either the above item (1) or (2), display means for displaying calculated results of the calculation means, and record means for recording input data and the calculated results.

(4) A computer program for predicting a temporal variation of a membranous filtration resistance value and/or a temporal variation of a transmembrane pressure value as vary with time, in a case where a filtration of a liquid to-be-filtrated with a separation membrane is continued while controlling a membranous filtration flowrate (flux) to a set value.

(5) A computer program for predicting a temporal variation of a membranous filtration resistance value and/or a temporal variation of a membranous filtration flowrate (flux) value as vary with time, in a case where a filtration of a liquid to-be-filtrated with a separation membrane is continued while controlling a transmembrane pressure to a set value.

According to an embodiment of the present invention, as will be explained below, the temporal variation of a membranous filtration resistance which is generated in filtrating a liquid to-be-filtrated with a membrane, the temporal variation of a transmembrane pressure, the temporal variation of a membranous filtration flux, or the temporal variation of a membranous filtration flowrate can be precisely predicted. As a result, those running conditions of the transmembrane pressure, the filtration flowrate, etc. which suppress, for example, the sudden rise of the membranous filtration resistance attributed to the clogging of the membrane as is observed in the end phase of running can be optimized on the basis of a prediction based on a previous study, that is, the optimal running conditions can be efficiently determined.

DETAILED DESCRIPTION OF THE INVENTION

Figure 1:
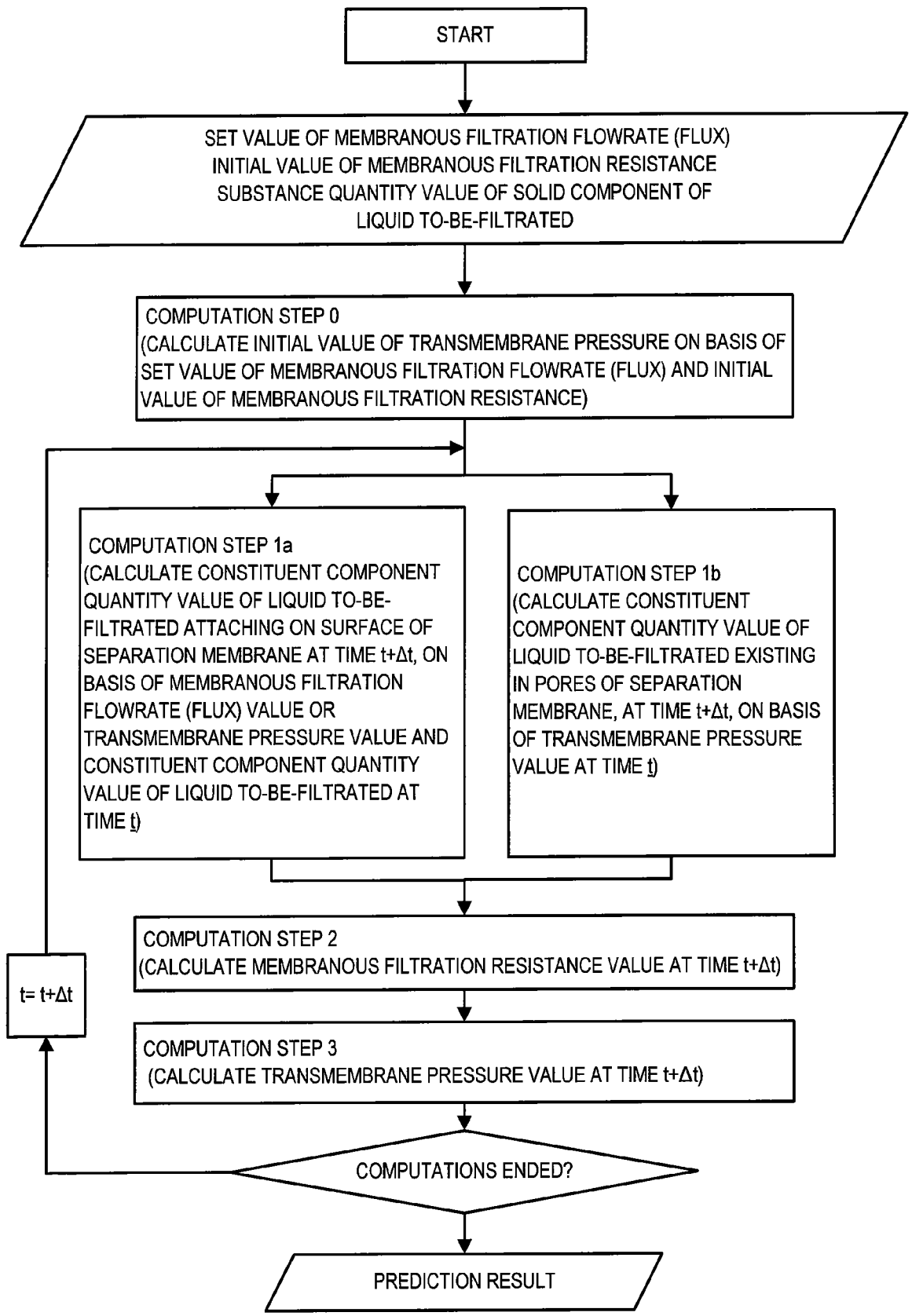
FIG. 1 It is an example of a flow chart of the prediction method of an embodiment of the present invention.

The membranous filtration prediction method of the present invention relates to a method which predicts the variation of membranous filtration in the case where a liquid to-be-filtrated is filtrated with a separation membrane in such a way that the pressure difference (hereinbelow, termed the "transmembrane pressure") between the side of the liquid to-be-filtrated and the side of a penetrative liquid with respect to the separation membrane is used as a driving force.

Herein, the liquid to-be-filtrated is a liquid which contains a suspension substance and which is fed for the membranous filtration, and it is not especially restricted. In case of, for example, a liquid which contains microbes, the microbes being the substance and the metabolic product of the microbes are generally existent at comparatively high concentrations in the liquid to-be-filtrated. It is therefore difficult to predict the fluctuations of a resistance, etc. at the time when the liquid to-be-filtrated has been subjected to the membranous filtration. In contrast, the present invention is greatly advantageous in that the fluctuations of the resistance, etc. at the time when the liquid to-be-filtrated has been subjected to the membranous filtration can be predicted, and that the running conditions of adjustment means in a membranous filtration apparatus which subjects the liquid to-be-filtrated to the membranous filtration can be precisely determined. Therefore, the present invention is especially effective in a case where a liquid containing microbes, such as microbic culture solution or active sludge is the liquid to-be-filtrated. Besides, the present invention is preferably applied to a case of the liquid to-be-filtrated in which the concentration of the suspension substance is, at least, 100 mg/L. Besides, regarding a membranous filtration scheme, it is allowed to employ either a whole-quantity filtration scheme which performs the membranous filtration while enriching the liquid to-be-filtrated, or a cross flow scheme which performs the membranous filtration while generating the flows of the liquid to-be-filtrated in a membrane surface.

Besides, the separation membrane has the function of grasping the substance of, at least, a predetermined grain diameter as is contained in the liquid to-be-filtrated, in such a way that a pressure is applied to the liquid to-be-filtrated or that the liquid to-be-filtrated is imbibed from the penetration side. Depending upon the differences of such grasp grain diameters, the separation membrane is classified into a dynamic filtration membrane, a precision filtration membrane, an ultra filtration membrane, a nano filtration membrane, a reverse permeation membrane, etc. As the separation membrane for use in embodiments of the present invention, the dynamic filtration membrane, the precision filtration membrane or the ultra filtration membrane is preferable. Besides, regarding the shape of the separation membrane, a flat membrane, a hollow yarn membrane or the like is preferable, but the shape is not especially restricted.

The membranous filtration prediction method of embodiments of the present invention predicts the variation of the membranous filtration resistance with time and/or the variation of the transmembrane pressure with time, in the case where the membranous filtration is continued while controlling the membranous filtration flowrate as a set value. Alternatively, it predicts the variation of the membranous filtration resistance with time and/or the variation of the membranous filtration flowrate (flux) with time, in the case where the membranous filtration is continued while controlling the transmembrane pressure as a set value.

Herein, the "transmembrane pressure" is the pressure difference between the side of the liquid to-be-filtrated and the side of the penetrative liquid with respect to the separation membrane. As means for generating this pressure difference, there are 0.10 mentioned, for example, a method in which a pressure is applied to the liquid to-be-filtrated side by a pump, a method in which the liquid to-be-filtrated is imbibed from the penetrative liquid side by a pump, and a method in which the liquid head difference between the liquid to-be-filtrated side and the penetrative liquid side is utilized. Besides, the transmembrane pressure can be actually measured as the difference between a pressure measurement value on the liquid to-be-filtrated side of the separation membrane and a pressure measurement value on the penetrative liquid side. On this occasion, the transmembrane pressure should preferably be calculated in such a way that a pressure loss generated by a hydraulic flow is measured or calculated, and that the component of the pressure loss is subtracted from the difference between the pressure measurement value on the liquid to-be-filtrated side of the separation membrane and the pressure measurement value on the penetrative liquid side.

Besides, the "membranous filtration flowrate" is the flowrate of a membranous filtration liquid, and the "membranous filtration flux" signifies the membranous filtration flowrate per unit area of the separation membrane.

The expression "that the membranous filtration is continued while controlling the membranous filtration flowrate as a set value" or "that the membranous filtration is continued while controlling the transmembrane pressure as a set value" means to control the membranous filtration flowrate or the transmembrane pressure to a predetermined set value. This control contains, not only a method in which the membranous filtration flowrate or the transmembrane pressure is controlled so as to become a constant value, but also the case of altering the set value with time, such as a method in which the filtration is stopped regularly or intermittently, or a method in which the membranous filtration flowrate or the transmembrane pressure is changed continuously or intermittently. As a method in which the membranous filtration is continued while controlling the membranous filtration flowrate as the set value, there is mentioned, e.g., a method in which the membranous filtration liquid is acquired by disposing a suction pump or the like on the membranous penetration liquid side of the separation membrane, and in which the suction pump is controlled by a flowrate inverter. Besides, as a method in which the membranous filtration is continued while controlling the transmembrane pressure as a set value, there is mentioned, e.g., a method in which a pressure necessary for the membranous filtration is exerted by the expedient of applying the pressure to the liquid to-be-filtrated side of the separation membrane, the expedient of utilizing the liquid head difference, or the like, and in which the necessary pressure is controlled.

Besides, the "membranous filtration resistance" is a resistance which is generated in filtrating the liquid to-be-filtrated with the membrane, and it is generally defined by Formula (1):

[Formula 1]

$$R = \frac{\Delta P}{\mu \times J} \quad (1)$$

Here, ΔP denotes the transmembrane pressure [Pa], µ the viscosity [Pa·s] of the membranous filtration liquid, R the membranous filtration resistance [1/m], and J the membranous filtration flux [m/s].

Here, as µ, the viscosity of the membranous filtration liquid may be directly measured, but it may well be calculated from a temperature in conformity with Formula (2), in a case where the membranous filtration liquid is water or an aqueous solution containing some solute etc.

[Formula 2]

$$\mu \times 10^3 = F \times exp\{(1+BT)/(CT+DT^2)\} \quad (2)$$

Here, F=0.01257187, B=−0.005806436, C=0.001130911 and D=−0.000005723952 hold, and T denotes the absolute temperature [K]. More specifically, letting a temperature in Celsius be σ [° C.], the absolute temperature is represented as T=σ+273.15.

Besides, the "prediction" means to execute an operation or a computation by using an input numerical value (such as the time series value of the membranous filtration flowrate or the time series value of the transmembrane pressure, and to deliver an output numerical value (such as the temporal variation of the membranous filtration resistance).

Besides, in the membranous filtration prediction method of embodiments of the present invention, in the case where the membranous filtration is continued while controlling the membranous filtration flowrate (flux) to the set value, at least the set value of the membranous filtration flowrate (flux), the initial value of the membranous filtration resistance and the constituent component quantity values of the liquid to-be-filtrated are used as numerical values for membranous filtration prediction computations, and in the case where the membranous filtration is continued while controlling the transmembrane pressure to the set value, at least the set value of the transmembrane pressure, the initial value of the membranous filtration resistance and the constituent component quantity values of the liquid to-be-filtrated are used as numerical values for membranous filtration prediction computations.

Herein, the "initial value of the membranous filtration resistance" signifies a membranous filtration resistance value at the start of the membranous filtration. It may be the actually measured value of a membranous filtration resistance value at the time when pure water is percolated through the separation membrane, a membranous filtration resistance value after the wash of the separation membrane, or the like, or it may well be a virtual value based on the sort of the separation membrane.

Besides, the "constituent component quantity of the liquid to-be-filtrated" signify the substance quantity of a dissolved substance, a suspension substance, etc. contained in the constituent components of the liquid to-be-filtrated. They can be measured by, for example, a total organic carbon quantity (TOC), a chemical oxygen demand quantity (COD), a biochemical oxygen demand quantity (BOD), a mixed liquor suspended solid concentration (MLSS), a dry weight, and a mixed liquor volatile suspended solid quantity (MLVSS). The constituent component quantity value of the liquid to-be-filtrated may be either an actually measured value or a virtual value. Besides, the constituent component quantity value of the liquid to-be-filtrated or the temporal variation of the constituent component quantity value of the liquid to-be-filtrated may well be predicted using an existing simulation model such as an IWA active sludge model.

Besides, the "set value of the membranous filtration flowrate (flux)" is the set value of the membranous filtration flowrate or the membranous filtration flux. It may be either an actually measured value or a virtual value, and it may well be set at a constant value or a value varying continuously or intermittently. Besides, the "set value of the transmembrane pressure" is the set value of the transmembrane pressure. It may be either an actually measured value or a virtual value, and it may well be set at a constant value or a value varying continuously or intermittently.

Besides, with the membranous filtration prediction method of an embodiment of the present invention, in the case where the membranous filtration is continued while controlling the membranous filtration flowrate to the set value, at least a computation step 1a, a computation step 1b, a computation step 2 and/or a computation step 3 to be stated later are executed, thereby to find a membranous filtration resistance value and/or a transmembrane pressure value at any desired time, and in the case where the membranous filtration is continued while controlling the transmembrane pressure to the set value, at least the computation step 1a, the computation step 1b, the computation step 2 and/or a computation step 4 to be stated later are executed, thereby to find the membranous filtration resistance value and/or a membranous filtration flowrate (flux) value at any desired time.

In other words, it is meant that the following three sorts exist as the configurations of the computation steps of the membranous filtration prediction in the case where the membranous filtration is continued while controlling the membranous filtration flowrate to the set value:

(a1) Computation step 1a, computation step 1b, computation step 2 and computation step 3 to be stated later
(b1) Computation step 1a, computation step 1b and computation step 2 to be stated later
(c1) Computation step 1a, computation step 1b and computation step 3 to be stated later Herein, in the case (a1) (refer to FIG. 1), the membranous filtration resistance value and the transmembrane pressure value at any desired time can be found. In the case (b1), the membranous filtration resistance value at any desired time can be found. Besides, in the case (c1), the transmembrane pressure value at any desired time can be found.

Figure 4:
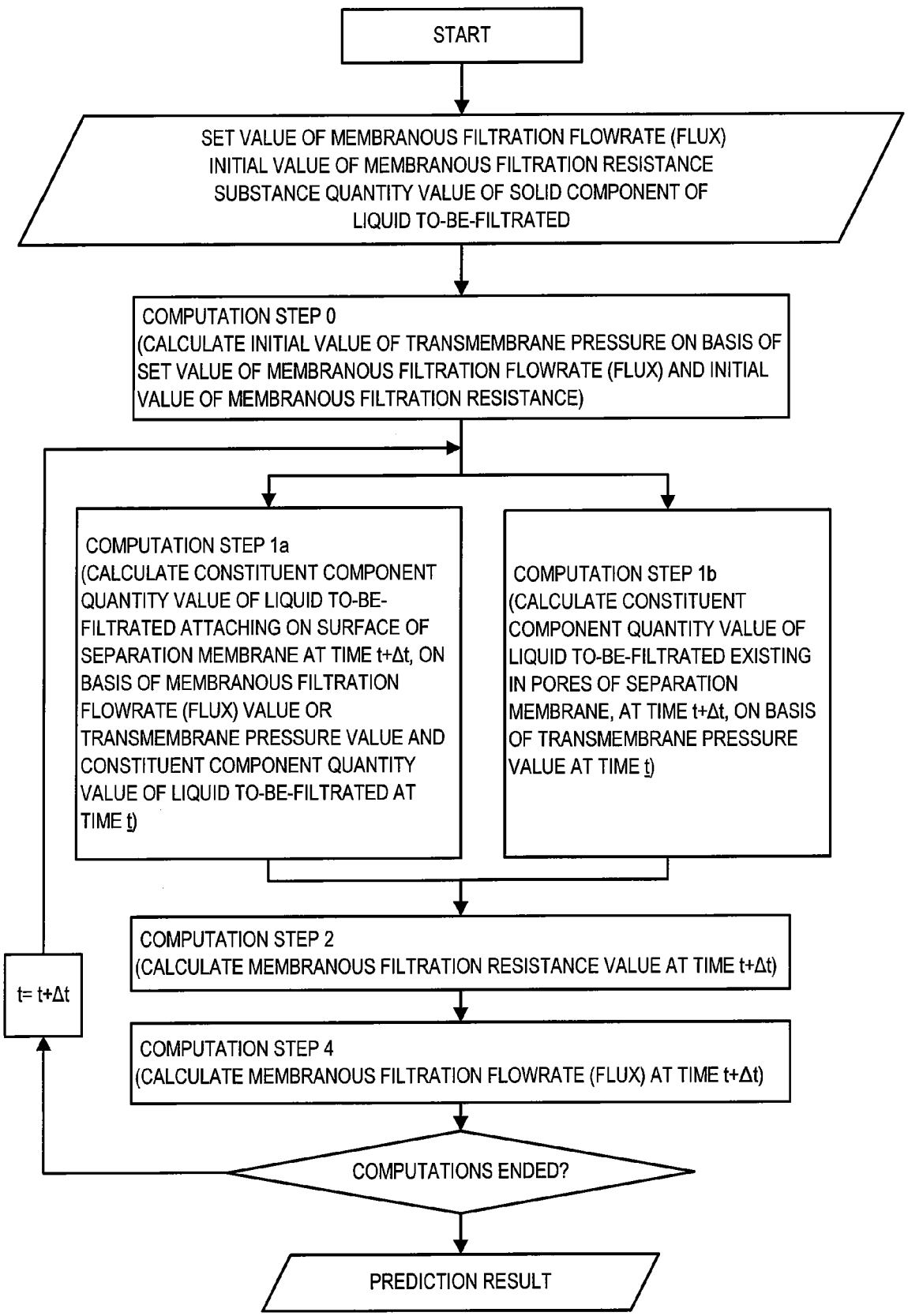
FIG. 4 It is another example of the flow chart of the prediction method of an embodiment of the present invention.

Besides, it is similarly meant that the following three sorts exist as the configurations of the computation steps of the membranous filtration prediction in the case where the membranous filtration is continued while controlling the transmembrane pressure to the set value:

(d1) Computation step 1a, computation step 1b, computation step 2 and computation step 4 to be stated later
(e1) Computation step 1a, computation step 1b and computation step 2 to be stated later
(f1) Computation step 1a, computation step 1b and computation step 4 to be stated later Herein, in the case (d1) (refer to FIG. 4), the membranous filtration resistance value and the membranous filtration flowrate (flux) value at any desired time can be found. In the case (e1), the membranous filtration resistance value at any desired time can be found. Besides, in the case (f1), the membranous filtration flowrate (flux) value at any desired time can be found.

Besides, with the membranous filtration prediction method of embodiments of the present invention, in the case where the membranous filtration is continued while controlling the membranous filtration flowrate to a set value, at least a computation step 1a, a computation step 1c, a computation step 2 and/or a computation step 3 to be stated later are executed, thereby to find the membranous filtration resistance value and/or the transmembrane pressure value at any desired time, and in the case where the membranous filtration is continued while controlling the transmembrane pressure to a set value, at least a computation step 1a, a computation step 1c, a computation step 2 and/or a computation step 4 to be stated later are executed, thereby to find the membranous filtration resistance value and/or the membranous filtration flowrate (flux) value at any desired time.

Figure 2:
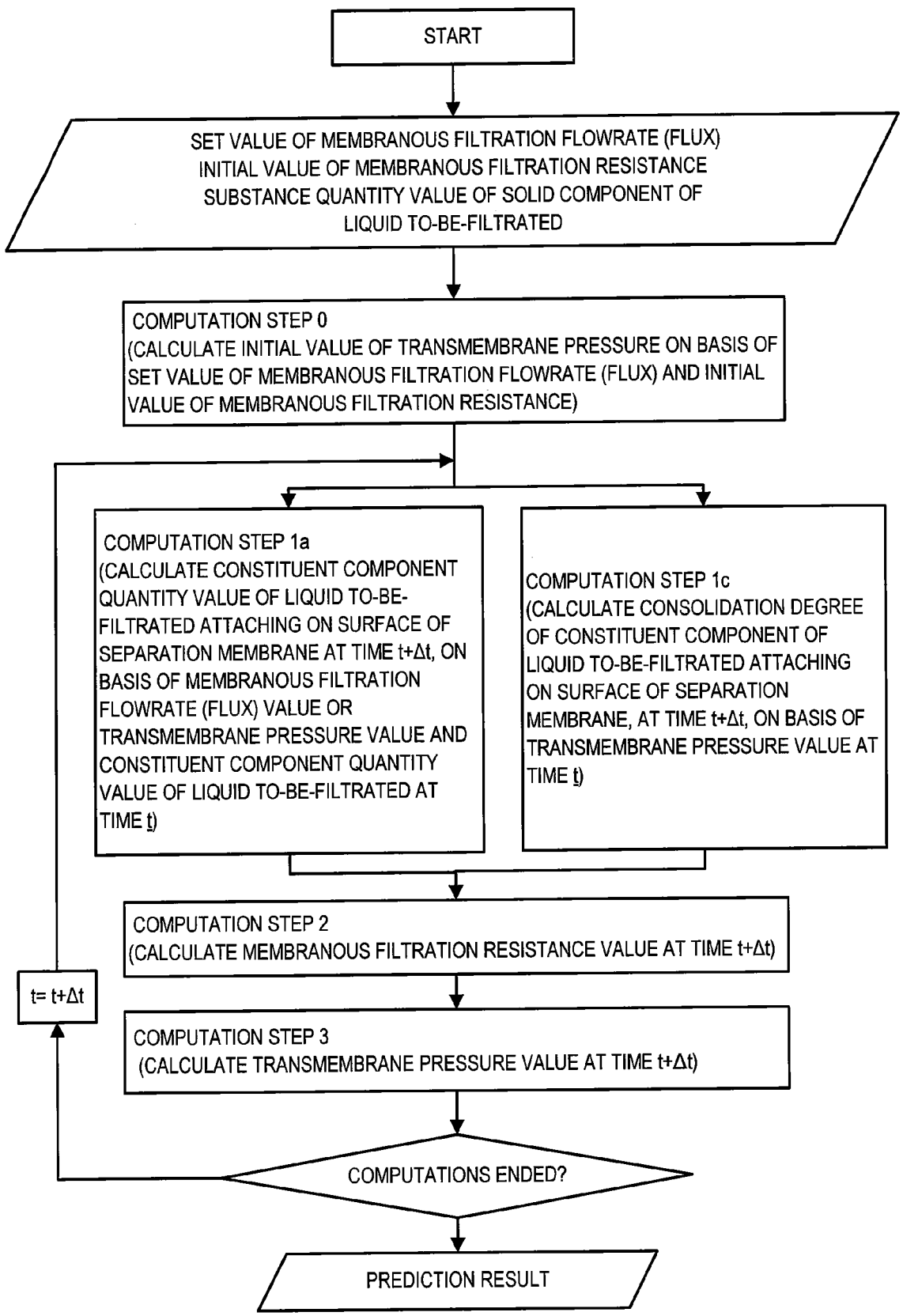
FIG. 2 It is another example of the flow chart of the prediction method of an embodiment of the present invention.

In other words, it is meant that the following three sorts exist as the configurations of the computation steps of the membranous filtration prediction in the case where the membranous filtration is continued while controlling the membranous filtration flowrate to the set value:

(a2) Computation step 1a, computation step 1c, computation step 2 and computation step 3 to be stated later
(b2) Computation step 1a, computation step 1c and computation step 2 to be stated later
(c2) Computation step 1a, computation step 1c and computation step 3 to be stated later Herein, the membranous filtration resistance value and the transmembrane pressure value at any desired time can be found in the case (a2) (refer to FIG. 2), the membranous filtration resistance value at any desired time can be found in the case (b2), and the transmembrane pressure value at any desired time can be found in the case (c2).

Besides, it is similarly meant that the following three sorts exist as the configurations of the computation steps of the membranous filtration prediction in the case where the membranous filtration is continued while controlling the transmembrane pressure to the set value:

(d2) Computation step 1a, computation step 1c, computation step 2 and computation step 4 to be stated later (e2) Computation step 1a, computation step 1c and computation step 2 to be stated later (f2) Computation step 1a, computation step 1c and computation step 4 to be stated later Herein, the membranous filtration resistance value and the membranous filtration flowrate (flux) value at any desired time can be found in the case (d2), the membranous filtration resistance value at any desired time can be found in the case (e2), and the membranous filtration flowrate (flux) value at any desired time can be found in the case (f2).

Besides, with the membranous filtration prediction method of embodiments of the present invention, in the case where the membranous filtration is continued while controlling the membranous filtration flowrate to a set value, at least a computation step 1a, a computation step 1b, a computation step 1c, a computation step 2 and/or a computation step 3 to be stated later are executed, thereby to find the membranous filtration resistance value and/or the transmembrane pressure value at any desired time, and in the case where the membranous filtration is continued while controlling the transmembrane pressure to a set value, at least a computation step 1a, a computation step 1b, a computation step 1c, a computation step 2 and/or a computation step 4 to be stated later are executed, thereby to find the membranous filtration resistance value and/or the membranous filtration flowrate (flux) value at any desired time.

Figure 3:
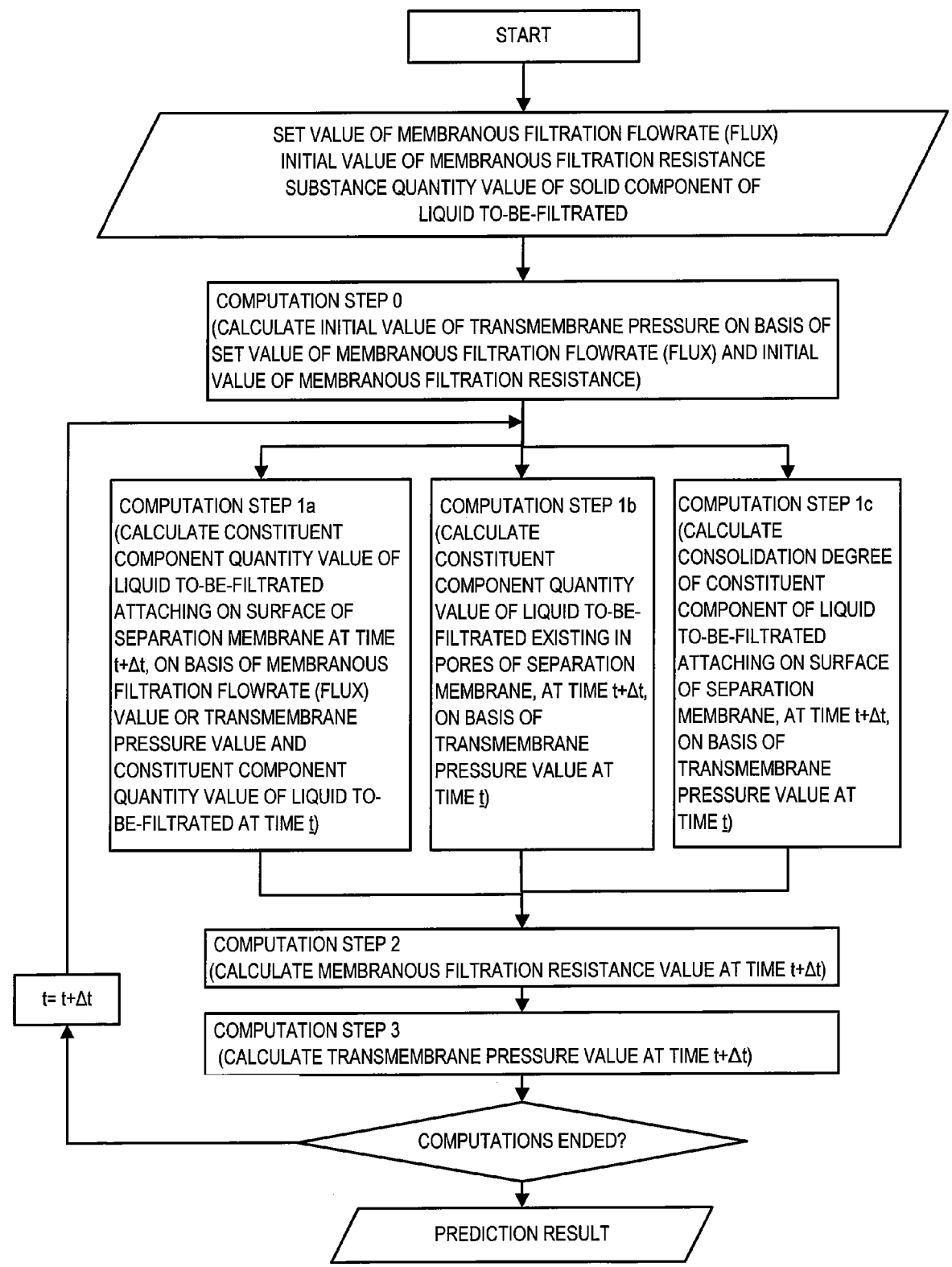
FIG. 3 It is another example of the flow chart of the prediction method of an embodiment of the present invention.

In other words, it is meant that the following three sorts exist as the configurations of the computation steps of the membranous filtration prediction in the case where the membranous filtration is continued while controlling the membranous filtration flowrate to the set value:

(a3) Computation step 1a, computation step 1b, computation step 1c, computation step 2 and computation step 3 to be stated later (b3) Computation step 1a, computation step 1b, computation step 1c and computation step 2 to be stated later (c3) Computation step 1a, computation step 1b, computation step 1c and computation step 3 to be stated later Herein, the membranous filtration resistance value and the transmembrane pressure value at any desired time can be found in the case (a3) (refer to FIG. 3), the membranous filtration resistance value at any desired time can be found in the case (b3), and the transmembrane pressure value at any desired time can be found in the case (c3).

Besides, it is similarly meant that the following three sorts exist as the configurations of the computation steps of the membranous filtration prediction in the case where the membranous filtration is continued while controlling the transmembrane pressure to a set value:

(d3) Computation step 1a, computation step 1b, computation step 1c, computation step 2 and computation step 4 to be stated later (e3) Computation step 1a, computation step 1b, computation step 1c and computation step 2 to be stated later (f3) Computation step 1a, computation step 1b, computation step 1c and computation step 4 to be stated later Herein, a membranous filtration resistance value and a membranous filtration flowrate (flux) value at any desired time can be found in the case (d3), the membranous filtration resistance value at any desired time can be found in the case (e3), and the membranous filtration flowrate (flux) value at any desired time can be found in the case (f3).

Here, the constituent component quantity value of the liquid to-be-filtrated which attaches on the surface of the separation membrane at any desired time is calculated at the computation step 1a.

Herein, the computation step 1a is a computation step for calculating the variation quantity within a predetermined time period, of the constituent component quantity of the liquid to-be-filtrated which attaches on the separation membrane surface. A computation formula at the computation step 1a includes the term of a rate at which the constituent component of the liquid to-be-filtrated attaches onto the separation membrane surface, and the term of a rate at which the constituent component of the liquid to-be-filtrated attaching on the separation membrane surface detaches from the separation membrane surface. The rate at which the constituent component attaches onto the separation membrane surface should preferably be calculated using the transmembrane pressure value or the membranous filtration flowrate (flux) value, the constituent component quantity value of the liquid to-be-filtrated and/or a membrane washing force value, while the rate at which the constituent component detaches from the separation membrane surface should preferably be calculated using the transmembrane pressure value or the membranous filtration flowrate (flux) value, and the constituent component quantity value of the liquid to-be-filtrated attaching on the separation membrane surface, and/or the consolidation degree of the constituent component of the liquid to-be-filtrated. Thus, the constituent component quantity value of the liquid to-be-filtrated attaching on the separation membrane surface at any desired time can be precisely predicted.

Here, the "consolidation degree of the constituent component of the liquid to-be-filtrated attaching on the separation membrane surface" signifies a degree to which the constituent component of the liquid to-be-filtrated attaching on the separation membrane surface is consolidated by the pressure applied to the constituent component. The constituent component quantity value of the liquid to-be-filtrated attaching on the separation membrane surface is computed using the consolidation degree, whereby the constituent component quantity value of the liquid to-be-filtrated attaching on the separation membrane surface can be predicted more precisely.

Besides, it is more preferable that the formula for obtaining the rate at which the constituent component of the liquid to-be-filtrated attaches onto the separation membrane surface includes the self-inhibition term of the membrane washing force value. The "self-inhibition term" stated here represents a term with which the membrane washing force value enlarges, whereby the rate at which the constituent component of the liquid to-be-filtrated attaches onto the separation membrane surface becomes smaller. Such a term is, for example, a term in which the membrane washing force value is located in a denominator, or a term which subtracts the membrane washing force value. When the self-inhibition term is not included, the rate at which the constituent component of the liquid to-be-filtrated attaches onto the separation membrane surface is often overestimated. In contrast, since the self-inhibition term is included, the extent of the attaching is lowered, and it can be reproduced more precisely.

Besides, it is more preferable that the formula for obtaining the rate at which the constituent component of the liquid to-be-filtrated attaching on the separation membrane surface detaches from the separation membrane surface includes the self-inhibition term of the transmembrane pressure value. The self-inhibition term stated here represents a term with which the transmembrane pressure value enlarges, whereby the rate at which the constituent component of the liquid to-be-filtrated attaching on the separation membrane surface detaches from the separation membrane surface becomes small. Such a term is, for example, a term in which the transmembrane pressure value is located in a denominator, or a term which subtracts the transmembrane pressure value. When the self-inhibition term is not included, the rate at which the constituent component of the liquid to-be-filtrated attaching on the separation membrane surface detaches from the separation membrane surface is often overestimated. In contrast, since the self-inhibition term is included, the extent of the separation is lowered, and it can be reproduced more precisely.

Besides, it is more preferable that the formula for obtaining the rate at which the constituent component of the liquid to-be-filtrated attaching on the separation membrane surface detaches from the separation membrane surface includes a term of the second-degree or higher-degree function of the constituent component quantity value of the liquid to-be-filtrated attaching on the separation membrane surface. When the function is less than the second degree, the rate at which the constituent component of the liquid to-be-filtrated attaching on the separation membrane surface detaches from the separation membrane surface becomes smaller than an actual rate in many cases. In contrast, since the function is of the second degree or higher degree, the extent of the separation is enlarged, and it can be reproduced more precisely.

Besides, it is more preferable that the formula for obtaining the rate at which the constituent component of the liquid to-be-filtrated attaching on the separation membrane surface detaches from the membrane surface includes a term based on the membrane washing force value. Here, the "membrane washing force" is a stress for separating any substance which attaches on the separation membrane surface. The value of the membrane washing force should preferably be the value of a shearing force appearing on the membrane surface, the value of the flow velocity of the liquid to-be-filtrated on the membrane surface, a value calculated on the basis of the shearing force or the flow velocity, or a value calculated on the basis of the power value of wash means (as the "power value of the wash means", by way of example, an exposure airflow or the output value of an exposure blower corresponds when the wash of the separation membrane is performed by exposing the separation membrane to the air from below, power for causing the circulation of the liquid to-be-filtrated corresponds when the wash of the separation membrane is performed by circulating the liquid to-be-filtrated (for example, the output value of a liquid pump in a case where the liquid to-be-filtrated is circulated by the liquid pump), a movement velocity or a power value for moving the separation membrane corresponds when the wash of the separation membrane is performed by moving the separation membrane (for example, a rotational velocity or the output value of a motor for generating the rotation of a rotary filtration membrane in case of the rotary filtration membrane), or the extent of vibrations (for example, a frequency) or a power value for the vibrations (for example, the output value of a motor) corresponds when the wash of the separation membrane is performed by vibrating the separation membrane). Alternatively, the value of the membrane washing force may well be calculated or presumed from the result of an actual membrane filtration test. Thus, an element which does not depend upon the performance of the separation membrane, such as the exposure thereof to the air, can be added as an element for determining the rate at which the constituent component of the liquid to-be-filtrated attaching on the separation membrane surface detaches from the separation membrane surface, whereby the running condition of the membranous filtration apparatus becomes easier to be reflected.

The following formula (3) or formula (4), for example, exists as a mathematical formula which satisfies such a condition, and in the present invention, it is preferred to conform to Formula (3) or Formula (4): The scope of the present invention, however, is not restricted to Formula (3) or Formula (4).

[Formula 3]

$$\frac{dX_c}{dt} = X \cdot J \cdot (1 - K_\tau \cdot \tau) - \gamma \cdot (\tau - \lambda \cdot \Delta P) \cdot \eta \cdot (D_{max} - D) \cdot X_c^2 \quad (3)$$

$$\frac{dX_c}{dt} = X \cdot J \cdot \frac{K_{\tau 1}}{K_{\tau 1} + \tau} - \gamma \cdot \tau \cdot \frac{K_{\tau 2}}{K_{\tau 2} + \Delta P} \cdot \eta \cdot (D_{max} - D) \cdot X_c^2 \quad (4)$$

where $(1-K_\tau \cdot \tau) \geqq 0$ and $(\tau - \lambda \cdot \Delta P) \geqq 0$ hold.

Here, "$X_c$" denotes the constituent component quantity value [gC/m$^2$] of the liquid to-be-filtrated attaching on the separation membrane surface, per unit membrane area, "t" the time [s], "X" the constituent component quantity value [gC/m$^3$] of the liquid to-be-filtrated, "J" the membranous filtration flux [m/d], "$K_\tau$" a membrane washing force hindrance coefficient [-], "$\gamma$" the separation coefficient [l/m/s] of the constituent component of the liquid to-be-filtrated, "$\tau$" the membrane washing force value [-], "$\lambda$" the friction coefficient [1/Pa] of the constituent component of the liquid to-be-filtrated, "$\Delta P$" the transmembrane pressure [Pa], "$\eta$" the inverse number [m$^3$/gC] of the density of the constituent component of the liquid to-be-filtrated, "$D_{max}$" the maximum pressure density [-] (which usually becomes "1"), "D" a pressure density [-], "$K_{\tau 1}$" a membrane washing force hindrance coefficient [-], and "$K_{\tau 2}$" a transmembrane pressure hindrance coefficient [Pa]. Besides, "gC" represents a carbon weight. Here, the first term of the right side of Formula (3) indicates the rate at which the constituent component of the liquid to-be-filtrated attaches onto the separation membrane surface, and the second term the rate at which the constituent component of the liquid to-be-filtrated detaches from the separation membrane surface. Besides, both the sides of Formula (3) are multiplied by the membrane area A, whereby the left side of Formula (3) can be converted into the variation quantity of the substance quantity contained in the constituent component attaching on the separation membrane surface, and the membranous filtration flux J of the right side into the membranous filtration flowrate Q. Besides, as will be stated later, in a case where the membrane washing force value $\tau$ is expressed as the function of the power value of the wash means, Formula (3) can be converted into a computation formula concerning the power value of the wash means, not the membrane washing force value, in such a way that the function is substituted into $\tau$.

Besides, as stated before, in the case where the variation quantity of the constituent component attaching on the separation membrane surface is based on the computation formula expressed as the difference between the rate at which the constituent component of the liquid to-be-filtrated attaches to the separation membrane and the rate at which it detaches therefrom, the computation formula can be expressed as a differential equation concerning the constituent component quantity value of the liquid to-be-filtrated attaching on the separation membrane. On that occasion, as integral methods for solving the differential equation, there are the Euler method, the Runge-Kutta method, the Runge-Kutta-Gill (RKG) method, etc.

Besides, at the computation step 1b, the constituent component quantity value of the liquid to-be-filtrated which exists in the separation membrane pores at any desired time is calculated.

Herein, the computation step 1b is a computation step for calculating the variation quantity in a predetermined time period, of the constituent component of the liquid to-be-filtrated which exists in the separation membrane pores. It is preferable that the value of the variation quantity is calculated on the basis of the transmembrane pressure value and/or the membranous filtration flowrate (flux) and/or the value of the constituent component quantity attaching on the separation membrane surface and/or the value of the constituent component quantity of the liquid to-be-filtrated existing in the separation membrane pores. Thus, the constituent component quantity value of the liquid to-be-filtrated which exists in the separation membrane pores at any desired time can be precisely predicted.

Besides, it is more preferable that the computation formula at the computation step 1b includes the self-inhibition term of the constituent component quantity value of the liquid to-be-filtrated which exists in the separation membrane pores. The self-inhibition term stated here represents a term with which the constituent component quantity value of the liquid to-be-filtrated existing in the separation membrane pores enlarges, whereby the variation quantity in the predetermined time period, of the constituent component of the liquid to-be-filtrated existing in the separation membrane pores becomes small. Such a term is, for example, a term in which the constituent component quantity value of the liquid to-be-filtrated existing in the separation membrane pores is located in a denominator, or a term which subtracts the constituent component quantity value of the liquid to-be-filtrated existing in the separation membrane pores. When the self-inhibition term is not included, the variation quantity in the predetermined time period, of the constituent component of the liquid to-be-filtrated existing in the separation membrane pores is often overestimated. In contrast, since the self-inhibition term is included, the variation quantity is made small, and it can be reproduced more precisely.

The following formula (5), formula (6) or formula (7), for example, exists as a mathematical formula which satisfies such a condition, and in the present invention, it is preferred to conform to Formula (5), Formula (6) or Formula (7): The scope of the present invention, however, is not restricted to Formula (5), Formula (6) or Formula (7).

[Formula 4]

$$\frac{dX_f}{dt} = \varphi \cdot (1 - \varepsilon \cdot X_f^2) \cdot \Delta P \qquad (5)$$

$$\frac{dX_f}{dt} = \varphi \cdot \frac{K_f}{K_f + K_f^{2/3}} \cdot X_c^2 \cdot \Delta P \qquad (6)$$

$$\frac{dX_f}{dt} = \varphi \cdot \frac{K_f}{K_f + K_f^{2/3}} \cdot X_c^2 \cdot J \qquad (7)$$

Here, "$X_f$" denotes the constituent component quantity value [$gC/m^2$] of the liquid to-be-filtrated existing in the separation membrane pores, "$\varphi$" denotes the coefficient [$gC/m^2/Pa/s$] of a substance migration rate into the separation membrane pores, "$\varepsilon$" denotes the coefficient [$m^4/gC^2$] of substance migration inhibition into the separation membrane pores, and "$K_f$" also denotes the coefficient [$gC^{2/3}/m^{4/3}$] of the substance migration inhibition into the separation membrane pores.

Besides, at the computation step 1c, the consolidation degree of the constituent component of the liquid to-be-filtrated attaching on the separation membrane surface at any desired time is calculated.

Herein, the computation step 1c is a computation step for calculating the variation quantity in a predetermined time period, of the consolidation degree of the constituent component of the liquid to-be-filtrated which attaches on the separation membrane surface. It is preferable that the value of the variation quantity is calculated on the basis of the value of the pressure applied to the constituent component attaching on the separation membrane surface, and/or the value of the consolidation degree of the constituent component of the liquid to-be-filtrated attaching on the separation membrane. Thus, the consolidation degree of the constituent component of the liquid to-be-filtrated which attaches on the separation membrane surface at any desired time can be precisely predicted. Herein, as the pressure applied to the constituent component attaching on the separation membrane surface, a pressure value which comes from the constituent component attaching on the separation membrane surface may be used, or the transmembrane pressure value may well be used.

The following formula (8), for example, exists as a mathematical formula which satisfies such a condition, and in the present invention, it is preferred to conform to Formula (8): The scope of the present invention, however, is not restricted to Formula (8).

[Formula 5]

$$\frac{dD}{dt} = k_1 \cdot (D_{max} - D) \cdot \Delta P_c \qquad (8)$$

Here, "D" denotes the consolidation degree [–], "$k_1$" denotes a consolidation degree rate constant [$1/(Pa/s)$], "$D_{max}$" denotes the maximum consolidation degree [–] (which usually becomes "1"), and "$\Delta P_c$" denotes a pressure value [Pa] which comes from the constituent component attaching on the separation membrane surface.

Besides, at the computation step 2, the membranous filtration resistance value at any desired time is calculated using the constituent component quantity value of the liquid to-be-filtrated attaching on the separation membrane as has been obtained at the computation step 1a, and/or the constituent component quantity value of the liquid to-be-filtrated existing in the separation membrane pores as has been obtained at the computation step 1b, and/or the consolidation degree of the constituent component of the liquid to-be-filtrated attaching on the separation membrane as has been obtained at the computation step 1c.

Herein, it is preferable at the computation step 2 that the membranous filtration resistance value at any desired time is calculated on the basis of the value of the pressure applied to the constituent component attaching on the separation membrane surface, and/or that it includes the higher-degree equation of the first-second degree equation of the constituent component quantity value of the liquid to-be-filtrated existing in the separation membrane pores. Thus, the membranous filtration resistance value at any desired time can be predicted more precisely. Herein, as the pressure applied to the constituent component attaching on the separation membrane surface, a pressure value which comes from the constituent component attaching on the separation membrane surface may be used, or the transmembrane pressure value may well be used.

The following formulas (9)-(11), for example, exist as mathematical formulas which satisfy such a condition, and in the present invention, it is preferred to conform to Formulas (9)-(11): The scope of the present invention, however, is not restricted to Formulas (9)-(11).

[Formula 6]

$$R_c = \alpha(1 + a \cdot \Delta P_c) \cdot X_c \quad (9)$$

$$R_f = \beta \cdot X_f^{1.5} \quad (10)$$

$$R = R_m + R_c + R_f \quad (11)$$

Here, "$R_c$" denotes the membranous filtration resistance [l/m] which comes from the constituent component attaching on the separation membrane surface, "a" denotes the generation quantity [m/gC] of the membranous filtration resistance of the quantity value $X_c$, per unit quantity, "a" denotes the pressure sensitivity coefficient [m/gC/Pa] of the generation quantity $\alpha$, "$R_f$" denotes the membranous filtration resistance [l/m] which comes from the constituent component existing in the separation membrane pores, "p" denotes the generation quantity [m²/gC^{1.5}] of the membranous filtration resistance of the quantity value $X_f$, per unit quantity, "R" denotes the membranous filtration resistance [l/m], and "$R_m$" denotes the initial value [l/m] of the membranous filtration resistance.

Besides, it is preferable that the constituent component of the liquid to-be-filtrated attaching on the separation membrane surface is defined as forming a hierarchic structure, and that the computation step 1c includes the following computation step 1c-1 and computation step 1c-2:

(Computation step 1c-1) The number of layers n of the constituent component of the liquid to-be-filtrated attaching on the separation membrane surface at any desired time is calculated on the basis of the constituent component quantity value of the liquid to-be-filtrated attaching on the separation membrane as has been obtained by the computation step 1a.

(Computation step 1c-2) At any desired time, the consolidation degree of the constituent component of the liquid to-be-filtrated of the ith layer attaching on the separation membrane surface (here, i denotes any natural number of 1 through n, and the first layer is the nearest to the separation membrane, whereas the nth layer is the remotest from the separation membrane) is calculated.

Thus, the constituent component quantity value and the membranous filtration resistance value of the liquid to-be-filtrated attaching on the separation membrane surface can be predicted more precisely.

Herein, the computation step 1a is a computation step for calculating the variation quantity in a predetermined time period, of the constituent component quantity of the liquid to-be-filtrated attaching on the separation membrane surface. It is preferable that a computation formula at the computation step 1a includes the term of a rate at which the constituent component of the liquid to-be-filtrated attaches onto the separation membrane surface, and the term of a rate at which the constituent component of the liquid to-be-filtrated attaching on the separation membrane surface detaches from the separation membrane surface, and that the rate at which the constituent component attaches onto the separation membrane surface is calculated using the transmembrane pressure value or the membranous filtration flowrate (flux) value, and the constituent component quantity value and/or the membrane washing force value of the liquid to-be-filtrated, while the rate at which the constituent component detaches from the separation membrane surface is calculated using the transmembrane pressure value or the membranous filtration flowrate (flux) value, the constituent component quantity value of the liquid to-be-filtrated of any of the first layer through the nth layer as attaches on the separation membrane surface, and/or the consolidation degree of the constituent component of the liquid to-be-filtrated of any of the first layer through the nth layer. Thus, the constituent component quantity value of the liquid to-be-filtrated attaching on the separation membrane surface at any desired time can be precisely predicted.

Besides, it is more preferable that the formula for obtaining the rate at which the constituent component of the liquid to-be-filtrated attaches onto the separation membrane surface includes the self-inhibition term of the membrane washing force value. The "self-inhibition term" stated here represents a term with which the membrane washing force value enlarges, whereby the rate at which the constituent component of the liquid to-be-filtrated attaches onto the separation membrane surface becomes smaller. Such a term is, for example, a term in which the membrane washing force value is located in a denominator, or a term which subtracts the membrane washing force value. When the self-inhibition term is not included, the rate at which the constituent component of the liquid to-be-filtrated attaches onto the separation membrane surface is often overestimated. In contrast, since the self-inhibition term is included, the extent of the attaching is lowered, and it can be reproduced more precisely.

Besides, it is more preferable that the formula for obtaining the rate at which the constituent component of the liquid to-be-filtrated detaches from the separation membrane surface includes the self-inhibition term of the transmembrane pressure value. The self-inhibition term stated here represents a term with which the transmembrane pressure value enlarges, whereby the rate at which the constituent component of the liquid to-be-filtrated attaching on the separation membrane surface detaches from the separation membrane surface becomes small. Such a term is, for example, a term in which the transmembrane pressure value is located in a denominator, or a term which subtracts the transmembrane pressure value. When the self-inhibition term is not included, the rate at which the constituent component of the liquid to-be-filtrated attaching on the separation membrane surface detaches from the separation membrane surface is often overestimated. In contrast, since the self-inhibition term is included, the extent of the separation is lowered, and it can be reproduced more precisely.

Besides, at the computation step 1a, it is more preferable that the formula for obtaining the rate at which the constituent component of the liquid to-be-filtrated attaching on the separation membrane surface detaches from the separation membrane surface includes a term of the second-degree or higher-degree function of the solid component substance quantity value of the liquid to-be-filtrated of any of the first layer through the nth layer attaching on the separation membrane surface. Thus, the constituent component quantity value of the liquid to-be-filtrated attaching on the separation membrane surface at any desired time can be predicted more precisely.

The following formulas (12)-(14), for example, exist as mathematical formulas which satisfy such a condition, and in the present invention, it is preferred to conform to Formulas (12)-(14): The scope of the present invention, however, is not restricted to Formulas (12)-(14).

[Formula 7]

$$\frac{dX_c}{dt} = X \cdot J \cdot (1 - K_\tau \cdot \tau) - (1 - D_i) \cdot \gamma \cdot (\tau - \lambda \cdot \Delta P) \cdot \eta \cdot \left(\sum_{i=1}^{n}((D_{max} - D_i) \cdot X_{c,i})\right)^2 \quad (12)$$

$$\frac{dX_c}{dt} = X \cdot J \cdot \frac{K_{\tau 1}}{K_{\tau 1} + \tau} - (1 - D_i) \cdot \gamma \cdot \tau \cdot \frac{K_{\tau 2}}{K_{\tau 2} + \Delta P} \cdot \eta \cdot \left(\sum_{i=1}^{n}((D_{max} - D_i) \cdot X_{c,i})\right)^2 \quad (13)$$

$$n = \frac{X_c}{X_{c,i}} \quad (14)$$

Here, "n" denotes the number of hierarchic layers [–] of the constituent component of the liquid to-be-filtrated attaching on the separation membrane surface, "$\gamma_n$" denotes the separation coefficient [l/m/s] of the nth layer attaching on the separation membrane surface, "$D_i$" denotes the consolidation degree [–] of the constituent component of the liquid to-be-filtrated of the ith layer attaching on the separation membrane surface, and "$X_{c,i}$" denotes the constituent component quantity value [gC/m²] per hierarchic layer of the liquid to-be-filtrated attaching on the separation membrane surface.

Besides, at the computation step 1c-2, the consolidation degree of the constituent component of the liquid to-be-filtrated of the ith layer attaching on the separation membrane surface at any desired time is calculated.

Herein, it is preferable that a computation formula at the computation step 1c includes a computation step for calculating the variation quantity in a predetermined time period, of the consolidation degree of the constituent component of the liquid to-be-filtrated of the ith layer attaching on the separation membrane surface, and that the value of the variation quantity is calculated on the basis of the pressure applied to the constituent component attaching on the separation membrane surface, and/or the value of the consolidation degree of the constituent component of the liquid to-be-filtrated of the ith layer attaching on the separation membrane. Thus, the consolidation degree of the constituent component of the liquid to-be-filtrated of the ith layer attaching on the separation membrane surface can be predicted more precisely. Herein, as the pressure applied to the constituent component attaching on the separation membrane surface, a pressure value which comes from the constituent component attaching on the separation membrane surface may be used, or the transmembrane pressure value may well be used.

The following formula (15), for example, exists as a mathematical formula which satisfies such a condition, and in the present invention, it is preferred to conform to Formula (15): The scope of the present invention, however, is not restricted to Formula (15).

[Formula 8]

$$\frac{dD_i}{dt} = k_1 \cdot (D_{max} - D_i) \cdot \Delta P_c \quad (15)$$

Besides, it is preferable that the computation step 2 is replaced with the following computation step 2': Thus, the membranous filtration resistance value at any desired time can be predicted more precisely.

(Computation step 2') A membranous filtration resistance value at a time (t+Δt) is calculated on the basis of the constituent component quantity value of the liquid to-be-filtrated existing in the separation membrane pores and the constituent component quantity value of the liquid to-be-filtrated of the ith layer attaching on the separation membrane surface as have been obtained at the computation step 1b, and/or the consolidation degree of the constituent component of the liquid to-be-filtrated of the ith layer attaching on the separation membrane surface as has been obtained at the computation step 1c.

The following formulas (16)-(18), for example, exist as mathematical formulas which satisfy such a condition, and in the present invention, it is preferred to conform to Formulas (16)-(18): The scope of the present invention, however, is not restricted to Formulas (16)-(18).

[Formula 9]

$$R_c = \sum_{i=1}^{n}((1 + k_2 \cdot D_i) \cdot \alpha \cdot (1 + a \cdot \Delta P_c) \cdot X_{c,i}) \quad (16)$$

$$R_f = \beta \cdot X_f^{1.5} \quad (17)$$

$$R = R_m + R_c + R_f \quad (18)$$

Here, "$k_2$" denotes a consolidation effect constant [–].

Besides, at the computation step 3, the transmembrane pressure value at any desired time is calculated using the constituent component quantity value of the liquid to-be-filtrated attaching on the separation membrane as has been obtained at the computation step 1a, and/or the constituent component quantity value of the liquid to-be-filtrated existing in the separation membrane pores as has been obtained at the computation step 1b, and/or the consolidation degree of the constituent component of the liquid to-be-filtrated attaching on the separation membrane as has been obtained at the computation step 1c, or using the membranous filtration resistance value as has been obtained at the computation step 2 or the computation step 2'.

Herein, in a case where the membranous filtration prediction is configured of the item (c) (that is, the computation step 1a and/or the computation step 1b and/or the computation step 1c and the computation step 3), the transmembrane pressure value at any desired time is calculated using the constituent component quantity value of the liquid to-be-filtrated attaching on the separation membrane as has been obtained at the computation step 1a, and/or the constituent component quantity value of the liquid to-be-filtrated existing in the separation membrane pores as has been obtained at the computation step 1b, and/or the consolidation degree of the constituent component of the liquid to-be-filtrated attaching on the separation membrane as has been obtained at the computation step 1c. A method therefor is, for example, to employ a mathematical formula which is obtained in such a way that Formulas (16) and (17) are substituted into Formula (18) and that the result is further substituted into Formula (1). Besides, in a case where the membranous filtration prediction is configured of the item (a) (that is, the computation step 1a and/or the computation step 1b and/or the computation step 1c and the computation step 2 and the computation step 3), the transmembrane pressure value at any desired time is calculated using the membranous filtration resistance value obtained at the computation step 2. As a method therefor, it is preferable to employ and compute Formula (1) or a mathematical formula based thereon.

Besides, in a case where the membranous filtration prediction is configured of the item (c) (that is, the computation step 1a and/or the computation step 1b and/or the computation step 1c and the computation step 3), the pressure value ($\Delta P_c$ mentioned above) which comes from the constituent component attaching on the separation membrane surface is found by employing, for example, a mathematical formula which is obtained by substituting Formula (16) into the following formula (19): Besides, in a case where the membranous filtration prediction is configured of the item (a) (that is, the computation step 1a and/or the computation step 1b and/or the computation step 1c and the computation step 2 and the computation step 3), it is preferable to employ and compute Formula (19) or a mathematical formula based thereon.

[Formula 10]

$$\Delta P_c = \mu \cdot J \cdot R_c \quad (19)$$

Besides, at the computation step 4, the membranous filtration flowrate (flux) value at any desired time is calculated using the constituent component quantity value of the liquid to-be-filtrated attaching on the separation membrane as has been obtained at the computation step 1a, and/or the constituent component quantity value of the liquid to-be-filtrated existing in the separation membrane pores as has been obtained at the computation step 1b, and/or the consolidation degree of the constituent component of the liquid to-be-filtrated attaching on the separation membrane as has been obtained at the computation step 1c, or using the membranous filtration resistance value obtained at the computation step 2 or the computation step 2'.

Herein, in a case where the membranous filtration prediction is configured of the item (f) (that is, the computation step 1a and/or the computation step 1b and/or the computation step 1c and the computation step 4), the membranous filtration flowrate (flux) value at any desired time is calculated using the constituent component quantity value of the liquid to-be-filtrated attaching on the separation membrane as has been obtained at the computation step 1a, and/or the constituent component quantity value of the liquid to-be-filtrated existing in the separation membrane pores as has been obtained at the computation step 1b, and/or the consolidation degree of the constituent component of the liquid to-be-filtrated attaching on the separation membrane as has been obtained at the computation step 1c. A method therefor is, for example, to employ a mathematical formula which is obtained in such a way that Formulas (16) and (17) are substituted into Formula (18) and that the result is further substituted into Formula (1). Besides, in a case where the membranous filtration prediction is configured of the item (d) (that is, the computation step 1a and/or the computation step 1b and/or the computation step 1c and the computation step 2 and the computation step 4), the membranous filtration flowrate (flux) value at any desired time is calculated using the membranous filtration resistance value obtained at the computation step 2. As a method therefor, it is preferable to employ and compute Formula (1) or a mathematical formula based thereon.

Besides, in a case where the membranous filtration prediction is configured of the item (f) (that is, the computation step 1a and/or the computation step 1b and/or the computation step 1c and the computation step 4), the pressure value ($\Delta P_c$ mentioned above) which comes from the constituent component attaching on the separation membrane surface is found by employing, for example, a mathematical formula which is obtained by substituting Formula (16) into Formula (19). Besides, in a case where the membranous filtration prediction is configured of the item (d) (that is, the computation step 1a and/or the computation step 1b and/or the computation step 1c and the computation step 2 and the computation step 3), it is preferable to employ and compute Formula (19) or a mathematical formula based thereon.

In embodiments of the present invention, the computation steps are repeatedly executed while updating the time, whereby in the case of performing the membranous filtration prediction in continuing the membranous filtration while controlling the membranous filtration flowrate to the set value, the variation of the membranous filtration resistance with time and/or the variation of the transmembrane pressure with time are/is obtained, and in the case of performing the membranous filtration prediction in continuing the membranous filtration while controlling the transmembrane pressure to the set value, the variation of the membranous filtration resistance with time and/or the variation of the membranous filtration flowrate (flux) with time are/is obtained.

Besides, the computation step 1a, the computation step 1b, the computation step 1c, the computation step 2, the computation step 3 and the computation step 4 are computed in conformity with the predetermined computation formulas. In these computation formulas, parameters which are other than the values, data and substance quantities stated in the explanations of the individual computation steps are sometimes included. In such cases, the values of the parameters are preferably determined in executing the computations at the individual computation steps. In the present invention, methods for determining the values of the parameters are not especially restricted. It is preferable, however, that the liquid to-be-filtrated is actually filtrated by employing a separation membrane having the same material and shape as those of the separation membrane of the membranous filtration apparatus, that the variations of the value of the transmembrane pressure, the value of the membranous filtration flux or membranous filtration flowrate, and the value of the membranous filtration resistance on that occasion are actually measured or calculated, and that the parameters are presumed or determined on the basis of the results. This is because the parameters as stated above contain a large number of ones which are determined by the properties of the liquid to-be-filtrated and the separation membrane used, and the prediction can be precisely done in accordance with the method for presuming or determining the parameters as stated above.

Next, the membranous filtration prediction program of an embodiment of the present invention will be described.

Now, an example for carrying out the membranous filtration prediction program of an embodiment of the present invention will be described with reference to the drawings.

Figure 5:
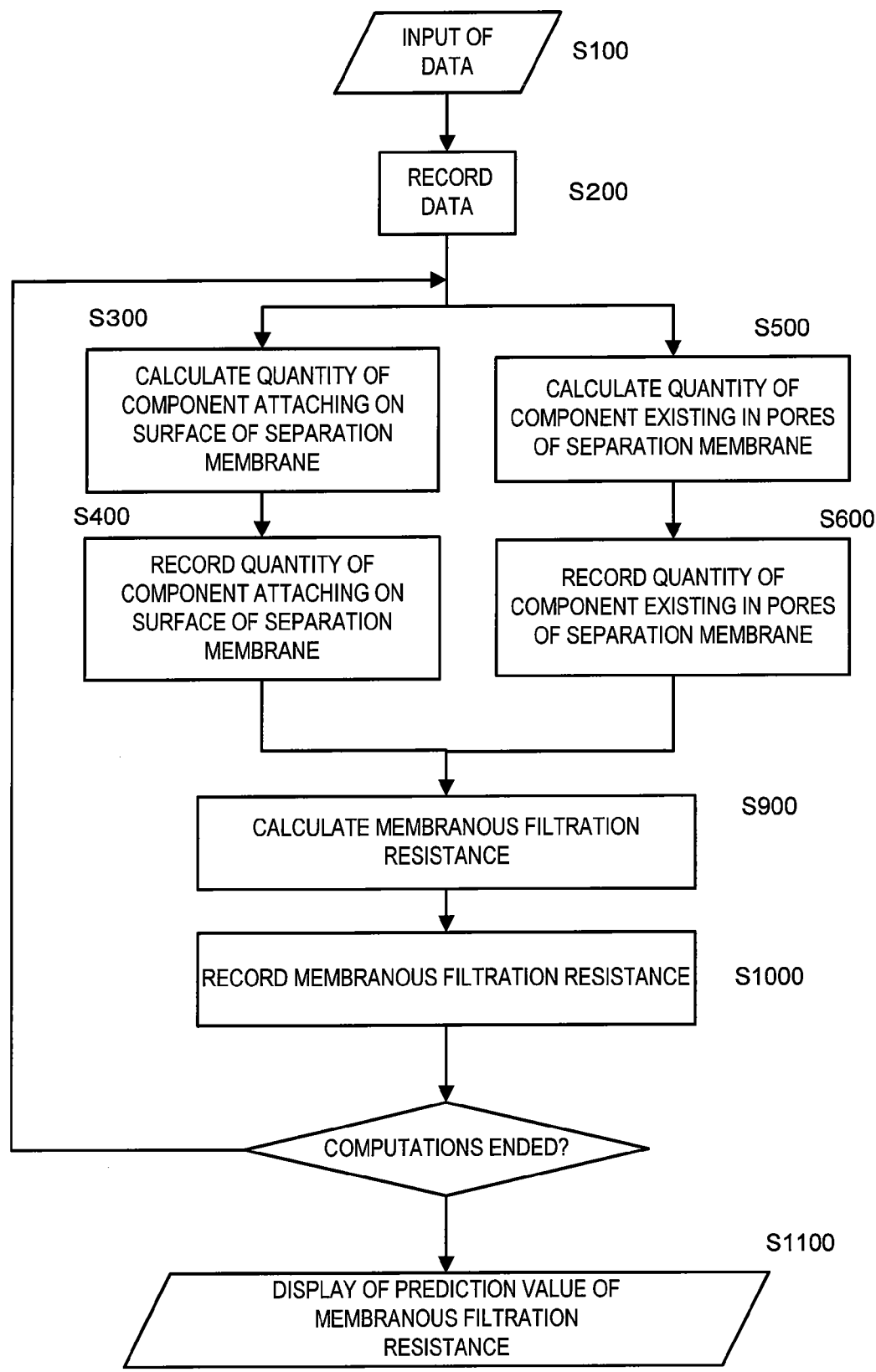
FIG. 5 It is an example of a flow chart of the membranous filtration prediction program of an embodiment of the present invention.
Figure 6:
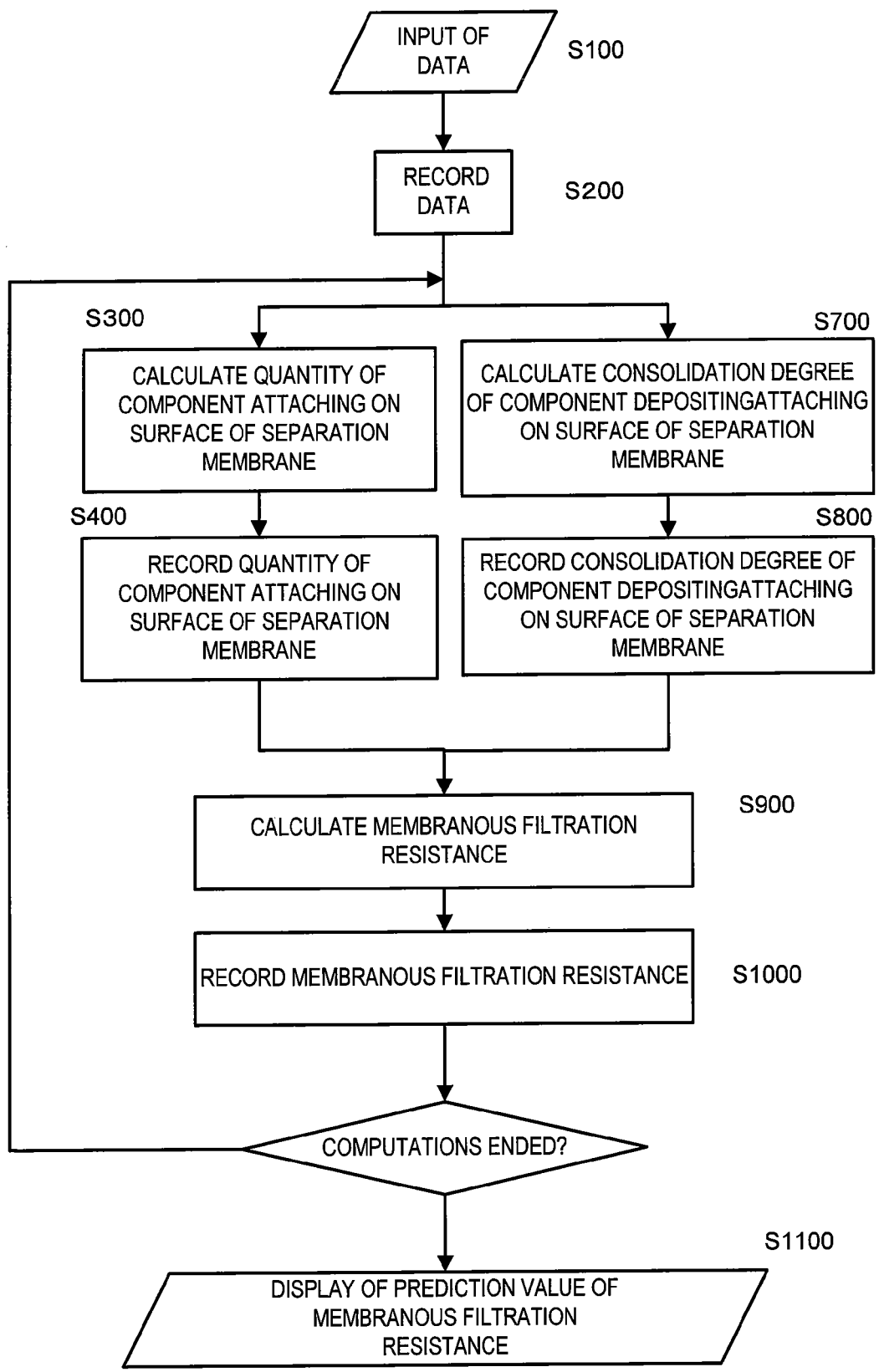
FIG. 6 It is another example of the flow chart of the membranous filtration prediction program of an embodiment of the present invention.
Figure 7:
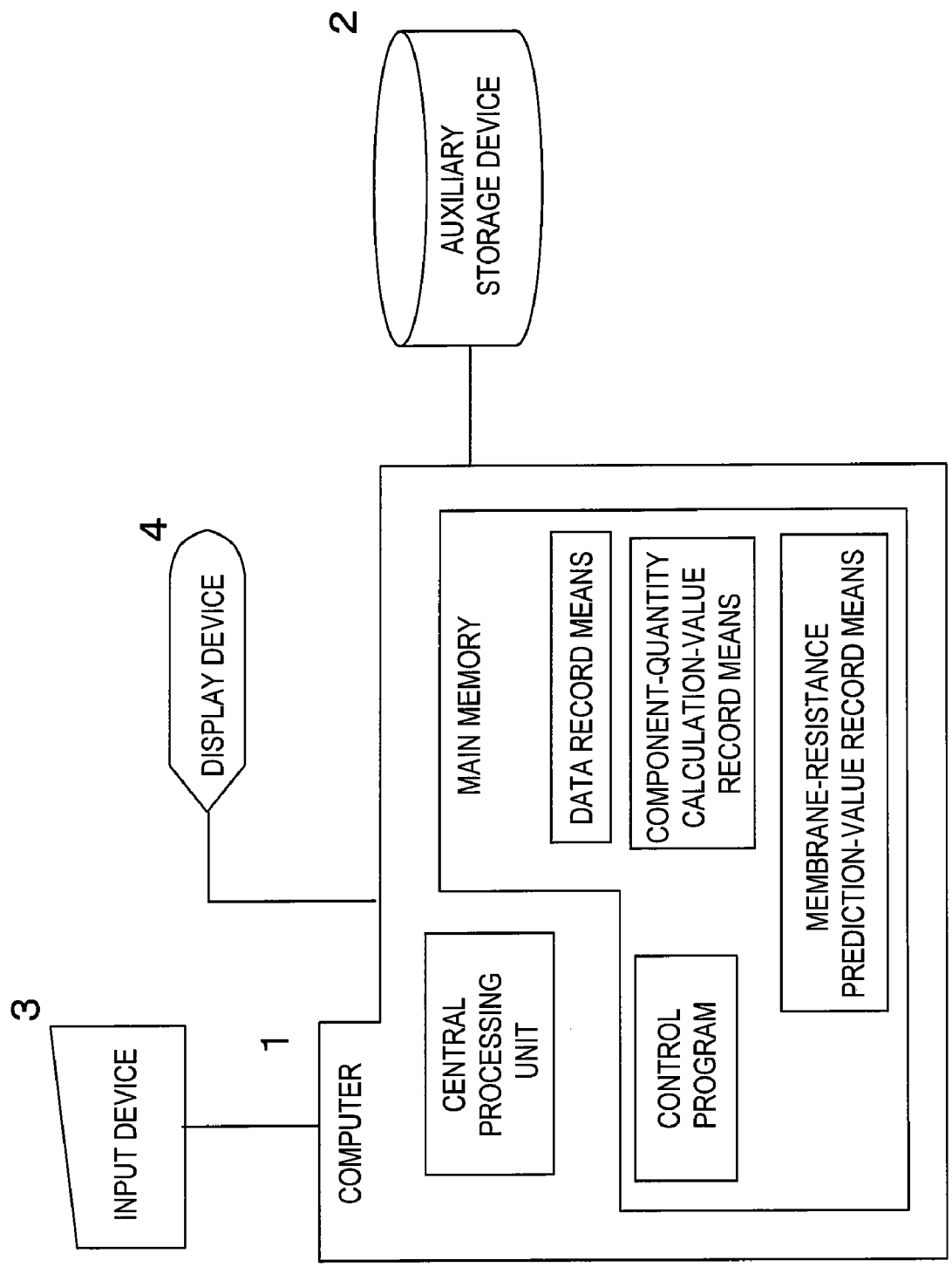
FIG. 7 It is a block diagram showing a hardware configuration in an example of the membranous filtration resistance prediction apparatus of an embodiment of the present invention.

FIGS. 5 and 6 exemplify processing flows which are executed by the membranous filtration prediction program of an embodiment of the present invention, and FIG. 7 shows an example of the configuration of the membranous filtration prediction apparatus in which that membranous filtration prediction program is installed. This membranous filtration prediction apparatus is configured of a computer 1 to which an auxiliary storage device 2, an input device 3 and a display device 4 are connected, and a control program is stored in the main memory of the computer.

First, in a case where the temporal variation of a membranous filtration resistance value and/or the temporal variation of a membranous filtration flowrate (flux) value as varies with time are/is predicted in continuing the membranous filtration while controlling a transmembrane pressure to a set value, the time series value of the transmembrane pressure, the time series value of the constituent component quantity of a liquid to-be-filtrated, the time series value of a membrane washing force, the initial value of the constituent component quantity of the liquid to-be-filtrated attaching on the surface of a separation membrane, and/or the initial value of the constituent component quantity of the liquid to-be-filtrated existing in the pores of the separation membrane, and/or the initial value of the consolidation degree of the constituent component of the liquid to-be-filtrated attaching on the separation membrane surface, and the initial value of a membranous filtration resistance are inputted from the input device 3 (data input means: step S100) and are stored in the main memory of the computer 1 (data record means: step S200).

Besides, in a case where the constituent component quantity of the liquid to-be-filtrated varies in time series, as in case of performing membranous filtration of the whole-quantity filtration type, it is preferable that the constituent component quantity of the liquid to-be-filtrated at any desired time as has been separately computed is occasionally recorded in the main memory. In a case where the temporal variation of the membranous filtration resistance value, and/or the temporal variation of the transmembrane pressure value varying with time are predicted in continuing the membranous filtration while controlling the membranous filtration flowrate (flux) to the set value, the temporal variations can be predicted in such a way that the values to be inputted at the step S100 and the values to be stored at the step S200 are made the time series values of the membranous filtration flowrate (flux) instead of those of the transmembrane pressure.

The values mentioned above may be respectively inputted individually by the input device such as a keyboard, or may well be inputted as a data file prepared beforehand. Here, the "time series values" signify a data set in which certain times and data at those times form pairs. By way of example, when "ti" (where $1 \leq i \leq n$ holds, and n denotes the number of data) represents the time, and "di" represents the data at the time ti, the set of the data is assumed to be represented as (t1, d1), (t2, d2), and (tn, dn). Here, assuming $t_{i+1} - ti = \Delta ti$, $\Delta ti$ is not always constant, but the time series values can be generated so as to make $\Delta ti$ constant, by properly complementing data through extrapolations or interpolations. Here, in a case where i=0 through n holds, $t_{i+1} = ti + \Delta ti$ holds, $t0 = 0$ holds, n denotes a natural number representing the number of graduations, and $\Delta ti$ is made constant by properly complementing data through extrapolations or interpolations, $\Delta ti = tn/n$ holds.

Besides, in the membranous filtration prediction program, in the case of the prediction in continuing the membranous filtration while controlling the transmembrane pressure to the set value, it is included that at least means for calculating a component quantity attaching on the separation membrane surface, and means for calculating the component quantity existing in the separation membrane pores and means for calculating the membranous filtration resistance, and/or means for calculating the membranous filtration flowrate (flux), to be stated later, are performed, thereby to find the membranous filtration resistance value and/or the membranous filtration flowrate (flux) value at any desired time, and in continuing the membranous filtration while controlling the membranous filtration flowrate (flux) to the set value, it is that included at least means for calculating a component quantity attaching on the separation membrane surface, and means for calculating the component quantity existing in the separation membrane pores and means for calculating the membranous filtration resistance, and/or means for calculating the transmembrane pressure, to be stated later, are performed, thereby to find the membranous filtration resistance value and/or the transmembrane pressure value at any desired time.

In other words, it is meant that the following three sorts are included as the configurations of the membranous filtration prediction program in continuing the membranous filtration while controlling the transmembrane pressure to the set value:

(g1) The separation-membrane-surface attaching-component-quantity calculation means and the separation-membrane-pore inner-component-quantity calculation means and the membranous-filtration-resistance calculation means and the membranous-filtration-flowrate (flux) calculation means, to be stated later (h1) The separation-membrane-surface attaching-component-quantity calculation means and the separation-membrane-pore inner-component-quantity calculation means and the membranous filtration resistance calculation means, to be stated later (i1) The separation-membrane-surface attaching-component-quantity calculation means and the separation-membrane-pore inner-component-quantity calculation means and the membranous-filtration-flowrate (flux) calculation means, to be stated later Herein, the membranous filtration resistance value and the membranous filtration flowrate (flux) value at any desired time can be outputted in the case (g1), the membranous filtration resistance value at any desired time can be outputted in the case (h1), and the membranous filtration flowrate (flux) value at any desired time can be outputted in the case (i1).

Besides, it is similarly meant that the following three sorts are included as the configurations of the membranous filtration prediction program in continuing the membranous filtration while controlling the membranous filtration flowrate to the set value:

(j1) The separation-membrane-surface attaching-component-quantity calculation means and the separation-membrane-pore inner-component-quantity calculation means and the membranous-filtration-resistance calculation means and the transmembrane-pressure calculation means, to be stated later (k1) The separation-membrane-surface attaching-component-quantity calculation means and the separation-membrane-pore inner-component-quantity calculation means and the membranous-filtration-resistance calculation means, to be stated later (m1) The separation-membrane-surface attaching-component-quantity calculation means and the separation-membrane-pore inner-component-quantity calculation means and the transmembrane-pressure calculation means, to be stated later Herein, the membranous filtration resistance value and the transmembrane pressure value at any desired time can be found in the case (j1), the membranous filtration resistance value at any desired time can be found in the case (k1), and the transmembrane pressure value at any desired time can be found in the case (m1).

Besides, in the membranous filtration prediction program, in the case of the prediction in continuing the membranous filtration while controlling the transmembrane pressure to the set value, it is included that at least means for calculating a component quantity attaching on the separation membrane surface, and means for calculating the consolidation degree of the component attaching on the separation membrane surface and means for calculating the membranous filtration resistance, and/or means for calculating the membranous filtration flowrate (flux), to be stated later, are performed, thereby to find the membranous filtration resistance value and/or the membranous filtration flowrate (flux) value at any desired time, and in continuing the membranous filtration while controlling the membranous filtration flowrate (flux) to the set value, it is included that at least means for calculating a component quantity attaching on the separation membrane surface, and means for calculating the consolidation degree of the component attaching on the separation membrane surface and means for calculating the membranous filtration resistance, and/or means for calculating the transmembrane pressure, to be stated later, are performed, thereby to find the membranous filtration resistance value and/or the transmembrane pressure value at any desired time.

In other words, it is meant that the following three sorts are included as the configurations of the membranous filtration prediction program in continuing the membranous filtration while controlling the transmembrane pressure to the set value:

(g2) The separation-membrane-surface attaching-component-quantity calculation means and the separation-membrane-surface attaching-component consolidation-degree calculation means and the membranous-filtration-resistance calculation means and the membranous-filtration-flowrate (flux) calculation means, to be stated later (h2) The separation-membrane-surface attaching-component-quantity calculation means and the separation-membrane-surface attaching-component consolidation-degree calculation means and the membranous filtration resistance calculation means, to be stated later (i2) The separation-membrane-surface attaching-component-quantity calculation means and the separation-membrane-surface attaching-component consolidation-degree calculation means and the membranous-filtration-flowrate (flux) calculation means, to be stated later Herein, the membranous filtration resistance value and the membranous filtration flowrate (flux) value at any desired time can be outputted in the case (g2), the membranous filtration resistance value at any desired time can be outputted in the case (h2), and the membranous filtration flowrate (flux) value at any desired time can be outputted in the case (i2).

Besides, it is similarly meant that the following three sorts are included as the configurations of the membranous filtration prediction program in continuing the membranous filtration while controlling the membranous filtration flowrate to the set value:

(j2) The separation-membrane-surface attaching-component-quantity calculation means and the separation-membrane-surface attaching-component consolidation-degree calculation means and the membranous-filtration-resistance calculation means and the transmembrane-pressure calculation means, to be stated later (k2) The separation-membrane-surface attaching-component-quantity calculation means and the separation-membrane-surface attaching-component consolidation-degree calculation means and the membranous-filtration-resistance calculation means, to be stated later (m2) The separation-membrane-surface attaching-component-quantity calculation means and the separation-membrane-surface attaching-component consolidation-degree calculation means and the transmembrane-pressure calculation means, to be stated later Herein, the membranous filtration resistance value and the transmembrane pressure value at any desired time can be found in the case (j2), the membranous filtration resistance value at any desired time can be found in the case (k2), and the transmembrane pressure value at any desired time can be found in the case (m2).

Besides, in the membranous filtration prediction program, in the case of the prediction in continuing the membranous filtration while controlling the transmembrane pressure to the set value, it is included that at least means for calculating a component quantity attaching on the separation membrane surface, and means for calculating the inner component quantity of the separation membrane pores, and means for calculating the consolidation degree of the component attaching on the separation membrane surface and means for calculating the membranous filtration resistance, and/or means for calculating the membranous filtration flowrate (flux), to be stated later, are performed, thereby to find the membranous filtration resistance value and/or the membranous filtration flowrate (flux) value at any desired time, and in continuing the membranous filtration while controlling the membranous filtration flowrate (flux) to the set value, it is included that at least means for calculating a component quantity attaching on the separation membrane surface, means for calculating the inner component quantity of the separation membrane pores, and means for calculating the consolidation degree of the component attaching on the separation membrane surface and means for calculating the membranous filtration resistance, and/or means for calculating the transmembrane pressure, to be stated later, are performed, thereby to find the membranous filtration resistance value and/or the transmembrane pressure value at any desired time.

In other words, it is meant that the following three sorts are included as the configurations of the membranous filtration prediction program in continuing the membranous filtration while controlling the transmembrane pressure to the set value:

(g3) The separation-membrane-surface attaching-component-quantity calculation means, and the separation-membrane-pore inner-component-quantity calculation means, and the separation-membrane-surface attaching-component consolidation-degree calculation means, and the membranous-filtration-resistance calculation means, and the membranous-filtration-flowrate (flux) calculation means, to be stated later (h3) The separation-membrane-surface attaching-component-quantity calculation means, and the separation-membrane-pore inner-component-quantity calculation means, and the separation-membrane-surface attaching-component consolidation-degree calculation means, and the membranous filtration resistance calculation means, to be stated later (i3) The separation-membrane-surface attaching-component-quantity calculation means, and the separation-membrane-pore inner-component-quantity calculation means, and the separation-membrane-surface attaching-component consolidation-degree calculation means, and the membranous-filtration-flowrate (flux) calculation means, to be stated later Herein, the membranous filtration resistance value and the membranous filtration flowrate (flux) value at any desired time can be outputted in the case (g3), the membranous filtration resistance value at any desired time can be outputted in the case (h3), and the membranous filtration flowrate (flux) value at any desired time can be outputted in the case (i3).

Besides, it is similarly meant that the following three sorts are included as the configurations of the membranous filtration prediction program in continuing the membranous filtration while controlling the membranous filtration flowrate to the set value:

(j3) The separation-membrane-surface attaching-component-quantity calculation means, and the separation-membrane-pore inner-component-quantity calculation means, and the separation-membrane-surface attaching-component consolidation-degree calculation means, and the membranous-filtration-resistance calculation means, and the transmembrane-pressure calculation means, to be stated later (k3) The separation-membrane-surface attaching-component-quantity calculation means, and the separation-membrane-pore inner-component-quantity calculation means, and the separation-membrane-surface attaching-component consolidation-degree calculation means, and the membranous-filtration-resistance calculation means, to be stated later (m3) The separation-membrane-surface attaching-component-quantity calculation means, the separation-membrane-pore inner-component-quantity calculation means, and the separation-membrane-surface attaching-component consolidation-degree calculation means, and the transmembrane-pressure calculation means, to be stated later Herein, the membranous filtration resistance value and the transmembrane pressure value at any desired time can be found in the case (j3), the membranous filtration resistance value at any desired time can be found in the case (k3), and the transmembrane pressure value at any desired time can be found in the case (m3).

Subsequently, in the separation-membrane-surface attaching-component-quantity calculation means at a step S300, the constituent component quantity value of the liquid to-be-filtrated attaching on the separation membrane surface at the time ti+1 is calculated using data at the time ti, in conformity with a separation-membrane-surface attaching-component-quantity calculation formula recorded in the auxiliary storage device 2 beforehand. More specifically, the transmembrane pressure value or the membranous filtration flowrate (flux) value, or the constituent component quantity value of the liquid to-be-filtrated, and the membrane washing force value, at the time ti are read out from the time series values stored in the main memory. Further, the initial value of the membranous filtration resistance, and the initial value of the constituent component quantity of the liquid to-be-filtrated attaching on the separation membrane surface, in the case of the time t0, or the constituent component quantity value of the liquid to-be-filtrated attaching on the separation membrane surface, at the time ti, in any case other than t0, are read out. Using the read-out values at the time $t_i$, the constituent component quantity value of the liquid to-be-filtrated attaching on the separation membrane surface at the time $t_{i+1}$ is calculated in conformity with the separation-membrane-surface attaching-component-quantity calculation formula recorded beforehand. These calculations are processed by a central processing unit in compliance with the instructions of the control program in the main memory.

The separation-membrane-surface attaching-component-quantity calculation formula recorded beforehand should preferably be based on the difference between the rate at which the constituent component of the liquid to-be-filtrated attaches onto the separation membrane surface as is determined on the basis of the transmembrane pressure value or the membranous filtration flowrate (flux) value and the constituent component quantity value of the liquid to-be-filtrated, and the rate at which the constituent component of the liquid to-be-filtrated attaching on the separation membrane surface detaches from the separation membrane surface as is determined on the basis of the transmembrane pressure value or the membranous filtration flowrate (flux) value.

More preferably, the formula for obtaining the rate at which the constituent component of the liquid to-be-filtrated attaching on the separation membrane surface detaches from the membrane surface includes a term based on the membrane washing force value.

Further, it is preferable that the attaching-component-quantity calculation formula recorded beforehand is represented by a mathematical formula based on Formula (3) or Formula (4). The scope of the present invention, however, is not restricted to Formula (3) or Formula (4). Here, Formula (3) and Formula (4) are represented by differential equations, but they can be represented as, for example, Formula (20) and Formula (21) when they are computed by employing the Euler method:

[Formula 11]

$$X_c(t_{i+1}) = X_c(t_i) + (X(t_i) \cdot J(t_i) \cdot (1 - K_\tau \cdot \tau(t_i)) - \gamma \cdot (\tau(t_i) - \lambda \cdot \Delta P(t_i)) \cdot \eta \cdot (D_{max} - D(t_i) \cdot X_c(t_i)^2)) \cdot \Delta t \quad (20)$$

$$X_c(t_{i+1}) = X_c(t_i) + \left( X(t_i) \cdot J(t_i) \cdot \frac{K_{\tau 1}}{K_{\tau 1} + \tau(t_i)} - \gamma \cdot \tau(t_i) \cdot \frac{K_{\tau 2}}{K_{\tau 2} + \Delta P(t_i)} \cdot \eta \cdot (D_{max} - D(t_i)) \cdot X_c(t_i)^2 \right) \cdot \Delta t \quad (21)$$

where $(\tau - \lambda \cdot \Delta P(t_i)) \geq 0$ holds.

Here, the first terms of the right sides of Formula (20) and Formula (21) indicate the rates at which the constituent component attaches onto the separation membrane surface, and the second terms thereof indicate the rates at which the constituent component detaches from the separation membrane surface. Besides, when both the sides of each of Formulas (20) and (21) are multiplied by a membrane area A, the left sides of Formulas (20) and (21) can be converted into the variation quantities of the substance quantities contained in the constituent component attaching on the separation membrane surface, and the membranous filtration fluxes J of the right sides into the membranous filtration flowrates Q. Besides, in a case where the membrane washing force values τ are expressed as the function of the power values of the wash means, Formulas (20) and (21) can be converted into computation formulas concerning the power values of the wash means unlike the membrane washing force values, by substituting the function into τ.

Besides, as stated before, in the case where the variation quantity of the constituent component attaching on the separation membrane surface is based on the computation formula expressed as the difference between the rate at which the constituent component of the liquid to-be-filtrated attaches onto the separation membrane surface and the rate at which it detaches therefrom, the computation formula can be expressed as the differential equation which concerns the constituent component quantity of the liquid to-be-filtrated attaching on the separation membrane surface. On that occasion, the Euler method, the Runge-Kutta method, the Runge-Kutta-Gill (RKG) method, etc. exist as the integral methods for solving the differential equation.

Besides, symbols appearing in Formulas (20) and (21) are as listed in Table 1. At a step S400, the constituent component quantity value of the liquid to-be-filtrated attaching on the separation membrane surface at the time $t_{i+1}$ as has been calculated at the step S300 is recorded in the main memory of the computer 1.

Subsequently, in the separation-membrane-pore inner-component-quantity calculation means of a step S500, the constituent component quantity value of the liquid to-be-filtrated existing in the separation membrane pores at the time $t_{i+1}$ is calculated using data at the time $t_i$, in conformity with a separation-membrane-pore inner-component-quantity calculation formula recorded in the auxiliary storage device 2 beforehand. More specifically, the transmembrane pressure value and/or the membranous filtration flowrate (flux) value and/or the constituent component quantity value attaching on the separation membrane surface and/or the constituent component quantity value of the liquid to-be-filtrated existing in the separation membrane pores, at the time $t_i$, are/is read out from the time series values stored in the main memory. Using the read-out values at the time $t_i$, the constituent component quantity value of the liquid to-be-filtrated existing in the separation membrane pores at the time $t_{i+1}$ is calculated in conformity with the separation-membrane-pore inner-component-quantity calculation formula recorded beforehand.

It is preferable that the separation-membrane-pore inner-component-quantity calculation formula recorded beforehand is calculated on the basis of the transmembrane pressure value and/or the membranous filtration flowrate (flux) value and/or the constituent component quantity value attaching on the separation membrane surface and/or the constituent component quantity value of the liquid to-be-filtrated existing in the separation membrane pores. Besides, it is more preferable that the separation-membrane-pore inner-constituent-quantity calculation formula includes the self-inhibition term of the constituent component quantity value of the liquid to-be-filtrated existing in the separation membrane pores.

Formulas (5)-(7), for example, exist as mathematical formulas which satisfy such a condition. The scope of the present invention, however, is not restricted to Formulas (5)-(7). Here, Formulas (5)-(7) are represented by differential equations, but they can be represented as, for example, Formulas (22)-(24) when they are computed by employing the Euler method:

[Formula 12]

$$X_f(t_{i+1}) = X_f(t_i) + (\varphi \cdot (1 - \varepsilon \cdot X_f(t_i)^2) \cdot \Delta P(t_i)) \cdot \Delta t \quad (22)$$

$$X_f(t_{i+1}) = X_f(t_i) + \left(\varphi \cdot \frac{K_f}{K_f + X_f(t_i)^{2/3}} \cdot X_c(t_i)^2 \cdot \Delta P(t_i)\right) \cdot \Delta t \quad (23)$$

$$X_f(t_{i+1}) = X_f(t_i) + \left(\varphi \cdot \frac{K_f}{K_f + X_f(t_i)^{2/3}} \cdot X_c(t_i)^2 \cdot J(t_i)\right) \cdot \Delta t \quad (24)$$

Symbols appearing in Formulas (22)-(24) are as listed in Table 1. Besides, at a step S600, the constituent component quantity value of the liquid to-be-filtrated existing in the separation membrane pores at the time $t_{i+1}$ as has been calculated at the step S500 is recorded in the main memory of the computer 1.

Subsequently, in the separation-membrane-surface attaching-component consolidation-degree calculation means of a step S700, the consolidation degree of the component constituent of the liquid to-be-filtrated attaching on the separation membrane surface at the time $t_{i+1}$ is calculated using data at the time $t_i$, in conformity with the separation-membrane-surface attaching-component consolidation-degree calculation formula recorded in the auxiliary storage device 2 beforehand. More specifically, the transmembrane pressure value or the pressure value coming from the constituent component attaching on the separation membrane surface and/or the consolidation degree value of the constituent component of the liquid to-be-filtrated attaching on the separation membrane surface, at the time $t_i$ are/is read out from the time series values stored in the main memory. Using the read-out values at the time $t_i$, the consolidation degree of the constituent component of the liquid to-be-filtrated attaching on the separation membrane surface at the time $t_{i+1}$ is calculated in conformity with a separation-membrane-surface attaching-component consolidation-degree calculation formula recorded beforehand.

It is preferable that the separation-membrane-surface attaching-component consolidation-degree calculation formula recorded beforehand is calculated on the basis of the transmembrane pressure value or the pressure value coming from the constituent component attaching on the separation membrane surface and/or the consolidation degree value of the constituent component of the liquid to-be-filtrated attaching on the separation membrane surface.

Formula (8), for example, exists as a mathematical formula which satisfies such a condition. The scope of the present invention, however, is not restricted to Formula (8). Here, Formula (8) is represented by a differential equation, but it can be represented as, for example, Formula (25) when it is computed by employing the Euler method:

[Formula 13]

$$D(t_{i+1}) = D(t_i) + (k_1 \cdot (D_{max} - D) \cdot \Delta P_c(t_i)) \cdot \Delta t \quad (25)$$

Symbols appearing in Formula (25) are as listed in Table 1. Besides, at a step S800, the consolidation degree of the constituent component of the liquid to-be-filtrated attaching on the separation membrane surface at the time $t_{i+1}$ as has been calculated at the step S700 is recorded in the main memory of the computer 1.

Besides, in the membranous filtration resistance calculation means, the central processing unit calculates a membranous filtration resistance prediction value at the time $t_{i+1}$, in compliance with the instruction of the control program within the main memory, by using the membranous-filtration-resistance initial value stored in the main memory by the data record means (step S200), and the constituent component quantity value of the liquid to-be-filtrated attaching on the separation membrane surface at the time $t_{i+1}$ as has been calculated by the separation-membrane-surface attaching-component-quantity calculation means (step S300), and/or the constituent component quantity value of the liquid to-be-filtrated existing in the separation membrane pores at the time $t_{i+1}$ as has been calculated by the separation-membrane-pore inner-component-quantity calculation means (step S500), and/or the consolidation degree of the constituent component of the liquid to-be-filtrated attaching on the separation membrane surface at the time $t_{i+1}$ as has been calculated by the separation-membrane-surface attaching-component consolidation-degree calculation means (step S700), and in conformity with a membranous-filtration-resistance prediction-value calculation formula recorded in the auxiliary storage device 2 beforehand. It is preferable that the calculation formula recorded beforehand is calculated as the sum of the membranous filtration resistance which is determined by the constituent component quantity value of the liquid to-be-filtrated attaching on the separation membrane surface, and/or the membranous filtration resistance which is determined by the constituent component quantity value of the liquid to-be-filtrated existing in the separation membrane pores, and/or the membranous filtration resistance which is determined by the consolidation degree of the constituent component of the liquid to-be-filtrated attaching on the separation membrane surface, and the membranous-filtration-resistance initial value, and it should more preferably be based on Formulas (9)-(11). The following formulas (26)-(28), for example, are employed therefor.

[Formula 14]

$$R_c(t_{i+1}) = \alpha \cdot (1 + a \cdot \Delta P_c(t_{i+1})) \cdot X_c(t_{i+1}) \quad (26)$$

$$R_f(t_{i+1}) = \beta \cdot X_f(t_{i+1})^{1.5} \quad (27)$$

$$R(t_{i+1}) = R_m + R_c(t_{i+1}) + R_f(t_{i+1}) \quad (28)$$

Here, symbols appearing in Formulas (26)-(28) are as listed in Table 1.

Besides, it is preferable that the constituent component of the liquid to-be-filtrated attaching on the separation membrane surface is defined as forming a hierarchic structure, and that the separation-membrane-surface attaching-component consolidation-degree calculation means includes the following separation-membrane-surface attaching-constituent-component number-of-layers calculation means and separation-membrane-surface attaching-component individual-layer consolidation-degree calculation means: (Separation-membrane-surface attaching-constituent-component number-of-layers calculation means (step S700-1)) The number of layers n of the constituent component of the liquid to-be-filtrated attaching on the separation membrane surface at the time $t_{i+1}$ is calculated on the basis of the constituent component quantity value of the liquid to-be-filtrated attaching on the separation membrane as has been obtained by the separation-membrane-surface attaching-component-quantity calculation means. (Separation-membrane-surface attaching-component individual-layer consolidation-degree calculation means (step S700-2)) At the time $t_{i+1}$, the consolidation degree of the constituent component of the liquid to-be-filtrated of the jth layer attaching on the separation membrane surface (here, j denotes any natural number of 1 through n, and the first layer is the nearest to the separation membrane, whereas the nth layer is the remotest from the separation membrane) is calculated.

In this case, in the separation-membrane-surface attaching-component-quantity calculation means of the step S300, the constituent component quantity value of the liquid to-be-filtrated attaching on the separation membrane surface at the time $t_{i+1}$ is calculated using data at the time in conformity with a separation-membrane-surface attaching-component-quantity calculation formula recorded in the auxiliary storage device 2 beforehand. More specifically, the transmembrane pressure value, or the membranous filtration flowrate (flux) value, or the constituent component quantity value of the liquid to-be-filtrated, and the membrane washing force value, at the time $t_i$ are read out from the time series values stored in the main memory. Further, the initial value of the membranous filtration resistance, and the initial value of the constituent component quantity of the liquid to-be-filtrated of the first layer—nth layer attaching on the separation membrane surface, in the case of the time t0, or the constituent component quantity value of the liquid to-be-filtrated of the first layer—nth layer attaching on the separation membrane surface, at the time $t_i$, in any case other than t0, are read out. Using the read-out values at the time $t_i$, the constituent component quantity value of the liquid to-be-filtrated attaching on the separation membrane surface at the time $t_{i+1}$ is calculated in conformity with the separation-membrane-surface attaching-component-quantity calculation formula recorded beforehand. These calculations are processed by the central processing unit in compliance with the instructions of the control program in the main memory.

The separation-membrane-surface attaching-component-quantity calculation formula recorded beforehand should preferably be based on the difference between the rate at which the constituent component of the liquid to-be-filtrated attaches onto the separation membrane surface as is determined on the basis of the transmembrane pressure value or the membranous filtration flowrate (flux) value and the constituent component quantity value of the liquid to-be-filtrated, and the rate at which the constituent component of the liquid to-be-filtrated attaching on the separation membrane surface detaches from the separation membrane surface as is determined on the basis of the transmembrane pressure value or the membranous filtration flowrate (flux) value.

Besides, it is more preferable that the formula for obtaining the rate at which the constituent component attaches onto the separation membrane surface includes the self-inhibition term of the membrane washing force value. Besides, it is more preferable that the formula for obtaining the rate at which the constituent component detaches from the separation membrane surface includes the self-inhibition term of the transmembrane pressure value.

Besides, it is more preferable that the formula for obtaining the rate at which the constituent component of the liquid to-be-filtrated attaching on the separation membrane surface detaches from the separation membrane surface includes a term of the second-degree or higher-degree function of the solid component substance quantity value of the liquid to-be-filtrated attaching on the separation membrane surface.

More preferably, the formula for obtaining the rate at which the constituent component of the liquid to-be-filtrated attaching on the separation membrane surface detaches from the membrane surface includes a term based on the membrane washing force value.

Further, it is preferable that the attaching-component-quantity calculation formula recorded beforehand is represented by a mathematical formula based on Formulas (12)-(14). The scope of the present invention, however, is not restricted to Formulas (12)-(14). Here, Formulas (12) and (13) are represented by differential equations, but they can be represented as, for example, Formulas (29) and (30) when they are computed by employing the Euler method:

[Formula 15]

$$X_c(t_{i+1}) = \qquad (29)$$
$$X_c(t_i) + \left(X(t_i) \cdot J(t_i) \cdot (1 - K_\tau \cdot \tau(t_i)) - (1 - D_j) \cdot \gamma \cdot (\tau(t_i) - \lambda \cdot \Delta P(t_i)) \cdot \right.$$
$$\left. \eta \cdot \left(\sum_{j=1}^n ((D_{max} - D_j(t_i)) \cdot X_{c,j}(t_i))\right)^2\right) \cdot \Delta t$$

$$X_c(t_{i+1}) = \qquad (30)$$
$$X_c(t_i) + \left(X(t_i) \cdot J(t_i) \cdot \frac{K_{\tau 1}}{K_{\tau 1} + \tau(t_i)} - (1 - D_j) \cdot \gamma \cdot \tau(t_i) \cdot \frac{K_{\tau 2}}{K_{\tau 2} + \Delta P(t_i)} \cdot \right.$$
$$\left. \eta \cdot \left(\sum_{j=1}^n ((D_{max} - D_j(t_i)) \cdot X_{c,j}(t_i))\right)^2\right) \cdot \Delta t$$

where $(\tau - \lambda \cdot \Delta P(t_i)) \geq 0$ holds. Here, symbols appearing in Formulas (29) and (30) are as listed in Table 1.

Besides, in the separation-membrane-surface attaching-component individual-layer consolidation-degree calculation means of the step S700-2, the consolidation degree of the constituent component of the liquid to-be-filtrated of the jth layer (j=1 through n) attaching on the separation membrane surface at the time $t_{i+1}$ is calculated using data at the time $t_i$, in conformity with the separation-membrane-surface attaching-component consolidation-degree calculation formula recorded in the auxiliary storage device 2. More specifically, the transmembrane pressure value, or the pressure value which comes from the constituent component attaching on the separation membrane surface, and/or the consolidation degree value of the constituent component of the liquid to-be-filtrated of the jth layer attaching on the separation membrane surface, at the time $t_i$ are/is read out from the time series values stored in the main memory. Using the read-out values at the time $t_i$, the consolidation degree of the constituent component of the liquid to-be-filtrated of the jth layer attaching on the separation membrane surface at the time $t_{i+1}$ is calculated in conformity with the separation-membrane-surface attaching-component consolidation-degree calculation formula recorded beforehand.

It is preferable that the separation-membrane-surface attaching-component consolidation-degree calculation formula recorded beforehand is calculated on the basis of the transmembrane pressure value or the pressure value coming from the constituent component attaching on the separation membrane surface and/or the consolidation degree value of the constituent component of the liquid to-be-filtrated of the jth layer attaching on the separation membrane surface.

Formula (15), for example, exists as a mathematical formula which satisfies such a condition. The scope of the present invention, however, is not restricted to Formula (15). Here, Formula (15) is represented by a differential equation, but it can be represented as, for example, Formula (31) when it is computed by employing the Euler method:

[Formula 16]

$$D_j(t_{i+1}) = D_j(t_i) + (k_1 \cdot (D_{max} - D_j(t_i)) \cdot \Delta P_c(t_i)) \cdot \Delta t \quad (31)$$

Here, symbols appearing in Formula (31) are as listed in Table 1.

Besides, in the membranous filtration resistance calculation means, the central processing unit calculates a membranous filtration resistance prediction value at the time $t_{i+1}$, in compliance with the instruction of the control program within the main memory, by using the membranous-filtration-resistance initial value stored in the main memory by the data record means (step S200), and the constituent component quantity value of the liquid to-be-filtrated attaching on the separation membrane surface at the time $t_{i+1}$ as has been calculated by the separation-membrane-surface attaching-component-quantity calculation means (step S300), and/or the constituent component quantity value of the liquid to-be-filtrated existing in the separation membrane pores at the time $t_{i+1}$ as has been calculated by the separation-membrane-pore inner-component-quantity calculation means (step S500), and/or the consolidation degree of the constituent component of the liquid to-be-filtrated of the first layer—nth layer attaching on the separation membrane surface at the time $t_{i+1}$ as has been calculated by the separation-membrane-surface attaching-component consolidation-degree calculation means (step S700), and in conformity with a membranous-filtration-resistance prediction-value calculation formula recorded in the auxiliary storage device 2 beforehand. It is preferable that the calculation formula recorded beforehand is calculated as the sum of the membranous filtration resistance which is determined by the constituent component quantity value of the liquid to-be-filtrated attaching on the separation membrane surface, and/or the membranous filtration resistance which is determined by the constituent component quantity value of the liquid to-be-filtrated existing in the separation membrane pores, and/or the membranous filtration resistance which is determined by the consolidation degree of the constituent component of the liquid to-be-filtrated of the first layer—nth layer attaching on the separation membrane surface, and the membranous-filtration-resistance initial value, and it should more preferably be based on Formulas (16)-(18). The following formulas (32)-(34), for example, are employed therefor.

[Formula 17]

$$R_c(t_{i+1}) = \sum_{j=1}^{n} ((1 + k_2 \cdot D_j) \cdot \alpha \cdot (1 + a \cdot \Delta P_c(t_{i+1})) \cdot X_{c,j}(t_{i+1})) \quad (32)$$

$$R_f(t_{i+1}) = \beta \cdot X_f(t_{i+1})^{1.5} \quad (33)$$

$$R(t_{i+1}) = R_m + R_c(t_{i+1}) + R_f(t_{i+1}) \quad (34)$$

Here, symbols appearing in Formulas (32)-(34) are as listed in Table 1.

Besides, in the membranous filtration flowrate (flux) calculation means, the membranous-filtration-resistance initial value and the transmembrane pressure value at the time $t_{i+1}$ are read out from the data record means, and the prediction value of the membranous filtration flowrate (flux) at the time $t_{i+1}$ is calculated on the basis of the membranous-filtration-resistance initial value and the transmembrane pressure value at the time $t_{i+1}$ as have been read out, and the constituent component quantity value of the liquid to-be-filtrated attaching on the separation membrane at the time $t_{i+1}$ as has been calculated by the separation-membrane-surface attaching-component-quantity calculation means, and/or the constituent component quantity value of the liquid to-be-filtrated existing in the separation membrane pores at the time $t_{i+1}$ as has been calculated by the separation-membrane-pore inner-component-quantity calculation means, and/or the consolidation degree value of the constituent component of the liquid to-be-filtrated attaching on the separation membrane surface at the time $t_{i+1}$ as has been calculated by the separation-membrane-surface attaching-component consolidation-degree calculation means, and in conformity with a membranous-filtration-flowrate (flux) prediction-value calculation formula I recorded beforehand. Alternatively, the transmembrane pressure value at the time $t_{i+1}$ is read out from the data record means, and the prediction value of the membranous filtration flowrate (flux) at the time $t_{i+1}$ is calculated on the basis of the transmembrane pressure value at the time $t_{i+1}$ as has been read out, and the membranous-filtration-resistance prediction value at the time $t_{i+1}$ as has been calculated by the membranous-filtration-resistance calculation means, and in conformity with a membranous-filtration-flowrate (flux) prediction-value calculation formula II recorded beforehand.

Herein, in a case where the membranous filtration prediction program includes the item (i) (that is, the separation-membrane-surface attaching-component-quantity calculation means, and/or the separation-membrane-pore inner-component-quantity calculation means, and/or the separation-membrane-surface attaching-component consolidation-degree calculation means, and the membranous-filtration-flowrate (flux) calculation means), a membranous-filtration-flowrate (flux) value at the time $t_{i+1}$ is calculated using the constituent component quantity value of the liquid to-be-filtrated attaching on the separation membrane at the time $t_{i+1}$ as has been obtained by the separation-membrane-surface attaching-component-quantity calculation means, and/or the constituent component quantity value of the liquid to-be-filtrated existing in the separation membrane pores at the time $t_{i+1}$ as has been obtained by the separation-membrane-pore inner-component-quantity calculation means, and/or the consolidation degree of the constituent component of the liquid to-be-filtrated attaching on the separation membrane surface at the time $t_{i+1}$ as has been obtained by the separation-membrane-surface attaching-component consolidation-degree calculation means. A method therefor is, for example, to employ the mathematical formula which is obtained in such a way that Formulas (16) and (17) are substituted into Formula (18) and that the result is further substituted into Formula (1). Besides, in a case where the membranous filtration prediction includes the item (g) (that is, the separation-membrane-surface attaching-component-quantity calculation means, and/or the separation-membrane-pore inner-component-quantity calculation means, and/or the separation-membrane-surface attaching-component consolidation-degree calculation means, and the membranous-filtration-resistance calculation means, and the membranous-filtration-flowrate (flux) calculation means), a membranous filtration flowrate (flux) value at any desired time is calculated using the membranous filtration resistance value at the time $t_{i+1}$ as has been obtained by the membranous-filtration-resistance calculation means. As a method therefor, it is preferable to employ and compute Formula (1) or a mathematical formula based thereon.

Besides, in membranous-filtration prediction-value record means (step S1000), the prediction value of the membranous filtration resistance at the time $t_{i+1}$ as has been calculated by the membranous-filtration-resistance calculation means, and/or the prediction value of the membranous filtration flowrate (flux) at the time $t_{i+1}$ as has been calculated by the membranous-filtration-flowrate (flux) calculation means are/is recorded in the main memory of the computer 1.

Besides, in the transmembrane pressure calculation means, the membranous-filtration-resistance initial value and the membranous-filtration-flowrate (flux) value at the time $t_{i+1}$ are read out from the data record means, and the prediction value of the transmembrane pressure at the time $t_{i+1}$ is calculated on the basis of the membranous-filtration-resistance initial value and the membranous-filtration-flowrate (flux) value at the time $t_{i+1}$ as have been read out, and the constituent component quantity value of the liquid to-be-filtrated attaching on the separation membrane at the time $t_{i+1}$ as has been calculated by the separation-membrane-surface attaching-component-quantity calculation means, and/or the constituent component quantity value of the liquid to-be-filtrated existing in the separation membrane pores at the time $t_{i+1}$ as has been calculated by the separation-membrane-pore inner-component-quantity calculation means, and/or the consolidation degree value of the constituent component of the liquid to-be-filtrated attaching on the separation membrane surface at the time $t_{i+1}$ as has been calculated by the separation-membrane-surface attaching-component consolidation-degree calculation means, and in conformity with a transmembrane-pressure prediction-value calculation formula I recorded beforehand. Alternatively, the membranous-filtration-flowrate (flux) value at the time $t_{i+1}$ is read out from the data record means, and the prediction value of the transmembrane pressure at the time $t_{i+1}$ is calculated on the basis of the membranous-filtration-flowrate (flux) value at the time $t_{i+1}$ as has been read out, and the membranous-filtration-resistance prediction value at the time $t_{i+1}$ as has been calculated by the membranous-filtration-resistance calculation means, and in conformity with a transmembrane-pressure prediction-value calculation formula II recorded beforehand.

Herein, in a case where the membranous filtration prediction program includes the item (m) (that is, the separation-membrane-surface attaching-component-quantity calculation means, and/or the separation-membrane-pore inner-component-quantity calculation means, and/or the separation-membrane-surface attaching-component consolidation-degree calculation means, and the transmembrane pressure calculation means), a transmembrane pressure value at the time $t_{i+1}$ is calculated using the constituent component quantity value of the liquid to-be-filtrated attaching on the separation membrane surface at the time $t_{i+1}$ as has been obtained by the separation-membrane-surface attaching-component-quantity calculation means, and/or the constituent component quantity value of the liquid to-be-filtrated existing in the separation membrane pores at the time $t_{i+1}$ as has been obtained by the separation-membrane-pore inner-component-quantity calculation means, and/or the consolidation degree of the constituent component of the liquid to-be-filtrated attaching on the separation membrane surface at the time $t_{i+1}$ as has been obtained by the separation-membrane-surface attaching-component consolidation-degree calculation means. A method therefor is, for example, to employ the mathematical formula which is obtained in such a way that Formulas (12) and (13) are substituted into Formula (14) and that the result is further substituted into Formula (1). Besides, in a case where the membranous filtration prediction includes the item (j) (that is, the separation-membrane-surface attaching-component-quantity calculation means, and/or the separation-membrane-pore inner-component-quantity calculation means, and/or the separation-membrane-surface attaching-component consolidation-degree calculation means, and the membranous-filtration-resistance calculation means, and the transmembrane pressure calculation means), a transmembrane pressure value at any desired time is calculated using the membranous-filtration-resistance value at the time $t_{i+1}$ as has been obtained by the membranous-filtration-resistance calculation means. As a method therefor, it is preferable to employ and compute Formula (1) or a mathematical formula based thereon.

Besides, in the membranous-filtration prediction-value record means (step S1000), the prediction value of the membranous filtration resistance at the time $t_{i+1}$ as has been calculated by the membranous-filtration-resistance calculation means, and/or the prediction value of the transmembrane pressure at the time $t_{i+1}$ as has been calculated by the transmembrane pressure calculation means are/is recorded in the main memory of the computer 1.

In the case where the temporal variation of the membranous-filtration-resistance value and/or the temporal variation of the membranous-filtration-flowrate (flux) value as vary with time are/is predicted in continuing the membranous filtration while controlling the transmembrane pressure to the set value, the separation-membrane-surface attaching-component-quantity calculation means and the separation-membrane-surface attaching-component-quantity calculation-value record means, and/or the separation-membrane-pore inner-component-quantity calculation means and the separation-membrane-pore inner-component-quantity calculation-value record means, and/or the separation-membrane-surface attaching-component consolidation-degree calculation means, the separation-membrane-surface attaching-component consolidation-degree calculation-value record means and the membranous-filtration-resistance calculation means, and/or the membranous-filtration-flowrate (flux) calculation means and the membranous-filtration prediction-value record means are repeated while updating the time every $\Delta t_i$, and in the case where the temporal variation of the membranous-filtration-resistance value and/or the temporal variation of the transmembrane pressure value as vary with time are/is predicted in continuing the membranous filtration while controlling the membranous filtration flowrate to the set value, the separation-membrane-surface attaching-component-quantity calculation means and the separation-membrane-surface attaching-component-quantity calculation-value record means, and/or the separation-membrane-pore inner-component-quantity calculation means and the separation-membrane-pore inner-component-quantity calculation-value record means, and/or the separation-membrane-surface attaching-component consolidation-degree calculation means, the separation-membrane-surface attaching-component consolidation-degree calculation-value record means and the membranous-filtration-resistance calculation means, and/or the transmembrane-pressure calculation means and the membranous-filtration prediction-value record means are repeated while updating the time every $\Delta t_i$, whereby the time series data of the prediction values at the intervals of $\Delta t_i$ (the time series data of the prediction values corresponding to the times $t_0$-$t_n$) are generated in the memory. Here, the prediction may be ended at the final time $t_n$ of the time series data stored in the memory at the step S200, or at a time which has been set beforehand.

Lastly, in output means (step S1100), the time series data of the prediction values are displayed by the display device 4 in compliance with the instruction of the control program within the main memory. The display should preferably be presented by a table in which the times and the prediction values form pairs, a graph in which the prediction values are taken on the axis of ordinates, while the times are taken on the axis of abscissas, or the like. Besides, the display may well be such that two different sorts of prediction values (for example, the membranous filtration flowrate value and the membranous filtration resistance value) at any desired time form a pair, and that one of them is taken on the axis of ordinates, while the other is taken on the axis of abscissas. Besides, the table or the graph may well be outputted by a printer or the like.

The above program is circulated through a concrete storage medium represented by a flexible disk, a CD-ROM or the like, or a transmission line (including automatic public transmission) such as wired or radio network.

The explanations of the symbols used in the individual mathematical formulas will be collectively listed in Table 1.
[Table 1]

EXAMPLES

The present invention according to one embodiment will now be concretely described, but it shall not be restricted to the examples.

Example 1

Figure 8:
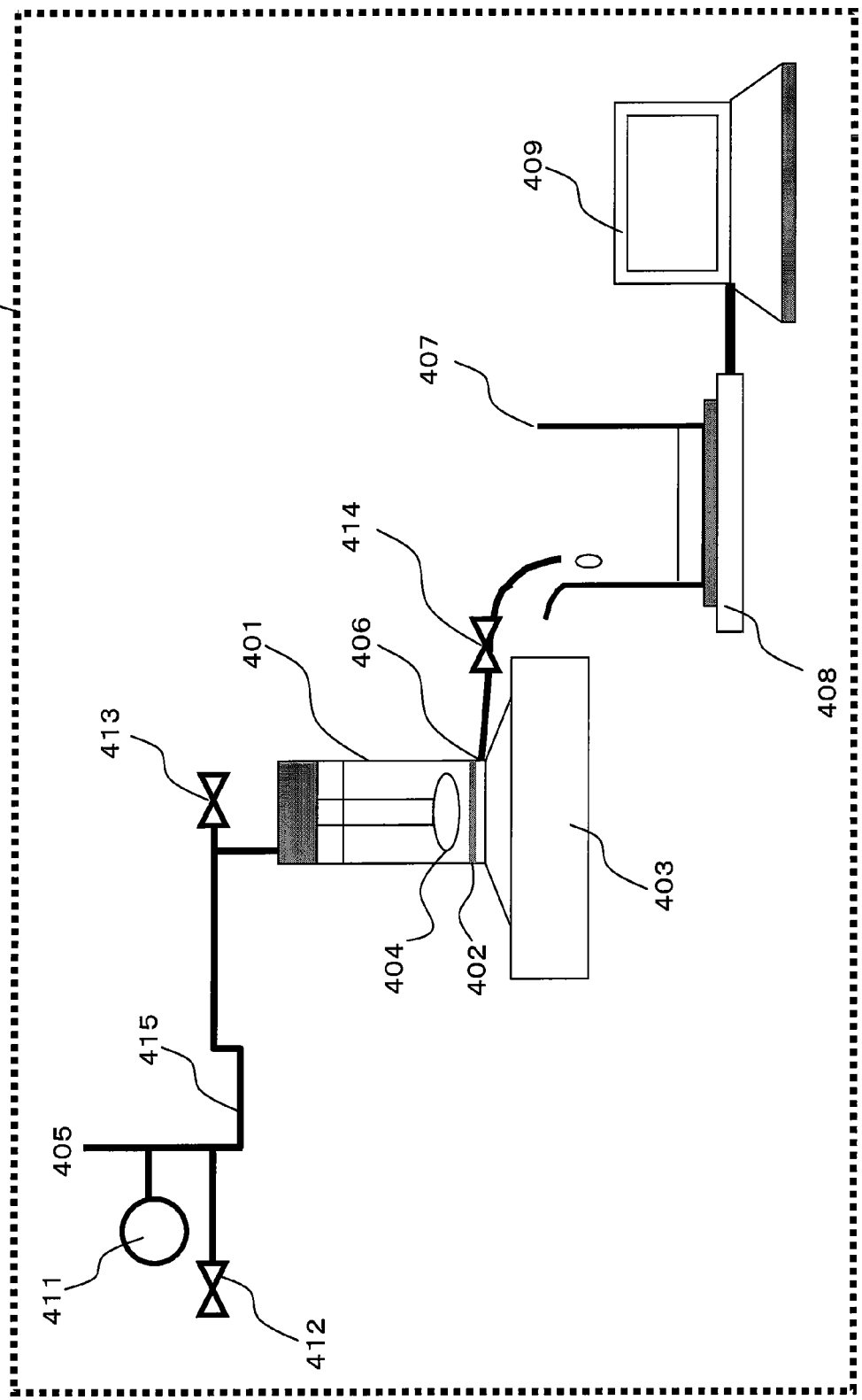
FIG. 8 It is a schematic view of a membranous filtration test device 400 employed in Example 1.

First, a membranous filtration test was carried out with active sludge as a liquid to-be-filtrated, by employing a membranous filtration test apparatus 400 shown in FIG. 8. The membranous filtration test apparatus 400 was an apparatus in which a pressure was applied to an agitation type cell 401 ("Amicon8050" manufactured by Millipore, Inc.) by air 405 (the pressure was measured by a pressure gauge 411), whereby the active sludge being the liquid to-be-filtrated was filtrated by a separation membrane 402 disposed on a membrane fixation holder 406. Besides, in the membranous filtration, the liquid to-be-filtrated could be agitated in such a way that an agitator 404 immersed in the liquid to-be-filtrated was rotated by a magnetic stirrer 403. Besides, the apparatus had such a structure that a membranous penetration liquid was received by a beaker 407 placed on an electronic scale 408, that the quantity of the membranous penetration liquid was measured by the electronic scale 408 and that the measured value was introduced into a personal computer 409. Besides, a valve 412, a valve 413 or a valve 414 was opened or closed,

TABLE 1

| Symbol | Unit | Explanation |
|---|---|---|
| $J(t)$ | [m/s] | Membranous filtration flux at time t |
| $R(t)$ | [l/m] | Membranous filtration resistance at time t |
| $X(t)$ | [gC/m$^3$] | Constituent content quantity of liquid to-be-Filtrated at time t |
| $X_c(t)$ | [gC/m$^2$] | Constituent content quantity of liquid to-be-filtrated attaching on separation membrane surface at time t |
| $R_m$ | [1/m] | Membranous-filtration-resistance initial value |
| $\Delta P(t)$ | [Pa] | Transmembrane pressure at time t |
| $\mu$ | [Pa · s] | Viscosity of membranous penetration liquid |
| $\alpha$ | [m/gC] | Resistance coefficient of constituent component |
| $\gamma$ | [l/m/s] | Separation coefficient of constituent component |
| $\lambda$ | [l/Pa] | Friction coefficient of constituent component |
| $\eta$ | [m$^3$/gC] | Inverse number of density of constituent component |
| $K_\tau$ | [—] | Membrane-washing-force inhibition coefficient |
| $K_{\tau 1}$ | [—] | Membrane-washing-force inhibition coefficient |
| $K_{\tau 2}$ | [Pa] | Transmembrane-pressure inhibition coefficient |
| $D_{max}$ | [—] | Maximum consolidation degree (usually "1") |
| $D(t)$ | [—] | Consolidation degree of constituent component of liquid to-be-filtrated attaching on separation membrane surface at time t |
| $X_f(t)$ | [gC/m$^2$] | Constituent component quantity of liquid to-be-filtrated existing in separation membrane pores at time t |
| $\phi$ | [gC/m$^2$/Pa/s] | Rate coefficient of substance movement into separation membrane pores |
| $\epsilon$ | [m$^4$/gC$^2$] | Inhibition coefficient of substance movement into separation membrane pores |
| $K_f$ | [gC$^{2/3}$/m$^{4/3}$] | Inhibition coefficient of substance movement into separation membrane pores |
| $k_1$ | [1/(Pa/s)] | Consolidation rate constant |
| $\Delta P_c(t)$ | [Pa] | Pressure value which comes from constituent component attaching on separation membrane surface |
| $R_c(t)$ | [1/m] | Membranous filtration resistance which comes from constituent component attaching on separation membrane surface |
| a | [m/gC/Pa] | Pressure sensitivity coefficient of $\alpha$ |
| $R_f(t)$ | [l/m] | Membranous filtration resistance which comes from constituent component existing in separation membrane pores |
| $\beta$ | [m$^2$/gC$^{1.5}$] | Generation quantity of membranous filtration resistance per unit quantity of $X_f$ |
| $D_j(t)$ | [—] | Consolidation degree of constituent component of liquid to-be-filtrated of jth layer attaching on separation membrane surface |
| $k_2$ | [—] | Consolidation effect constant |
| $\tau(t)$ | [—] | Membrane washing force | thereby to adjust the existence or nonexistence of the pressure application to each part of the membranous filtration test apparatus.

The separation membrane 402 used was such that a separation membrane immersed in 20% ethanol was let stand at 40° C. for one night. This was intended to eliminate a surface-active agent added into the separation membrane. The separation membrane 402 was disposed on the membrane fixation holder 406, and the active sludge of 12 ml was thrown into the agitation type cell 401. First, 4 ml were filtrated by setting a membranous filtration pressure at 5 kPa, and an agitation speed at 1000 rpm based on the magnetic stirrer 403. Thereafter, the filtration was ended, and the active sludge in the agitation type cell 401 was discarded. The above operation was performed in order to previously eliminate the influence of clogged filtration occurring at the initial stage of the filtration. Subsequently, the active sludge of 12 ml was thrown into the agitation type cell 401 again, the membranous filtration pressure was set at 5 kPa, and a membranous filtration test was carried out without performing the agitation based on the magnetic stirrer 403. Measurement values in the electronic scale 408 were introduced into the personal computer 409 at the intervals of 2 seconds, and the membranous filtration test was carried out until the quantity of membranous filtration water became 3 ml. The test was done again with the membranous filtration pressure set at 15 kPa. The above membranous filtration test was made the "membranous filtration test a".

Next, the separation membrane 402 was replaced with a new one, which was disposed on the membrane fixation holder 406. The active sludge of 12 ml was thrown into the agitation type cell 401, and 4 ml were first filtrated by setting the membranous filtration pressure at 5 kPa and the agitation speed at 1000 rpm based on the magnetic stirrer 403. Thereafter, the filtration was ended, and the active sludge in the agitation type cell 401 was discarded. Subsequently, the active sludge of 12 ml was thrown into the agitation type cell 401 again, and a membranous filtration test was carried out by setting the membranous filtration pressure at 5 kPa and the agitation speed at 1000 rpm based on the magnetic stirrer 403. Measurement values in the electronic scale 408 were introduced into the personal computer 409 at the intervals of 2 seconds. When the quantity of membranous filtration water became 3 ml, the membranous filtration was ceased for 20 seconds, and the membranous filtration was thereafter started again. In addition, when the quantity of membranous filtration water became 5 ml, the membranous filtration was ceased for 40 seconds, and the membranous filtration was thereafter started again. In addition, when the quantity of membranous filtration water became 5 ml, the membranous filtration test was ended. The above membranous filtration test was made the "membranous filtration test b".

In the individual membranous filtration tests stated above, data which indicate the relationship between the filtration times and the filtration liquid quantities of the introductions into the personal computer 409 were processed as stated below. First, a membranous filtration flux at any desired filtration time was calculated using the differential coefficient of the filtration liquid quantity at any desired filtration time. Subsequently, a membranous filtration resistance at any desired filtration time was calculated from the membranous filtration flux at any desired filtration time, by using a membranous filtration pressure and in conformity with Formula (1). The relationship between a total filtration liquid quantity and the membranous filtration resistance per unit membrane area was created from the results calculated as stated above.

Here, a membranous filtration prediction program for predicting the results of the membranous filtration tests as stated above was created by employing numerical value computation software "ExcelVBA" (Visual Basic Applications produced by Microsoft Corporation).

First, the program had the structure that a membrane area value, a transmembrane pressure $\Delta P$ [kPa] value, the initial value of a liquid-to-be-filtrated volume, a membrane washing force value, a water temperature, and the constituent component quantity X [gC/m$^3$] value of the liquid to-be-filtrated were directly inputted from the keyboard, and it had the structure that the inputted data and values were recorded in the memory.

Besides, Formulas (12) and (14) were recorded beforehand as formulas for calculating a separation-membrane-surface attaching-component quantity, Formula (5) as a formula for calculating a separation-membrane-pore inner-component quantity, Formula (15) as a formula for calculating a separation-membrane-surface attaching-component consolidation degree, Formulas (16)-(18) as formulas for calculating a membranous-filtration-resistance prediction value, and a mathematical formula obtained by substituting J=Q/A into Formula (1), as a formula for calculating a membranous-filtration-flowrate (flux) prediction value.

Separation-membrane-surface attaching-component-quantity calculation means had the structure that the transmembrane pressure value at a time $t_i$, the constituent-component quantity value of the liquid to-be-filtrated at the time $t_i$, the consolidation degrees of the constituent component of the liquid to-be-filtrated at the first layer—nth layer attaching on the separation membrane surface at the time $t_i$, and the constituent-component quantity value of the liquid to-be-filtrated attaching on the separation membrane surface at the time as had been recorded the memory, were read out, and that the constituent-component quantity value of the liquid to-be-filtrated attaching on the separation membrane surface at the time $t_i$ was calculated in conformity with the separation-membrane-surface attaching-component calculation formula. On this occasion, the Runge-Kutta method was employed as an integral method.

Besides, separation-membrane-pore inner-component-quantity calculation means had the structure that the transmembrane pressure value at the time and the constituent-component quantity value of the liquid to-be-filtrated existing in the separation membrane pores at the time $t_i$, as had been recorded in the memory, were read out, and that the constituent-component quantity value of the liquid to-be-filtrated existing in the separation membrane pores at the time $t_i$ was calculated in conformity with the separation-membrane-pore inner-component-quantity calculation formula.

Besides, separation-membrane-surface attaching-component consolidation-degree calculation means had the structure that the pressure value which came from the constituent component attaching on the separation membrane surface at the time and the consolidation degrees of the constituent component of the liquid to-be-filtrated at the first layer—nth layer attaching on the separation membrane surface at the time $t_i$, as had been recorded in the memory, were read out, and that the consolidation degrees of the constituent component of the liquid to-be-filtrated at the first layer—nth layer attaching on the separation membrane surface at the time $t_{i+1}$ were calculated in conformity with the separation-membrane-surface attaching-component consolidation-degree calculation formula.

Besides, membranous-filtration-resistance prediction-value calculation means had the structure that the membranous-filtration resistance value at the time $t_{i+1}$ was calculated in conformity with the membranous-filtration-resistance prediction-value calculation formula by using the membranous-filtration-resistance initial value, the constituent-component-quantity value of the liquid to-be-filtrated attaching on the separation membrane surface at the time $t_{i+1}$ as had been calculated in the separation-membrane-surface attaching-component-quantity calculation means, the constituent-component-quantity value of the liquid to-be-filtrated existing in the separation membrane pores at the time $t_{i+1}$ as had been calculated in the separation-membrane-pore inner-component-quantity calculation means, and the consolidation degrees of the constituent component of the liquid to-be-filtrated at the first layer—nth layer attaching on the separation membrane surface at the time $t_{i+1}$ as had been calculated in the separation-membrane-surface attaching-component consolidation-degree calculation means.

Membranous-filtration-flowrate (flux) prediction-value calculation means had the structure that the transmembrane pressure value at the time $t_{i+1}$ and the membrane area value as had been recorded in the memory were read out, and that the membranous filtration flowrate value at the time $t_{i+1}$ was calculated in conformity with a membranous-filtration-flowrate (flux) prediction-value calculation formula II, by using the transmembrane pressure value at the time $t_{i+1}$ and the membrane area value as had been read out, and the membranous-filtration-resistance value at the time $t_{i+1}$ as had been calculated in the membranous-filtration-resistance prediction-value calculation means.

The program had the structure that the membranous-filtration-resistance value at the time $t_{i+1}$ as had been calculated in the membranous-filtration-resistance prediction-value calculation means, and the membranous-filtration-flowrate value at the time $t_{i+1}$ as had been calculated in the membranous-filtration-flowrate (flux) prediction-value calculation means were recorded in the memory (membranous-filtration prediction-value record means).

Besides, in the membranous filtration test of the active sludge employing the membranous filtration test apparatus, the volume of the liquid to-be-filtrated decreases with the continuation of the filtration. Therefore, the computation of a material balance concerning water and the constituent component is required. Accordingly, the volume of the liquid to-be-filtrated at the time $t_{i+1}$ and the quantity of the constituent component at the time $t_{i+1}$ were respectively calculated in conformity with the following formulas (35) and (36) (material-balance correction-value calculation means):

[Formula 18]

$$V(t_{i+1})=V(t_i)-A \cdot J(t_i) \cdot \Delta t \quad (35)$$

$$X(t_{i+1})=(X(0) \cdot V(0)-A \cdot X_c(t_{i+1}))/V(t_{i+1}) \quad (36)$$

Here, V(t) denotes the volume [m³] of the liquid to-be-filtrated at a time t.

Besides, the liquid to-be-filtrated volume at the time $t_{i+1}$ and the constituent component quantity at the time $t_{i+1}$ as had been calculated were recorded in the memory.

The program had the structure that the separation-membrane-surface attaching-component-quantity calculation means, the separation-membrane-pore inner-component-quantity calculation means, the separation-membrane-surface attaching-component consolidation-degree calculation means, the material-balance correction-value calculation means, the membranous-filtration-resistance prediction-value calculation means, and the membranous-filtration-flowrate (flux) prediction-value calculation means were executed while updating the time in accordance with $t_{i+1}=t_i+\Delta t$ (here, $\Delta t=t_n/n$) until the time $t_n$ previously recorded was reached.

Membranous filtration resistance values and membranous filtration flowrate values at the times $t_0$-$t_n$ as had been recorded in the membranous-filtration prediction-value record means were recorded in the memory as time series values (time-series-value record means). Besides, a total-filtration-liquid-quantity value per unit membrane area at the times $t_0$-$t_n$ was calculated using the membranous filtration flowrate values at the times $t_0$-$t_n$ as had been recorded in the memory, and in conformity with the following formula (37) (the total-filtration-liquid-quantity value per unit membrane area at the time $t_i$ was the integral of the membranous filtration fluxes in the range of the times $t_0$-$t_i$. Data in which the calculated total-filtration-liquid-quantity values per unit membrane area at the times $t_0$-$t_n$ formed pairs with the membranous filtration resistance values, were recorded in the memory. The program had the structure that a graph in which the time was taken on the axis of abscissas, while the membranous filtration flowrate value or the membranous filtration resistance value was taken on the axis of ordinates, or in which the total filtration liquid quantity value per unit membrane area was taken on the axis of abscissas, while the membranous filtration resistance value was taken on the axis of ordinates, was created and outputted.

[Formula 19]

$$v(t_i)=\S J(t_i) \cdot dt \quad (37)$$

Here, v(t) denotes the total-filtration-liquid-quantity value [m] per unit membrane area at the time t.

In order to reproduce the results of the membranous filtration test, the MLSS concentration of the active sludge was first measured by employing the membranous filtration prediction program. Here, it was assumed that a constituent component quantity X had its rational formula represented as $C_5H_7O_2N$, and it was calculated by multiplying an MLSS measurement value by 60/113. (In $C_5H_7O_2N$, the constituent quantity of $C_5$ correspondence component was calculated.)
As a result, $$X=1.99 \times 10^3 \, [gC/m^3]$$

was obtained.

Figure 9:
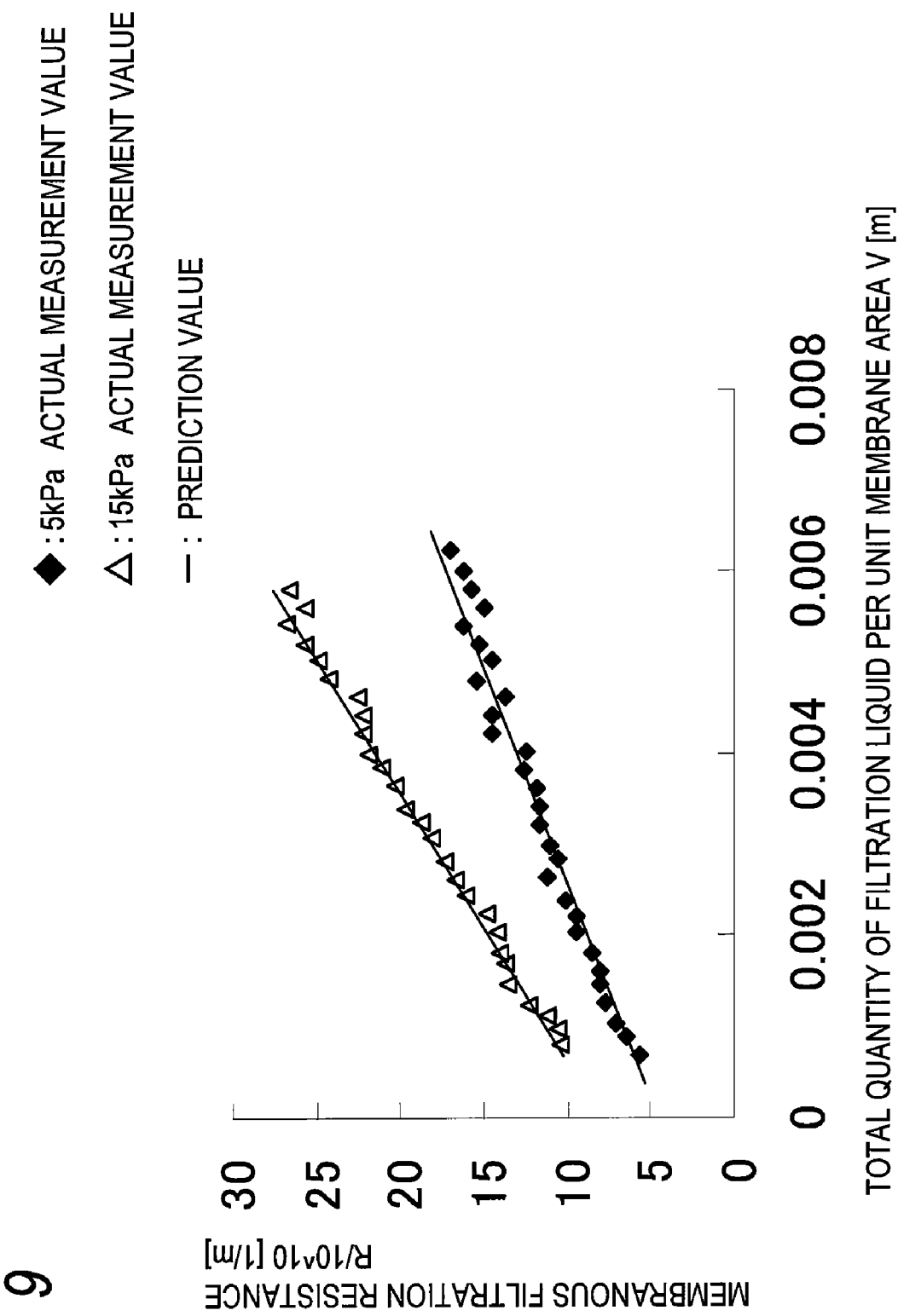
FIG. 9 It shows the predicted values and actually measured values of a membranous filtration resistance in the "membranous filtration test a" of Example 1.

First, the result of the "membranous filtration test a" was predicted. There were inputted the constituent-component quantity value at the time zero, $X(0)=1.99 \times 10^3$, the value $X_c(0)=0$ of the constituent component quantity attaching on the separation membrane surface, the value $X_f(0)=0$ of the constituent component quantity existing in the separation membrane pores, the consolidation degree $D_j(0)=0$ of the constituent component at the jth layer attaching on the separation membrane surface, the water temperature=19.8° C. of the membranous filtration liquid, and a transmembrane pressure value $\Delta P$=5 kPa or 15 kPa. Further, as parameters for the membranous filtration program, there were inputted the values of a resistance coefficient $\alpha$, the pressure sensitivity coefficient a of the resistance coefficient, a clogged filtration resistance coefficient $\beta$, the rate coefficient $\phi$ of substance movement into the pores, the inhibition coefficient $\epsilon$ of the substance movement into the pores, a consolidation rate constant k1, and a consolidation effect constant k2, and the membranous filtration prediction result was outputted. In the "membranous filtration test a", the agitation was not performed, so that the membrane washing force $\tau$=0 held, and the second term of the right side of Formula (12) became "0". Therefore, it was unnecessary to input the values of the separation coefficient γ and the friction coefficient λ. Besides, among the parameters, the values of the clogged filtration resistance coefficient β, the rate coefficient φ of the substance movement into the pores, the inhibition coefficient c of the substance movement into the pores, the consolidation rate constant k1, and the consolidation effect constant k2 were little influential on the prediction result, and hence, tentative values were inputted. In addition, the membranous filtration predictions were repeatedly performed while changing the resistance coefficient α and the pressure sensitivity coefficient a so as to minimize the difference between the actual measurement value and the membranous filtration prediction result. In consequence, the difference between the actual measurement value and the membranous filtration prediction result became the minimum when the resistance coefficient $α=7.90×10^9$ and the pressure sensitivity coefficient of the resistance coefficient, $a=1.17×10^{-1}$ held. The membranous filtration prediction results and the actual measurement results on this occasion are shown in FIG. 9. It is thus indicated that the membranous filtration prediction results are very similar to the actual measurement results, and that the membranous filtration prediction can be precisely realized.

Figure 10:
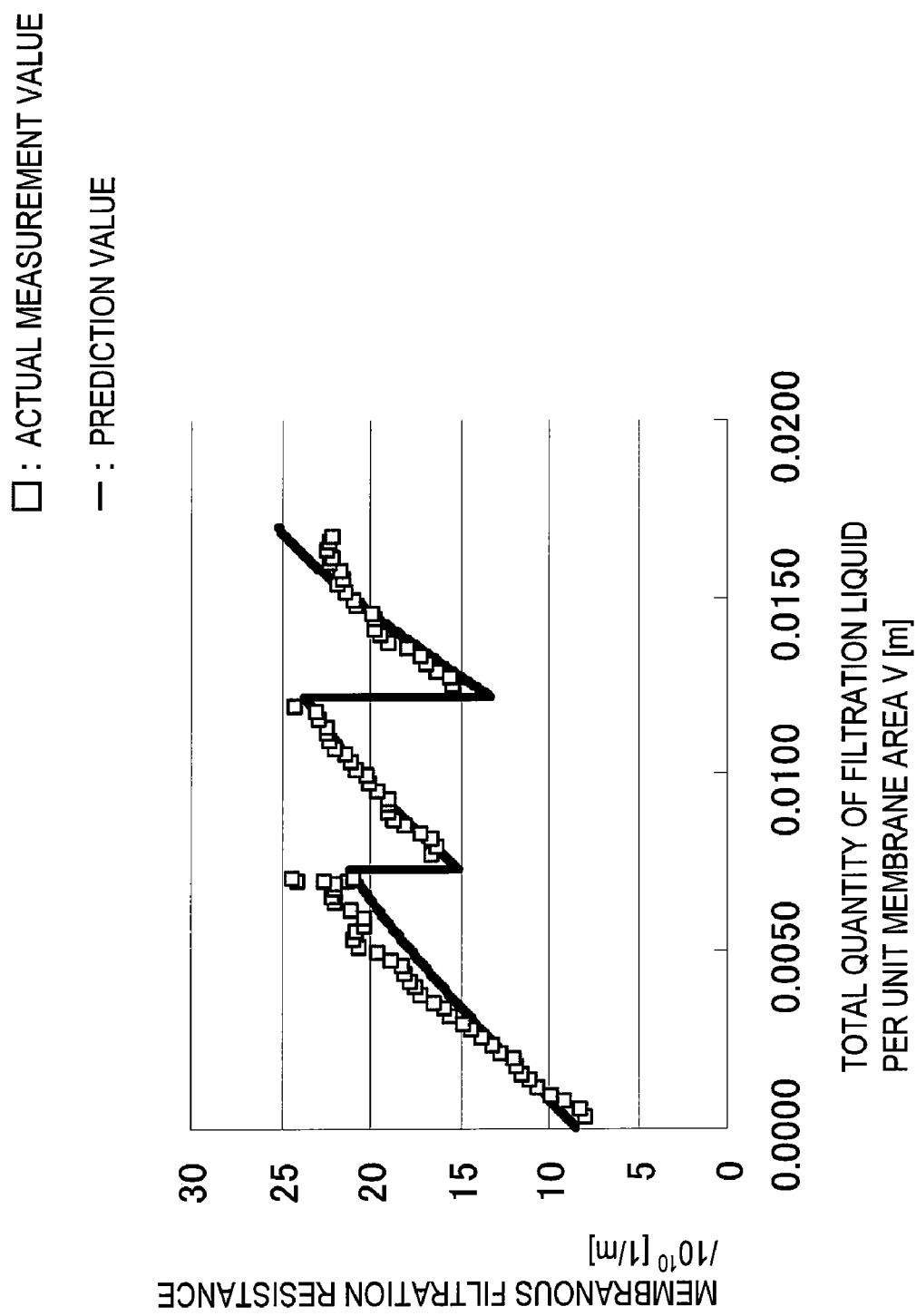
FIG. 10 It shows the predicted values and actually measured values of the membranous filtration resistance in the "membranous filtration test b" of Example 1.

Next, the result of the "membranous filtration test b" was predicted. There were inputted the constituent-component quantity value at the time zero, $X(0)=1.99×10^3$, the value $X_c(0)=0$ of the constituent component quantity attaching on the separation membrane surface, the value $X_f(0)=0$ of the constituent component quantity existing in the separation membrane pores, the consolidation degree $D_f(0)=0$ of the constituent component at the jth layer attaching on the separation membrane surface, the water temperature=19.8° C. of the membranous filtration liquid, a membrane washing force value=1, and a transmembrane pressure value ΔP=5 kPa. Further, as parameters for the membranous filtration program, there were inputted the values of the resistance coefficient α, the pressure sensitivity coefficient a of the resistance coefficient, the separation coefficient γ, the friction coefficient λ, the clogged filtration resistance coefficient β, the rate coefficient φ of the substance movement into the pores, the inhibition coefficient ε of the substance movement into the pores, the consolidation rate constant k1, and the consolidation effect constant k2, and the membranous filtration prediction result was outputted. Regarding the resistance coefficient α and the pressure sensitivity coefficient a of the resistance coefficient, the values obtained in the "membranous filtration test a" were inputted. Besides, the values of the clogged filtration resistance coefficient β, the rate coefficient φ of the substance movement into the pores, the inhibition coefficient E of the substance movement into the pores, the consolidation rate constant k1, and the consolidation effect constant k2 were little influential on the prediction result, and hence, tentative values were inputted. In addition, the membranous filtration predictions were repeatedly performed while changing the separation coefficient γ and the friction coefficient λ so as to minimize the difference between the actual measurement value and the membranous filtration prediction result. In consequence, the difference between the actual measurement value and the membranous filtration prediction result became the minimum when the separation coefficient $γ=2.14×10^3$ and the friction coefficient $λ=1.66×10^{-4}$ held. The membranous filtration prediction results and the actual measurement results on this occasion are shown in FIG. 10. It is thus indicated that the membranous filtration prediction results are very similar to the actual measurement results, and that the membranous filtration prediction can be precisely realized.

Example 2

The prediction of a membranous filtration result in a membranous separation apparatus 300 to be stated below was carried out.

Figure 11:
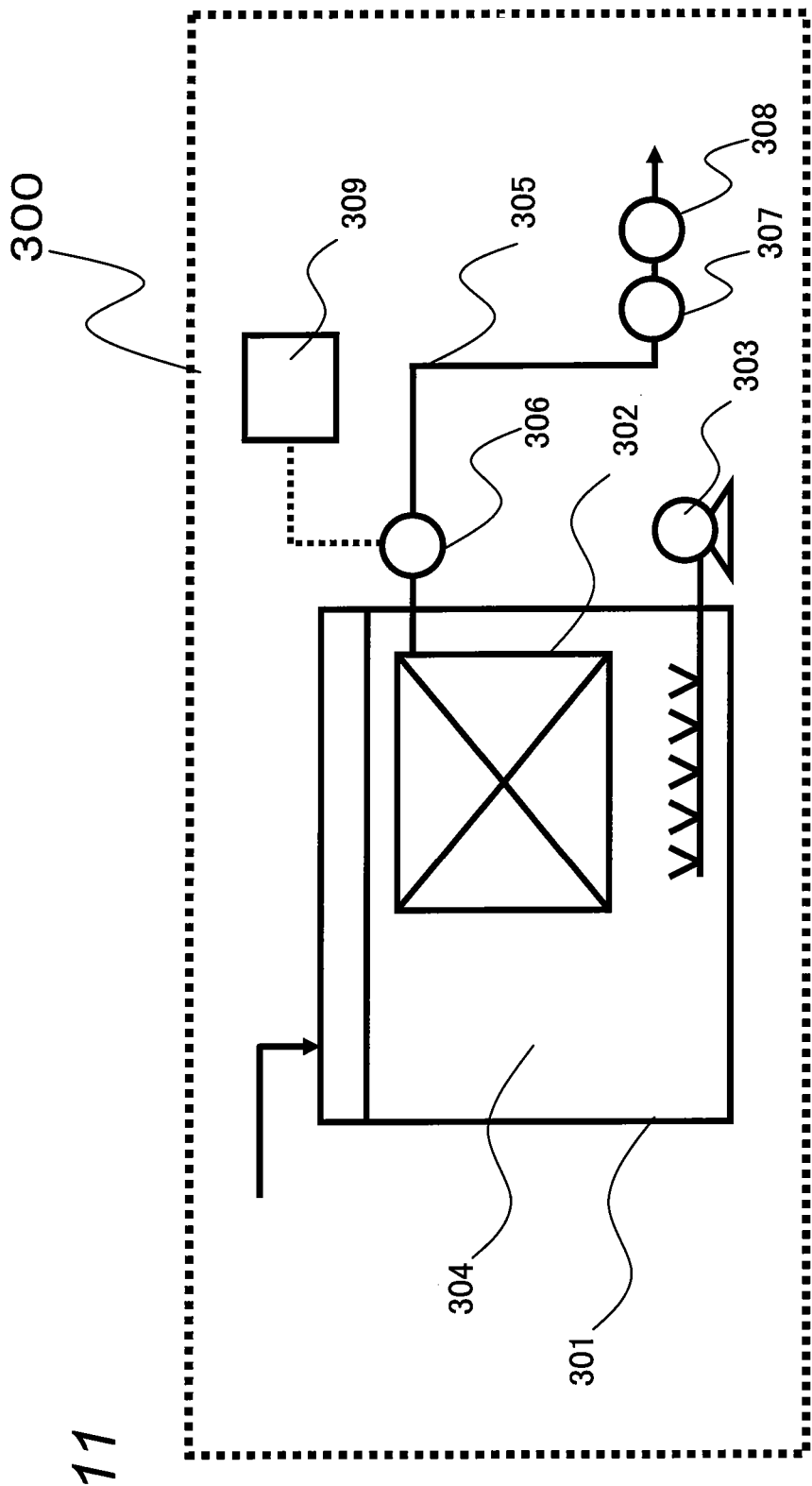
FIG. 11 It is a schematic view of a membranous separation device 300 employed in Example 2.

The structural outline of the membranous separation apparatus 300 is shown in FIG. 11. The membranous separation apparatus was a membrane bioreactor (MBR) of immersion type, and was a waste treatment apparatus for treating factory waste whose principal constituent was acetic acid. The factory waste whose principal constituent was acetic acid was thrown into a liquid-to-be-filtrated accommodation tank 301 having an effective volume of 0.024 m$^3$. The apparatus had the structure that active sludge was accommodated as a liquid to-be-filtrated 304 in the liquid-to-be-filtrated accommodation tank 301, that a separation membrane 302 was immersed in the liquid to-be-filtrated 304, that an air sprinkler pipe was disposed under the separation membrane 302, and that the air sprinkler pipe was fed with air from an air exposure blower 303 being membrane surface wash means. More specifically, in the apparatus, air bubbles fed from the air sprinkler pipe touched the surface of the membrane, and the circulation of the active sludge based on air exposure occurred simultaneously, so that an effect in which the component attaching on the membrane surface detaches from the membrane is attained. The separation membrane 302 was a flat membrane type precise filtration membrane (effective membrane area: 0.0288 m$^2$) made of PVDF (polyvinylidene fluoride), in which a membranous filtration liquid 305 was obtained by imbibition from a penetration side. Besides, the suction of the membranous filtration liquid was done by a pump 307, and the flowrate of the membranous filtration liquid was measured by a flow meter 308, thereby to be set at a predetermined flowrate. Besides, a membranous filtration pressure was measured by a pressure gauge 306, the pressure values of which were recorded in a recorder 309 at intervals of one second.

Figure 12:
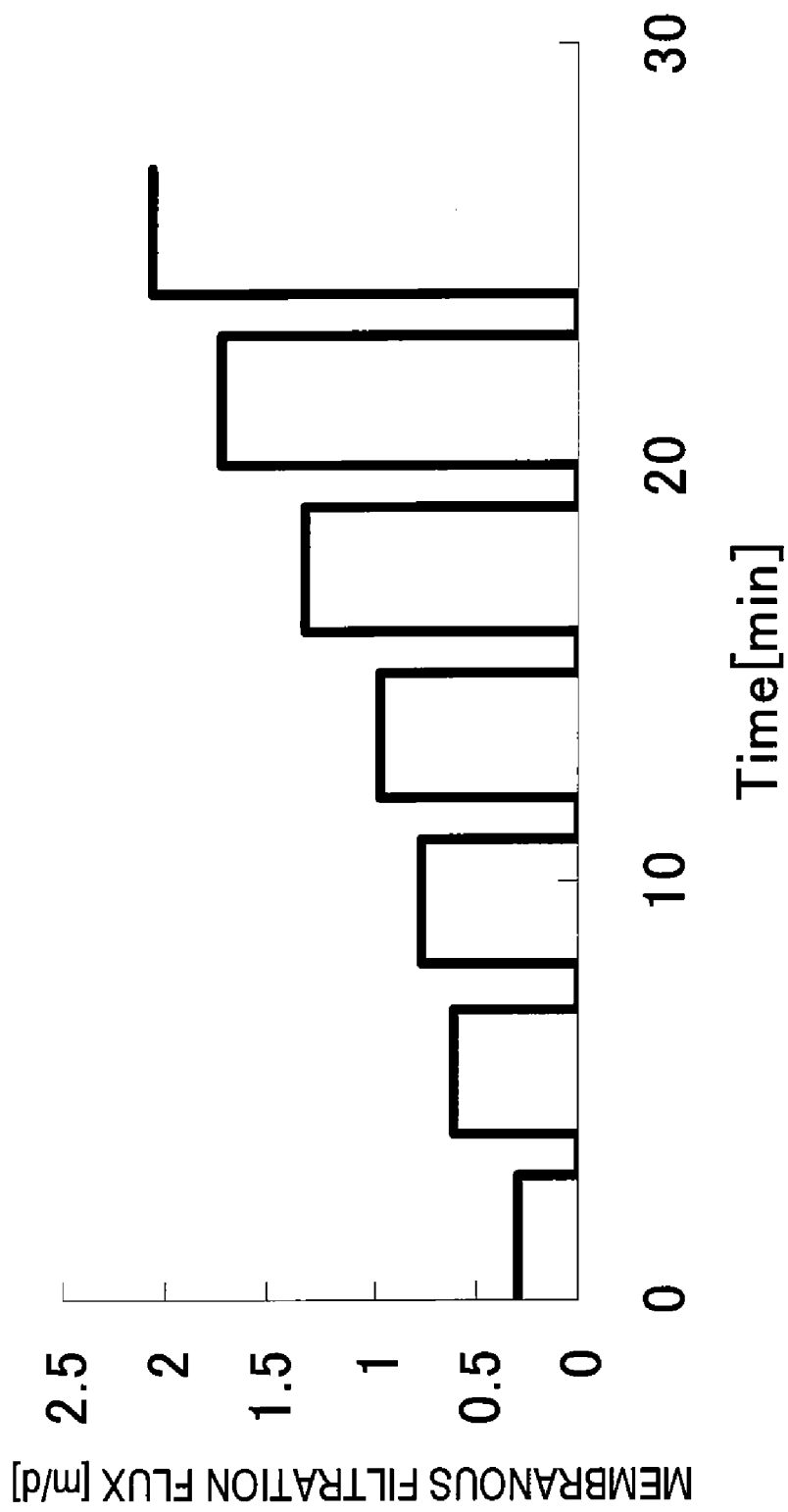
FIG. 12 It is a diagram representing the time series data of a membranous filtration flux in Example 2.

In the membranous filtration apparatus 300, the membranous filtration was carried out while suppressing the accumulation of a sludge cake on the membrane surface of the separation membrane 302 (while giving a membrane wash force to the membrane surface) in such a way that the air bubbles fed through the air sprinkler pipe from the air exposure blower 303 were held in touch with the separation membrane 302. On this occasion, the membranous filtration was carried out while a membranous filtration flowrate (flux) was being varied with time as shown in FIG. 12.

In order to predict the result of the above membranous filtration, a membranous filtration prediction program as stated below was created.

The membranous filtration prediction program was the same as the membranous filtration prediction program stated in Example 1, except the following points:

In the membranous separation apparatus, the factory waste was thrown in correspondence with the decrease of the volume of the liquid to-be-filtrated based on the membranous filtration, thereby to keep the volume of the liquid to-be-filtrated substantially constant. Therefore, it was judged that a constituent component quantity did not change in the process of the membranous filtration, and the material-balance correction-value calculation means was removed from the membranous filtration prediction program stated in Example 1.

Besides, the membranous filtration prediction program stated in Example 1 included the membranous-filtration-flowrate (flux) prediction-value calculation means for inputting the transmembrane pressure value and predicting the membranous filtration flowrate. In the membranous filtration prediction program in this example, transmembrane-pressure prediction-value calculation means in which a transmembrane-pressure prediction-value calculation formula being Formula (1) was recorded in order to input the membranous filtration flowrate (flux) and to predict a transmembrane pressure was employed instead of the membranous-filtration-flowrate (flux) prediction-value calculation means.

Using the membranous filtration prediction program as stated above, the changes of the transmembrane pressure values in the membranous separation apparatus were predicted.

Figure 13:
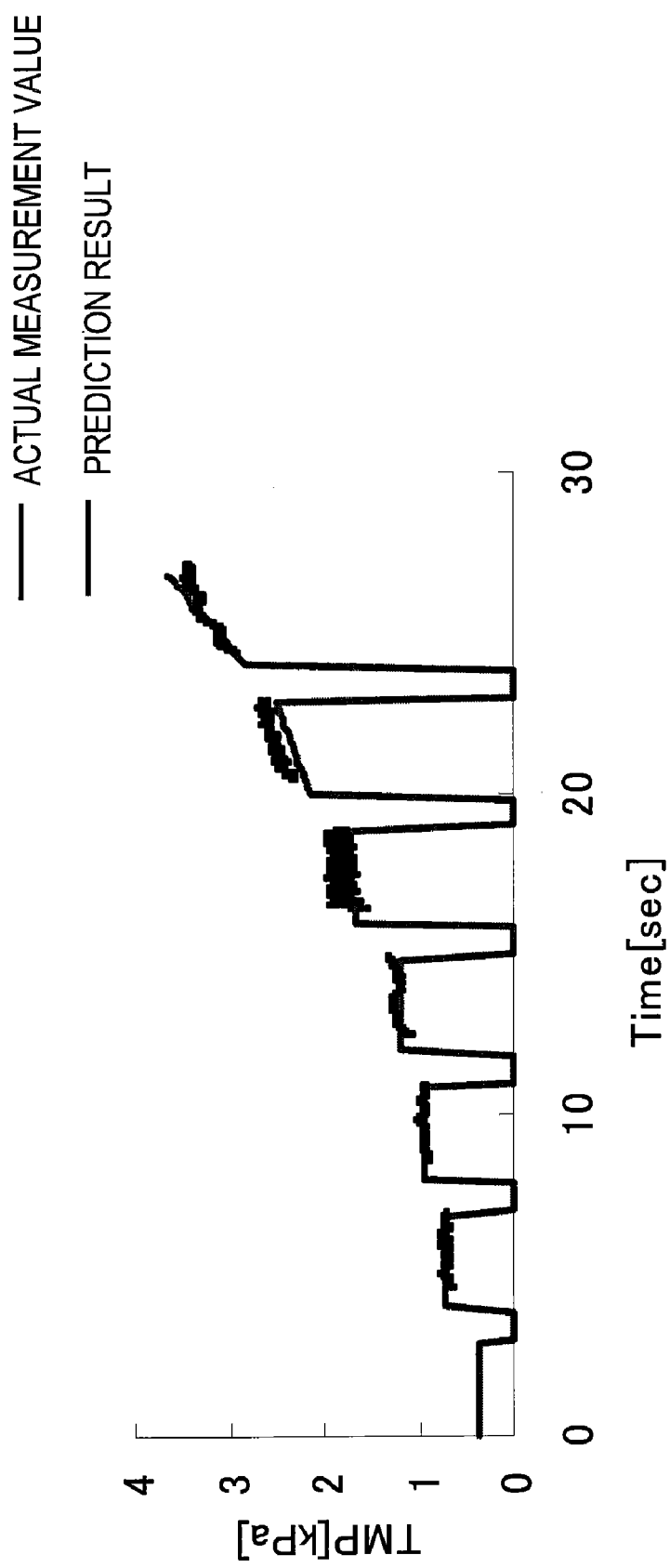
FIG. 13 It is a diagram comparing the predicted-value time series data and actually measured values of a transmembrane pressure in Example 2.

The same sludge and separation membrane as in Example 1 were used. In Example 1, the active sludge in the membranous separation apparatus was diluted double with city water and then subjected to the membranous filtration test. In this example, therefore, $X(0)=1.99\times10^3\times2=3.98\times10^3$ was set as the value of a constituent component quantity at the time zero. Besides, there were inputted $X_c(0)=0$ as the value of the constituent component quantity attaching on the separation membrane surface, $X_f(0)=0$ as the value of the constituent component quantity existing in the separation membrane pores, $D_j(0)=0$ as the consolidation degree of the constituent component at the jth layer attaching on the separation membrane surface, and 19.8° C. as the water temperature of the membranous filtration liquid. Besides, as the time series values of the membranous filtration flux, the changes of the membranous filtration flux shown in FIG. 12 were inputted as a data file. Besides, as the parameters determined in the above, there were inputted $\alpha=7.90\times10^9$ as the resistance coefficient, $a=1.17\times10^{-1}$ as the pressure sensitivity coefficient of the resistance coefficient, $\gamma=2.14\times10^3$ as the separation coefficient, and $\lambda=1.66\times10^{-4}$ as the friction coefficient. Besides, the values of the clogged filtration resistance coefficient $\beta$, the rate coefficient $\phi$ of the substance movement into the pores, the inhibition coefficient $\epsilon$ of the substance movement into the pores, the consolidation rate constant k1, and the consolidation effect constant k2 were little influential on the prediction result, and hence, tentative values were inputted. Regarding the membrane washing force value $\tau$, the situation differed from that of Example 1. Therefore, a value different from that of Example 1 was inputted, and a membranous filtration prediction result was outputted. In addition, the transmembrane pressure value predictions were repeatedly performed while changing the membrane washing force value $\tau$ so as to minimize the difference between the actual measurement value and the membranous filtration prediction result. In consequence, the difference between the actual measurement value and the transmembrane pressure value prediction result became the minimum when $\tau=0.34$ held. The transmembrane pressure value prediction results and the actual measurement results on this occasion are shown in FIG. 13. It is thus indicated that the transmembrane pressure value prediction results are very similar to the actual measurement results, and that the transmembrane pressure value prediction can be precisely realized.

Example 3

Figure 14:
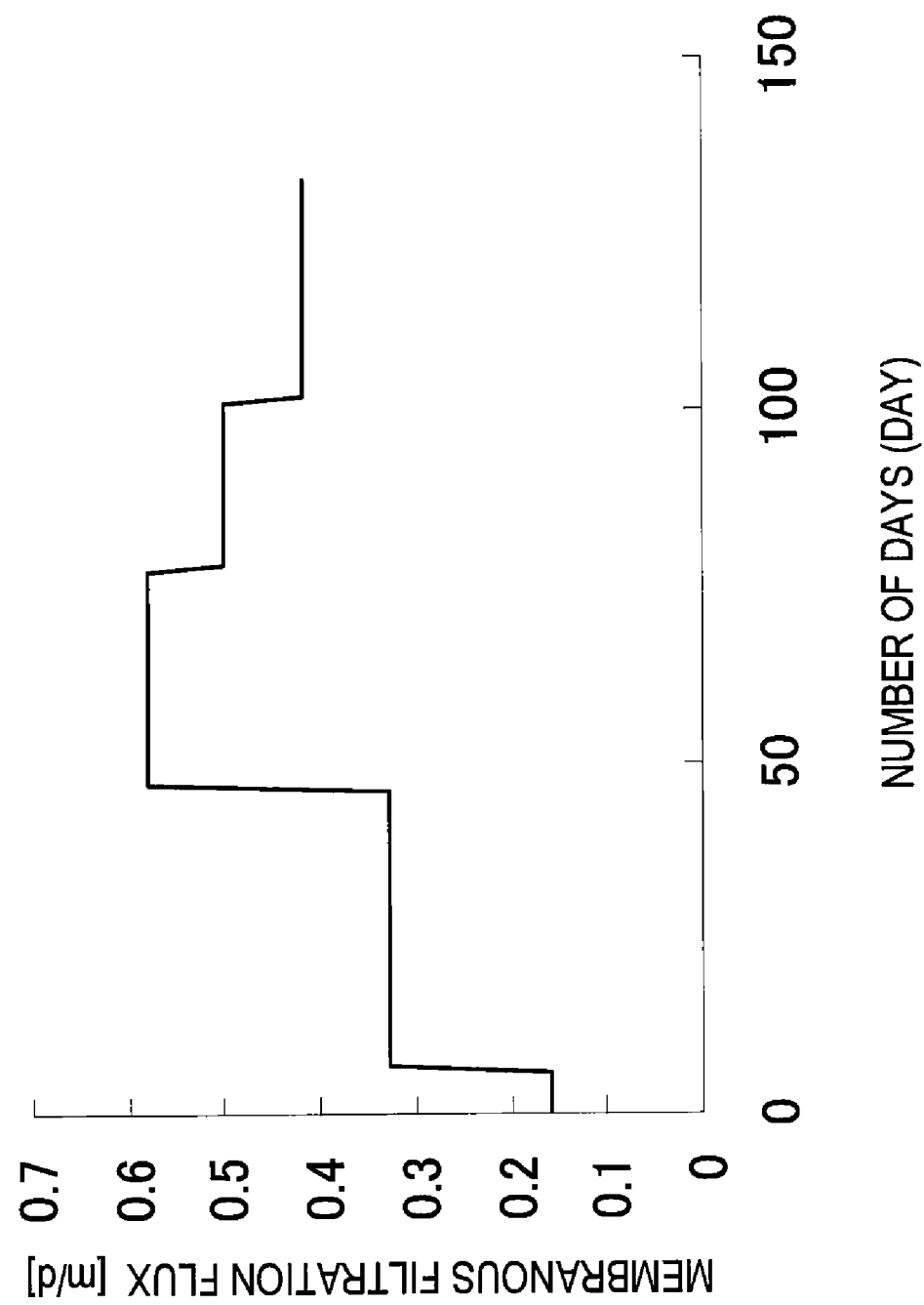
FIG. 14 It is a diagram representing the time series data of the membranous filtration flux in Example 3.
Figure 15:
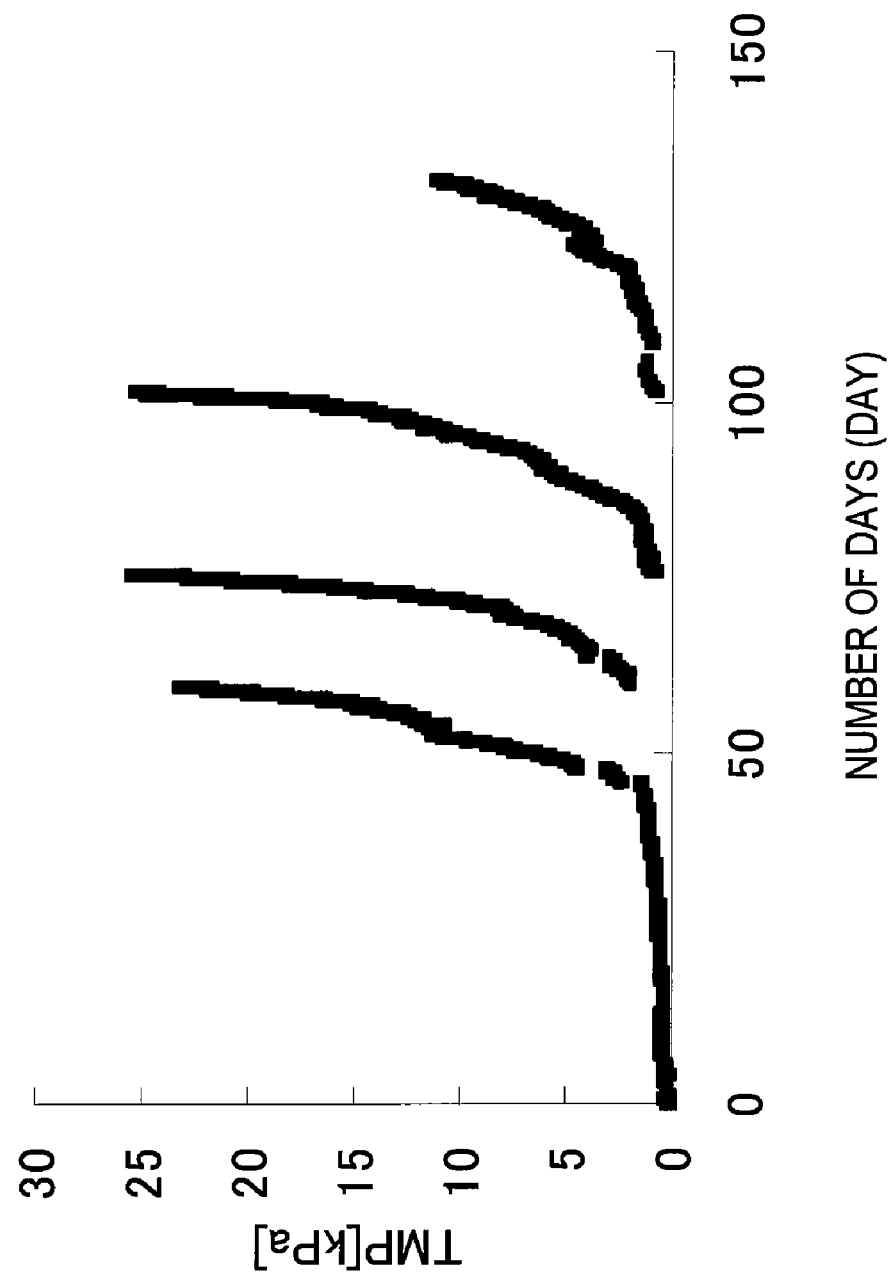
FIG. 15 It is a diagram representing the actually measured values of the transmembrane pressure in Example 3.

The membranous filtration result in the membranous separation apparatus 300 stated in Example 2 was predicted. In this example, the membranous filtration was carried out while changing the membranous filtration flowrate (flux) with time as shown in FIG. 14. The obtained changes of the transmembrane pressure values in the actual measurements are shown in FIG. 15. Places where the transmembrane pressure values lowered abruptly were existent midway. This is because the separation membrane was washed with chemicals, and the constituent component existing on the separation membrane surface or in the pores was eliminated, so that the membranous filtration resistance value lowered.

A membranous filtration prediction program for predicting the changes of the transmembrane pressure values was identical to one in Example 2. The changes of the transmembrane pressure values in the above membranous separation apparatus were predicted by employing the membranous filtration prediction program.

Figure 16:
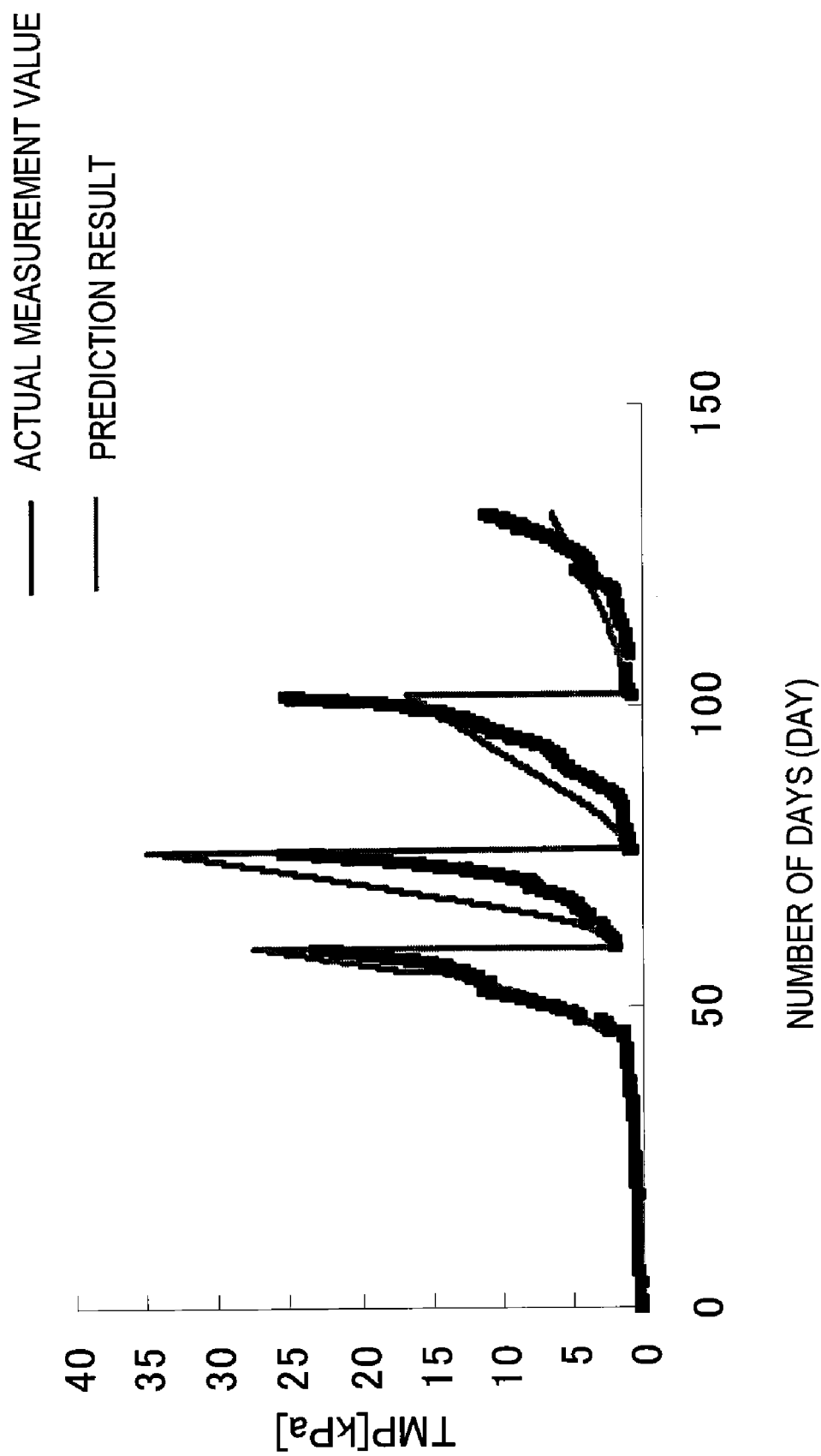
FIG. 16 It is a diagram comparing the predicted-value time series data and actually measured values of the transmembrane pressure in Example 3.

First, there were inputted the time series data of the membranous filtration flux [m/d], the value X [$gC/m^3$] of the constituent component quantity of the active sludge, and the water temperature [° C.]. The time series changes of the membranous filtration flux inputted on this occasion were as shown in FIG. 14. Besides, there were inputted $R_m=5.0\times10^{10}$ [$m^{-1}$] as the initial membranous filtration resistance $R_m$, $X_c(0)=0$ as the value of the constituent component quantity attaching on the separation membrane surface, $X_f(0)=0$ as the value of the constituent component quantity existing in the separation membrane pores, and $D_j(0)=0$ as the consolidation degree of the constituent component at the jth layer attaching on the separation membrane surface. Besides, as the parameters determined in the above, there were inputted $\alpha=7.90\times10^9$ as the resistance coefficient, $a=1.17\times10^{-1}$ as the pressure sensitivity coefficient of the resistance coefficient, $\gamma=2.14\times10^3$ as the separation coefficient, $\lambda=1.66\times10^{-4}$ as the friction coefficient, and $\tau=0.34$ as the membrane washing force. In addition, the transmembrane pressure value predictions were repeatedly performed while changing the values of the clogged filtration resistance coefficient $\beta$, the rate coefficient $\phi$ of the substance movement into the pores, the inhibition coefficient $\epsilon$ of the substance movement into the pores, the consolidation rate constant k1, and the consolidation effect constant k2 so as to minimize the difference between the actual measurement value and the transmembrane pressure value prediction result. In consequence, the difference between the actual measurement value and the transmembrane pressure value prediction result became the minimum when $\beta=3.0\times10^{11}$, $\phi=5.0\times10^{-10}$, $\epsilon=2.5\times10^3$, $k1=5.0\times10^{-10}$, and k2=1 held. The transmembrane pressure value prediction results and the actual measurement results on this occasion are shown in FIG. 16. It is thus indicated that the transmembrane pressure value prediction results are very similar to the actual measurement results, and that the transmembrane pressure value prediction can be precisely realized.

The prediction method, prediction apparatus and prediction program of the present invention can be applied to the membrane resistance prediction of a filtration apparatus and can also be adapted for a membrane-clogging alarm device, a filtration-flowrate prediction device, etc., but the adaptation range thereof shall not be restricted to them. Besides, the prediction of membranous filtration in the present invention is well suited to a case where a liquid to-be-filtrated is a watery liquid in which a suspension substance or the like coexists in water, but it is applicable also to a case where the liquid to-be-filtrated is a mixed solution in which the suspension substance or the like coexists in a liquid substance different from the water.

The invention claimed is:

1. A membranous filtration method comprising filtering a liquid to-be-filtrated by a separation membrane with a driving force being a transmembrane pressure difference between a liquid to-be-filtrated side and a penetration liquid side of the separation membrane; a membranous filtration prediction method in which, in case of continuing the membranous filtration while controlling a membranous filtration flowrate (flux) to a set value, a variation of a membranous filtration resistance with time and/or a variation of the transmembrane pressure difference with time are/is predicted, wherein at least the set value of the membranous filtration flowrate (flux), an initial value of the membranous filtration resistance, and a constituent component quantity value of the liquid to-be-filtrated are used as numerical values for a membranous filtration prediction computation, and at least the following computation step 1a, computation step 1b and/or computation step 1c, and computation step 2 and/or computation step 3 are executed, thereby to find a membranous filtration resistance value and/or a transmembrane pressure difference value at any desired time, wherein:

executing the computation step 1a calculates the constituent component quantity value of the liquid to-be-filtrated attaching on a surface of the separation membrane at a time t+Δt (where Δt denotes any positive number) on the basis of a membranous filtration flowrate (flux) value or the transmembrane pressure difference value and the constituent component quantity value of the liquid to-be-filtrated at a time t (where t denotes any number of at least zero);

executing the computation step 1b calculates the constituent component quantity value of the liquid to-be-filtrated existing in pores of the separation membrane at the time t+Δt on the basis of the transmembrane pressure difference value and/or the membranous filtration flowrate (flux) value at the time t;

executing the computation step 1c calculates a consolidation degree of a constituent component of the liquid to-be-filtrated attaching on the separation membrane surface at the time t+Δt on the basis of the transmembrane pressure difference value at the time t;

executing the computation step 2 calculates the membranous filtration resistance value at the time t+Δt on the basis of the constituent component quantity value of the liquid to-be-filtrated attaching on the separation membrane surface as calculated by executing the computation step 1a, the constituent component quantity value of the liquid to-be-filtrated existing in the separation membrane pores as calculated by executing the computation step 1b, and/or the consolidation degree of the constituent component of the liquid to-be-filtrated attaching on the separation membrane surface as calculated by executing the computation step 1c;

executing the computation step 3 calculates the transmembrane pressure difference value at the time t+Δt on the basis of the constituent component quantity value of the liquid to-be-filtrated attaching on the separation membrane surface as calculated by executing the computation step 1a, the constituent component quantity value of the liquid to-be-filtrated existing in the separation membrane pores as calculated by executing the computation step 1b, and/or the consolidation degree of the constituent component of the liquid to-be-filtrated attaching on the separation membrane surface as calculated by executing the computation step 1c, or on the basis of the membranous filtration resistance value calculated by executing the computation step 2;

wherein the computation steps 1a, 1b, 1c, 2, and/or 3 are repeatedly executed while updating the time, thereby to obtain the variation of the membranous filtration resistance with the time, and/or the variation of the transmembrane pressure difference with the time.

2. The membranous filtration prediction method as defined in claim 1, wherein the computation step 1b includes a computation step which calculates a variation quantity within the predetermined time period (Δt), of the constituent component of the liquid to-be-filtrated existing in the separation membrane pores, and a value of the variation quantity is calculated on the basis of the transmembrane pressure difference value, and/or the membranous filtration flowrate (flux), and/or the value of the constituent component attaching on the separation membrane surface, and/or the constituent component quantity value of the liquid to-be-filtrated existing in the separation membrane pores, at the time t.

3. The membranous filtration prediction method as defined in claim 2, wherein a computation formula at the computation step 1b includes a self-inhibition term of the constituent component quantity value of the liquid to-be-filtrated existing in the separation membrane pores.

4. The membranous filtration prediction method as defined in claim 1, wherein a calculation formula at the calculation step 1c includes a calculation step which calculates a variation quantity within the predetermined time period (Δt), of the consolidation degree of the constituent component of the liquid to-be-filtrated attaching on the separation membrane surface, and the value of the variation quantity is calculated on the basis of a pressure which is applied to the constituent component attaching on the separation membrane surface at the time t, and/or the value of the consolidation degree of the constituent component of the liquid to-be-filtrated attaching on the separation membrane.

5. The membranous filtration prediction method as defined in claim 1, wherein:

the computation step 1a is a computation step which calculates a variation quantity within the predetermined time period (Δt), of the constituent component quantity of the liquid to-be-filtrated attaching on the separation membrane surface;

a computation formula at the computation step 1a includes a term of a rate at which the constituent component of the liquid to-be-filtrated attaches onto the separation membrane surface, and a term of a rate at which the constituent component of the liquid to-be-filtrated attaching on the separation membrane surface detaches from the separation membrane surface;

the rate at which the constituent component attaches onto the separation membrane surface is calculated using the transmembrane pressure difference value or the membranous filtration flowrate (flux) value, and the constituent component quantity value of the liquid to-be-filtrated and/or the membrane washing force value; and the rate at which the constituent component detaches from the separation membrane surface is calculated using the transmembrane pressure difference value or the membranous filtration flowrate (flux) value, and the constituent component quantity value of the liquid to-be-filtrated attaching on the separation membrane surface, and/or the consolidation degree of the constituent component of the liquid to-be-filtrated.

6. The membranous filtration prediction method as defined in claim 5, wherein a formula for obtaining the rate at which the constituent component of the liquid to-be-filtrated attaching on the separation membrane surface detaches from the separation membrane surface includes a term based on a membrane washing force value.

7. The membranous filtration prediction method as defined in claim 5, wherein a formula for obtaining the rate at which the constituent component of the liquid to-be-filtrated attaches onto the separation membrane surface includes a self-inhibition term of the membrane washing force value.

8. The membranous filtration prediction method as defined in claim 5, wherein a formula for obtaining the rate at which the constituent component of the liquid to-be-filtrated attaching on the separation membrane surface detaches from the separation membrane surface includes a self-inhibition term of the transmembrane pressure difference value.

9. The membranous filtration prediction method as defined in claim 5, wherein a formula for obtaining the rate at which the constituent component of the liquid to-be-filtrated attaching on the separation membrane surface detaches from the separation membrane surface includes a term of a second-degree or higher-degree function of a constituent component quantity value of the liquid to-be-filtrated attaching on the separation membrane surface.

10. The membranous filtration prediction method as defined in claim 1, wherein the computation step is includes the following computation step $1c$-1 and computation step $1c$-2, wherein:
  executing the computation step $1c$-1 calculates the number n of layers of the constituent component (where n denotes an integer of at least 2) in the layers of the liquid to-be-filtrated attaching on the separation membrane surface at the time t+$\Delta$t on the basis of the constituent component quantity value of the liquid to-be-filtrated attaching on the separation membrane as found by the computation step $1a$; and
  executing the computation step $1c$-2) calculates the consolidation degree of the constituent component of the liquid to-be-filtrated at the ith layer attaching on the separation membrane surface at the time t+$\Delta$t (where i denotes any natural number of 1 to n, and the first layer is the nearest to the separation membrane, whereas the nth layer is the remotest from the separation membrane).

11. The membranous filtration prediction method as defined in claim 10, wherein a computation formula at the computation step $1c$-2 includes a computation step which calculates a variation quantity within the predetermined time period ($\Delta$t), of the consolidation degree of the constituent component of the liquid to-be-filtrated at the ith layer attaching on the separation membrane surface, and a value of the variation quantity is calculated on the basis of a pressure which is applied to the constituent component attaching on the separation membrane surface at the time t, and/or the value of the consolidation degree of the constituent component of the liquid to-be-filtrated at the ith layer attaching on the separation membrane.

12. The membranous filtration prediction method as defined in claim 10, wherein the computation step 2 is the following step 2', wherein:
  executing the computation step 2' calculates the membranous filtration resistance value at the time t+$\Delta$t on the basis of the constituent component quantity value of the liquid to-be-filtrated attaching on the separation membrane surface as calculated by executing the computation step $1a$, the constituent component quantity value of the liquid to-be-filtrated existing in the separation membrane pores as calculated by executing the computation step $1b$, and the constituent component quantity value of the liquid to-be-filtrated at the ith layer attaching on the separation membrane surface, and/or the consolidation degree of the constituent component of the liquid to-be-filtrated at the ith layer attaching on the separation membrane surface as calculated by executing the computation step $1c$-2.

13. The membranous filtration prediction method as defined in claim 12, wherein, at the computation step 2 or the computation step 2', the membranous filtration resistance value at any desired time is calculated on the basis of the value of the pressure applied to the constituent component attaching on the separation membrane surface, and/or the computation step 2 or the computation step 2' includes a higher-degree formula than a first or second-degree formula of the constituent component quantity value of the liquid to-be-filtrated existing in the separation membrane pores.

14. The membranous filtration prediction method as defined in claim 10, wherein the computation step $1a$ is a computation step which calculates a variation quantity within the predetermined time period ($\Delta$t), of the constituent component quantity of the liquid to-be-filtrated attaching on the separation membrane surface;
  a computation formula at the computation step $1a$ includes
    a term of a rate at which the constituent component of the liquid to-be-filtrated attaches onto the separation membrane surface, and a term of a rate at which the constituent component of the liquid to-be-filtrated attaching on the separation membrane surface detaches from the separation membrane surface;
  the rate at which the constituent component attaches onto the separation membrane surface is calculated using the transmembrane pressure difference value or the membranous filtration flowrate (flux) value, and the constituent component quantity value of the liquid to-be-filtrated; and
  the rate at which the constituent component detaches from the separation membrane surface is calculated using the transmembrane pressure difference value or the membranous filtration flowrate (flux) value, and the constituent component quantity value of the liquid to-be-filtrated at the first layer to the nth layer attaching on the separation membrane surface, and/or the consolidation degree of the constituent component of the liquid to-be-filtrated at the first layer to the nth layer.

15. The membranous filtration prediction method as defined in claim 14, wherein a formula for obtaining the rate at which the constituent component of the liquid to-be-filtrated attaching on the separation membrane surface detaches from the separation membrane surface includes a term of a second-degree or higher-degree function of the constitute component quantity value of the liquid to-be-filtrated at the first layer to the nth layer attaching on the separation membrane surface.

16. The membranous filtration prediction method as defined in claim 1, wherein the constituent component of the liquid to-be-filtrated contains a solid component of the liquid to-be-filtrated.

17. The membranous filtration prediction method as defined in claim 1, wherein the liquid to-be-filtrated is a mixed liquid which contains microbes.

18. A membranous filtration prediction apparatus comprising calculation means for executing a calculation in accordance with the membranous filtration prediction method as defined in claim 1, display means for displaying a calculated result of the calculation means, and record means for recording input data and the calculated result.

19. A membranous filtration method comprising filtering a liquid to-be-filtrated by a separation membrane with a driving force being a transmembrane pressure difference between a liquid to-be-filtrated side and a penetration liquid side of the separation membrane; a membranous filtration prediction method in which, in case of continuing the membranous filtration while controlling the transmembrane pressure difference to a set value, a variation of a membranous filtration resistance with time and/or a variation of a membranous filtration flowrate (flux) with time are/is predicted, wherein at least the set value of the transmembrane pressure difference, an initial value of the membranous filtration resistance, and a constituent component quantity value of the liquid to-be-filtrated are used as numerical values for a membranous filtration prediction computation, and at least the following computation step 1a, computation step 1b and/or computation step 1c, and computation step 2 and/or computation step 3 are executed, thereby to find a membranous filtration resistance value and/or a membranous filtration flowrate (flux) value at any desired time, wherein:

executing the computation step 1a calculates the constituent component quantity value of the liquid to-be-filtrated attaching on a surface of the separation membrane at a time t+Δt (here, Δt denotes any positive number) on the basis of the membranous filtration flowrate (flux) value or a transmembrane pressure difference value and the constituent component quantity value of the liquid to-be-filtrated at a time t (where t denotes any number of at least zero);

executing the computation step 1b calculates the constituent component quantity value of the liquid to-be-filtrated existing in pores of the separation membrane at the time t+Δt on the basis of the transmembrane pressure difference value and/or the membranous filtration flowrate (flux) value at the time t;

executing the computation step 1c calculates a consolidation degree of a constituent component of the liquid to-be-filtrated attaching on the separation membrane surface at the time t+Δt on the basis of the transmembrane pressure difference value at the time t;

executing the computation step 2 calculates the membranous filtration resistance value at the time t+Δt on the basis of the constituent component quantity value of the liquid to-be-filtrated attaching on the separation membrane surface as calculated by executing the computation step 1a, the constituent component quantity value of the liquid to-be-filtrated existing in the separation membrane pores as calculated by executing the computation step 1b, and/or the consolidation degree of the constituent component of the liquid to-be-filtrated attaching on the separation membrane surface as calculated by executing the computation step 1c;

executing the computation step 3 calculates the membranous filtration flowrate (flux) value at the time t+Δt on the basis of the constituent component quantity value of the liquid to-be-filtrated attaching on the separation membrane surface as calculated by executing the computation step 1a, the constituent component quantity value of the liquid to-be-filtrated existing in the separation membrane pores as calculated by executing the computation step 1b, and/or the consolidation degree of the constituent component of the liquid to-be-filtrated attaching on the separation membrane surface as calculated by executing the computation step 1c, or on the basis of the membranous filtration resistance value calculated by executing the computation step 2;

wherein the computation steps 1a, 1b, 1c, 2, and/or 3 are repeatedly executed while updating the time, thereby to obtain the variation of the membranous filtration resistance with the time, and/or the variation of the membranous filtration flowrate (flux) with the time.

20. The membranous filtration prediction method as defined in claim 19, wherein the computation step 1b includes a computation step which calculates a variation quantity within the predetermined time period (Δt), of the constituent component of the liquid to-be-filtrated existing in the separation membrane pores, and a value of the variation quantity is calculated on the basis of the transmembrane pressure difference value, and/or the membranous filtration flowrate (flux), and/or the value of the constituent component attaching on the separation membrane surface, and/or the constituent component quantity value of the liquid to-be-filtrated existing in the separation membrane pores, at the time t.

21. The membranous filtration prediction method as defined in claim 20, wherein a computation formula at the computation step 1b includes a self-inhibition term of the constituent component quantity value of the liquid to-be-filtrated existing in the separation membrane pores.

22. The membranous filtration prediction method as defined in claim 19, wherein a calculation formula at the calculation step 1c includes a calculation step which calculates a variation quantity within the predetermined time period (Δt), of the consolidation degree of the constituent component of the liquid to-be-filtrated attaching on the separation membrane surface, and the value of the variation quantity is calculated on the basis of a pressure which is applied to the constituent component attaching on the separation membrane surface at the time t, and/or the value of the consolidation degree of the constituent component of the liquid to-be-filtrated attaching on the separation membrane.

23. The membranous filtration prediction method as defined in claim 19, wherein the computation step 1a is a computation step which calculates a variation quantity within the predetermined time period (Δt), of the constituent component quantity of the liquid to-be-filtrated attaching on the separation membrane surface;

a computation formula at the computation step 1a includes a term of a rate at which the constituent component of the liquid to-be-filtrated attaches onto the separation membrane surface, and a term of a rate at which the constituent component of the liquid to-be-filtrated attaching on the separation membrane surface detaches from the separation membrane surface;

the rate at which the constituent component attaches onto the separation membrane surface is calculated using the transmembrane pressure difference value or the membranous filtration flowrate (flux) value, and the constituent component quantity value of the liquid to-be-filtrated and/or the membrane washing force value; and the rate at which the constituent component detaches from the separation membrane surface is calculated using the transmembrane pressure difference value or the membranous filtration flowrate (flux) value, and the constituent component quantity value of the liquid to-be-filtrated attaching on the separation membrane surface, and/or the consolidation degree of the constituent component of the liquid to-be-filtrated.

24. The membranous filtration prediction method as defined in claim 23, wherein a formula for obtaining the rate at which the constituent component of the liquid to-be-filtrated attaching on the separation membrane surface detaches from the separation membrane surface includes a term based on a membrane washing force value.

25. The membranous filtration prediction method as defined in claim 23, wherein a formula for obtaining the rate at which the constituent component of the liquid to-be-filtrated attaches onto the separation membrane surface includes a self-inhibition term of the membrane washing force value.

26. The membranous filtration prediction method as defined in claim 23, wherein a formula for obtaining the rate at which the constituent component of the liquid to-be-filtrated attaching on the separation membrane surface detaches from the separation membrane surface includes a self-inhibition term of the transmembrane pressure difference value.

27. The membranous filtration prediction method as defined in claim 23, wherein a formula for obtaining the rate at which the constituent component of the liquid to-be-filtrated attaching on the separation membrane surface detaches from the separation membrane surface includes a term of a second-degree or higher-degree function of a constituent component quantity value of the liquid to-be-filtrated attaching on the separation membrane surface.

28. The membranous filtration prediction method as defined in claim 19, wherein the computation step 1c includes the following computation step 1c-1 and computation step 1c-2, wherein:
executing the computation step 1c-1 calculates the number n of layers of the constituent component (where n denotes an integer of at least 2) in the layers of the liquid to-be-filtrated attaching on the separation membrane surface at the time $t+\Delta t$ on the basis of the constituent component quantity value of the liquid to-be-filtrated attaching on the separation membrane as calculated by executing the computation step 1a; and
executing the computation step 1c-2 calculates the consolidation degree of the constituent component of the liquid to-be-filtrated at the ith layer attaching on the separation membrane surface at the time $t+\Delta t$ (where i denotes any natural number of 1 to n, and the first layer is the nearest to the separation membrane, whereas the nth layer is the remotest from the separation membrane).

29. The membranous filtration prediction method as defined in claim 28, wherein a computation formula at the computation step 1c-2 includes a computation step which calculates a variation quantity within the predetermined time period ($\Delta t$), of the consolidation degree of the constituent component of the liquid to-be-filtrated at the ith layer attaching on the separation membrane surface, and a value of the variation quantity is calculated on the basis of a pressure which is applied to the constituent component attaching on the separation membrane surface at the time t, and/or the value of the consolidation degree of the constituent component of the liquid to-be-filtrated at the ith layer attaching on the separation membrane.

30. The membranous filtration prediction method as defined in claim 28, wherein the computation step 2 is the computation step 2', wherein:
executing the computation step 2' calculates the membranous filtration resistance value at the time $t+\Delta t$ on the basis of the constituent component quantity value of the liquid to-be-filtrated attaching on the separation membrane surface as calculated by executing the computation step 1a, the constituent component quantity value of the liquid to-be-filtrated existing in the separation membrane pores as calculated by executing the computation step 1b, and the constituent component quantity value of the liquid to-be-filtrated at the ith layer attaching on the separation membrane surface, and/or the consolidation degree of the constituent component of the liquid to-be-filtrated at the ith layer attaching on the separation membrane surface as calculated by executing the computation step 1c-2.

31. The membranous filtration prediction method as defined in claim 30, wherein, at the computation step 2 or the computation step 2', the membranous filtration resistance value at any desired time is calculated on the basis of the value of the pressure applied to the constituent component attaching on the separation membrane surface, and/or the computation step 2 or the computation step 2' includes a higher-degree formula of first-second-degree formula of the constituent component quantity value of the liquid to-be-filtrated existing in the separation membrane pores.

32. The membranous filtration prediction method as defined in claim 28, wherein the computation step 1a is a computation step which calculates a variation quantity within the predetermined time period ($\Delta t$), of the constituent component quantity of the liquid to-be-filtrated attaching on the separation membrane surface;
a computation formula at the computation step is includes a term of a rate at which the constituent component of the liquid to-be-filtrated attaches onto the separation membrane surface, and a term of a rate at which the constituent component of the liquid to-be-filtrated attaching on the separation membrane surface detaches from the separation membrane surface;
the rate at which the constituent component attaches onto the separation membrane surface is calculated using the transmembrane pressure difference value or the membranous filtration flowrate (flux) value, and the constituent component quantity value of the liquid to-be-filtrated; and
the rate at which the constituent component detaches from the separation membrane surface is calculated using the transmembrane pressure difference value or the membranous filtration flowrate (flux) value, and the constituent component quantity value of the liquid to-be-filtrated at the first layer to the nth layer attaching on the separation membrane surface, and/or the consolidation degree of the constituent component of the liquid to-be-filtrated at the first layer to the nth layer.

33. The membranous filtration prediction method as defined in claim 32, wherein a formula for obtaining the rate at which the constituent component of the liquid to-be-filtrated attaching on the separation membrane surface detaches from the separation membrane surface includes a term of a second-degree or higher-degree function of the constitute component quantity value of the liquid to-be-filtrated at the first layer to the nth layer attaching on the separation membrane surface.

34. The membranous filtration prediction method as defined in claim 19, wherein the constituent component of the liquid to-be-filtrated contains a solid component of the liquid to-be-filtrated.

35. The membranous filtration prediction method as defined in claim 19, wherein the liquid to-be-filtrated is a mixed liquid which contains microbes.

36. A membranous filtration prediction apparatus comprising calculation means for executing a calculation in accordance with the membranous filtration prediction method as defined in claim 19, display means for displaying a calculated result of the calculation means, and record means for recording input data and the calculated result.

37. A computer readable medium embodying a computer program product for predicting a temporal variation of a membranous filtration resistance value and/or a temporal variation of a transmembrane pressure difference value as vary with time, said computer program product comprising, in a case where a filtration of a liquid to-be-filtrated with a separation membrane is continued while controlling a membranous filtration flowrate (flux) to a set value, a membranous filtration prediction program product comprising software instructions stored in the computer readable medium for enabling a computer to perform functions of the following data input means, data record means, surface-attaching component-quantity calculation means, surface-attaching component-quantity calculation-value record means, pore inner-component-quantity calculation means, and/or pore inner-component-quantity calculation-value record means, and/or consolidation-degree calculation means, and/or consolidation-degree calculation-value record means, membranous-filtration-resistance calculation means, transmembrane-pressure calculation means, membranous-filtration prediction-value record means, time-series-value record means, and output means:

the data input means is configured for inputting time series values of the membranous-filtration-flowrate (flux), time series values of a constituent component quantity of the liquid to-be-filtrated, an initial value of the constituent component quantity of the liquid to-be-filtrated attaching on a surface of the separation membrane, an initial value of the constituent component quantity of the liquid to-be-filtrated existing in pores of the separation membrane, and an initial value of the membranous filtration resistance;

the data record means is configured for recording therein the time series values of the membranous filtration flowrate (flux), the time series values of the constituent component quantity of the liquid to-be-filtrated, the initial value of the constituent component quantity of the liquid to-be-filtrated attaching on the separation membrane surface, the initial value of the constituent component quantity of the liquid to-be-filtrated existing in the separation membrane pores, and the initial value of the membranous filtration resistance as have been inputted by the data input means;

the surface-attaching component-quantity calculation means is configured for reading out the membranous-filtration-flowrate (flux) value, or the transmembrane pressure difference value and the constituent component quantity value of the liquid to-be-filtrated at any desired time t (where t denotes any number of at least zero), from the data record means, for reading out the initial value of the constituent component quantity of the liquid to-be-filtrated attaching on the separation membrane surface, in case of the time t=0, and further, the constituent component quantity value of the liquid to-be-filtrated attaching on the separation membrane surface at the time t as recorded in the data record means by surface-attaching component-quantity calculation value record means to-be-stated-below, in case of the time t=non-zero, and for calculating the constituent component quantity value of the liquid to-be-filtrated attaching on the separation membrane surface at a time $t+\Delta t$ (where $\Delta t$ denotes any positive number), in conformity with a surface-attaching component-quantity calculation formula recorded beforehand;

the surface-attaching component-quantity calculation value record means is configured for recording the constituent component quantity value of the liquid to-be-filtrated attaching on the separation membrane surface at the time $t+\Delta t$ as calculated by the surface-attaching component-quantity calculation means;

the pore inner-component-quantity calculation means is configured for reading out the transmembrane pressure difference value at any desired time t from the data record means, for reading out the initial value of the constituent component quantity of the liquid to-be-filtrated existing in the separation membrane pores, in the case of the time t=0, and further, the constituent component quantity value of the liquid to-be-filtrated existing in the separation membrane pores at the time t as recorded in the data record means by pore inner-component-quantity calculation value record means to-be-stated-below, in the case of the time t=non-zero, and for calculating the constituent component quantity value of the liquid to-be-filtrated existing in the separation membrane pores at the time $t+\Delta t$, in conformity with a pore inner-component-quantity calculation formula recorded beforehand;

the pore inner-component-quantity calculation value record means is configured for recording the constituent component quantity value of the liquid to-be-filtrated existing in the separation membrane pores at the time $t+\Delta t$ as calculated by the pore inner-component-quantity calculation means;

consolidation-degree calculation means is configured for reading out the transmembrane pressure difference value at any desired time t, from the data record means, for reading out the initial value of the consolidation degree of the constituent component of the liquid to-be-filtrated attaching on the separation membrane surface, in the case of the time t=0, and further, the consolidation degree of the constituent component of the liquid to-be-filtrated attaching on the separation membrane surface at the time t as recorded in the data record means by consolidation-degree calculation value record means to-be-stated-below, in the case of the time t=non-zero, and for calculating the consolidation degree of the constituent component of the liquid to-be-filtrated attaching on the separation membrane surface at the time $t+\Delta t$, in conformity with a consolidation-degree calculation formula recorded beforehand;

the consolidation-degree calculation value record means is configured for recording the consolidation degree of the constituent component of the liquid to-be-filtrated attaching on the separation membrane surface at the time $t+\Delta t$ as calculated by the consolidation-degree calculation means;

the membranous-filtration-resistance calculation means is configured for reading out the membranous-filtration-resistance initial value from the data record means, and for calculating the prediction value of the membranous filtration resistance at the time $t+\Delta t$, on the basis of the membranous-filtration-resistance initial value read out, the constituent component quantity value of the liquid to-be-filtrated attaching on the separation membrane surface at the time $t+\Delta t$ as calculated by the surface-attaching component-quantity calculation means, and the constituent component quantity value of the liquid to-be-filtrated existing in the separation membrane pores at the time $t+\Delta t$ as calculated by the pore inner-component-quantity calculation means, and in conformity with a membranous-filtration-resistance prediction value calculation formula recorded beforehand;

the transmembrane-pressure calculation means is configured for reading out the membranous filtration flowrate (flux) value at the time $t+\Delta t$, from the data record means, and for calculating the prediction value of the transmembrane pressure difference at the time $t+\Delta t$, on the basis of the membranous filtration flowrate (flux) value at the time $t+\Delta t$ as has been read out, and the membranous-filtration-resistance prediction value at the time $t+\Delta t$ as calculated by the membranous-filtration-resistance calculation means, and in conformity with a transmembrane-pressure prediction value calculation formula recorded beforehand;

the membranous-filtration prediction-value record means is configured for recording the prediction value of the membranous filtration resistance at the time $t+\Delta t$ as calculated by the membranous-filtration-resistance calculation means, and/or the prediction value of the transmembrane pressure difference at the time t+Δt as calculated by the transmembrane-pressure calculation means;

the time-series-value record means is configured for recording as time series values the prediction value of the membranous filtration resistance and/or the prediction value of the transmembrane pressure difference at the time t as recorded by the membranous-filtration prediction-value record means; and the output means is configured for outputting the time series value of the membranous-filtration-resistance prediction value and/or the time series value of the transmembrane-pressure prediction value as recorded by the time-series-value record means.

38. A computer readable medium embodying a computer program product for predicting a temporal variation of a membranous filtration resistance value and/or a temporal variation of a membranous filtration flowrate (flux) value as vary with time, said computer program product comprising, in a case where a filtration of a liquid to-be-filtrated with a separation membrane is continued while controlling a transmembrane pressure difference to a set value, a membranous filtration prediction program product comprising software instructions stored in the computer readable medium for enabling a computer to perform functions of the following data input means, data record means, surface-attaching component-quantity calculation means, surface-attaching component-quantity calculation-value record means, pore inner-component-quantity calculation means, and/or pore inner-component-quantity calculation-value record means, and/or consolidation-degree calculation means, and/or consolidation-degree calculation-value record means, membranous-filtration-resistance calculation means, membranous-filtration-flowrate (flux) calculation means, membranous-filtration prediction-value record means, time-series-value record means, and output means:

the data input means is configured for inputting time series values of the transmembrane pressure difference, time series values of a constituent component quantity of the liquid to-be-filtrated, an initial value of the constituent component quantity of the liquid to-be-filtrated attaching on a surface of the separation membrane, an initial value of the constituent component quantity of the liquid to-be-filtrated existing in pores of the separation membrane, and an initial value of the membranous filtration resistance;

the data record means is configured for recording therein the time series values of the transmembrane pressure difference, the time series values of the constituent component quantity of the liquid to-be-filtrated, the initial value of the constituent component quantity of the liquid to-be-filtrated attaching on the separation membrane surface, the initial value of the constituent component quantity of the liquid to-be-filtrated existing in the separation membrane pores, and the initial value of the membranous filtration resistance as have been inputted by the data input means;

the surface-attaching component-quantity calculation means is configured for reading out the membranous-filtration-flowrate (flux) value, or the transmembrane pressure difference value and the constituent component quantity value of the liquid to-be-filtrated at any desired time t (where t denotes any number of at least zero), from the data record means, for reading out the initial value of the constituent component quantity of the liquid to-be-filtrated attaching on the separation membrane surface, in case of the time t=0, and further, the constituent component quantity value of the liquid to-be-filtrated attaching on the separation membrane surface at the time t as recorded in the data record means by surface-attaching component-quantity calculation value record means to-be-stated-below, in case of the time t=non-zero, and for calculating the constituent component quantity value of the liquid to-be-filtrated attaching on the separation membrane surface at a time t+Δt, in conformity with a surface-attaching component-quantity calculation formula recorded beforehand;

the surface-attaching component-quantity calculation value record means is configured for recording the constituent component quantity value of the liquid to-be-filtrated attaching on the separation membrane surface at the time t+Δt as calculated by the surface-attaching component-quantity calculation means;

the pore inner-component-quantity calculation means is configured for reading out the transmembrane pressure difference value at any desired time t from the data record means, for reading out the initial value of the constituent component quantity of the liquid to-be-filtrated existing in the separation membrane pores, in the case of the time t=0, and further, the constituent component quantity value of the liquid to-be-filtrated existing in the separation membrane pores at the time t as recorded in the data record means by pore inner-component-quantity calculation value record means to-be-stated-below, in the case of the time t=non-zero, and for calculating the constituent component quantity value of the liquid to-be-filtrated existing in the separation membrane pores at the time t+Δt, in conformity with a pore inner-component-quantity calculation formula recorded beforehand;

the pore inner-component-quantity calculation value record means is configured for recording the constituent component quantity value of the liquid to-be-filtrated existing in the separation membrane pores at the time t+Δt as calculated by the pore inner-component-quantity calculation means;

the consolidation-degree calculation means is configured for reading out the transmembrane pressure difference value at any desired time t, from the data record means, for reading out the initial value of the consolidation degree of the constituent component of the liquid to-be-filtrated attaching on the separation membrane surface, in the case of the time t=0, and further, the consolidation degree of the constituent component of the liquid to-be-filtrated attaching on the separation membrane surface at the time t as recorded in the data record means by consolidation-degree calculation value record means to-be-stated-below, in the case of the time t=non-zero, and for calculating the consolidation degree of the constituent component of the liquid to-be-filtrated attaching on the separation membrane surface at the time t+Δt, in conformity with a consolidation-degree calculation formula recorded beforehand;

the consolidation-degree calculation value record means is configured for recording the consolidation degree of the constituent component of the liquid to-be-filtrated attaching on the separation membrane surface at the time t+Δt as calculated by the consolidation-degree calculation means;

the membranous-filtration-resistance calculation means is configured for reading out the membranous-filtration-resistance initial value from the data record means, and for calculating the prediction value of the membranous filtration resistance at the time t+Δt, on the basis of the membranous-filtration-resistance initial value read out, the constituent component quantity value of the liquid to-be-filtrated attaching on the separation membrane surface at the time $t+\Delta t$ as calculated by the surface-attaching component-quantity calculation means, and the constituent component quantity value of the liquid to-be-filtrated existing in the separation membrane pores at the time $t+\Delta t$ as calculated by the pore inner-component-quantity calculation means, and in conformity with a membranous-filtration-resistance prediction value calculation formula recorded beforehand;

the membranous-filtration-flowrate (flux) calculation means is configured for reading out the transmembrane pressure difference value at the time $t+\Delta t$, from the data record means, and for calculating the prediction value of the membranous filtration flowrate (flux) at the time $t+\Delta t$, on the basis of the transmembrane pressure difference value at the time $t+\Delta t$ as has been read out, and the membranous-filtration-resistance prediction value at the time $t+\Delta t$ as calculated by the membranous-filtration-resistance calculation means, and in conformity with a membranous-filtration-flowrate (flux) prediction value calculation formula recorded beforehand;

the membranous-filtration prediction-value record means is configured for recording the prediction value of the membranous filtration resistance at the time $t+\Delta t$ as calculated by the membranous-filtration-resistance calculation means, and/or the prediction value of the membranous filtration flowrate (flux) at the time $t+\Delta t$ as calculated by the membranous-filtration-flowrate (flux) calculation means;

the time-series-value record means is configured for recording as time series values the prediction value of the membranous filtration resistance and/or the prediction value of the membranous filtration flowrate (flux) at the time t as recorded by the membranous-filtration prediction-value record means; and the output means is configured for outputting the time series value of the membranous-filtration-resistance prediction value and/or the time series value of the membranous-filtration-flowrate (flux) prediction value as recorded by the time-series-value record means.

\* \* \* \* \*